US012554109B2

(12) United States Patent
Kawamura et al.

(10) Patent No.: US 12,554,109 B2
(45) Date of Patent: Feb. 17, 2026

(54) ZOOM LENS AND IMAGING APPARATUS

(71) Applicant: FUJIFILM Corporation, Tokyo (JP)

(72) Inventors: Daiki Kawamura, Saitama (JP); Tetsuya Ori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 591 days.

(21) Appl. No.: 17/813,244

(22) Filed: Jul. 18, 2022

(65) Prior Publication Data
US 2023/0052715 A1 Feb. 16, 2023

(30) Foreign Application Priority Data

Jul. 30, 2021 (JP) .................... 2021-126036

(51) Int. Cl.
*G02B 15/14* (2006.01)
*G02B 15/167* (2006.01)

(52) U.S. Cl.
CPC ... *G02B 15/144105* (2019.08); *G02B 15/167* (2013.01)

(58) Field of Classification Search
CPC .... G02B 15/144105; G02B 15/145129; G02B 15/145105; G02B 15/145113; G02B 15/1461; G02B 15/167
See application file for complete search history.

(56) References Cited

U.S. PATENT DOCUMENTS 10,018,814 B2   7/2018  Shibata et al.
2007/0236806 A1 10/2007 Ori 2013/0113980 A1* 5/2013 Nakamura ........... G02B 15/173
                                                            359/683
2017/0192212 A1  7/2017 Yamamoto
2017/0336601 A1 11/2017 Wei et al.
2018/0045929 A1  2/2018 Takemoto
2018/0292627 A1 10/2018 Takemoto
2019/0018221 A1  1/2019 Yamazoe
(Continued)

FOREIGN PATENT DOCUMENTS

JP  2007-279351 A  10/2007
JP  2016-126278 A   7/2016
JP  2017-207667 A  11/2017
(Continued)

OTHER PUBLICATIONS

An Office Action; "Notice of Reasons for Refusal," mailed by the Japanese Patent Office on Jan. 21, 2025, which corresponds to Japanese Patent Application No. 2021-126036 and is related to U.S. Appl. No. 17/813,244; with English language translation.

*Primary Examiner* — Jack Dinh
(74) *Attorney, Agent, or Firm* — Studebaker Brackett PLLC

(57) ABSTRACT

The zoom lens consists of, in order from an object side, a first lens group that has a positive refractive power, a second lens group that has a negative refractive power, a middle group that includes one or more lens groups, and a final lens group. The middle group has a positive refractive power as a whole throughout an entire zoom range. During zooming, a spacing between the first lens group and the second lens group changes, a spacing between the second lens group and the middle group changes, and a spacing between the middle group and the final lens group changes. The zoom lens satisfies predetermined conditional expressions.

53 Claims, 44 Drawing Sheets

EXAMPLE 1

(56) References Cited

U.S. PATENT DOCUMENTS

2020/0124833 A1 4/2020 Machida
2020/0257096 A1 8/2020 Ito

FOREIGN PATENT DOCUMENTS

| | | |
|---|---|---|
| JP | 2018-025623 A | 2/2018 |
| JP | 2018-180203 A | 11/2018 |
| JP | 2018-185390 A | 11/2018 |
| JP | 2019-020451 A | 2/2019 |
| JP | 2020-101736 A | 7/2020 |
| JP | 2020-177057 A | 10/2020 |
| JP | 2021-096331 A | 6/2021 |
| WO | 2016/017727 A1 | 2/2016 |
| WO | 2016/031256 A1 | 3/2016 |
| WO | 2018/074413 A1 | 4/2018 |
| WO | 2018/079520 A1 | 5/2018 |

* cited by examiner

EXAMPLE 1

EXAMPLE 1

EXAMPLE 2

EXAMPLE 3

EXAMPLE 3

EXAMPLE 4

EXAMPLE 4

EXAMPLE 5

EXAMPLE 5

EXAMPLE 6

FIG. 14 EXAMPLE 6

EXAMPLE 7

EXAMPLE 7

EXAMPLE 8

EXAMPLE 8

EXAMPLE 9

EXAMPLE 9

EXAMPLE 10

EXAMPLE 10

EXAMPLE 11

EXAMPLE 11

EXAMPLE 12

EXAMPLE 13

EXAMPLE 14

EXAMPLE 14

EXAMPLE 15

EXAMPLE 15

EXAMPLE 16

EXAMPLE 16

EXAMPLE 17

EXAMPLE 17

EXAMPLE 18

EXAMPLE 18

EXAMPLE 19

EXAMPLE 19

EXAMPLE 20

EXAMPLE 20

ZOOM LENS AND IMAGING APPARATUS

CROSS-REFERENCE TO RELATED APPLICATIONS

The present application claims priority under 35 U.S.C. § 119 to Japanese Patent Application No. 2021-126036, filed on Jul. 30, 2021. The above application is hereby expressly incorporated by reference, in its entirety, into the present application.

BACKGROUND

Technical Field

The technique of the present disclosure relates to a zoom lens and an imaging apparatus.

Related Art

In the related art, as a zoom lens that can be used in an imaging apparatus such as a digital camera, a zoom lens described in JP2016-126278A below is known.

In recent years, there has been a demand for a telephoto zoom lens that has a longer focal length at a telephoto end and that maintains favorable optical performance while maintaining a small size configuration.

SUMMARY

The present disclosure has been made in view of the above circumstances, and it is an object of the present invention to provide a telephoto zoom lens, which has a small size, has a longer focal length at the telephoto end, and maintains favorable optical performance, and an imaging apparatus comprising a telephoto zoom lens.

According to one aspect of the present disclosure, there is provided a zoom lens consisting of, in order from an object side to an image side: a first lens group that has a positive refractive power; a second lens group that has a negative refractive power; a middle group that includes one or more lens groups; and a final lens group. The middle group has a positive refractive power as a whole throughout an entire zoom range, during zooming, a spacing between the first lens group and the second lens group changes, a spacing between the second lens group and the middle group changes, and a spacing between the middle group and the final lens group changes, and in a case where the middle group includes a plurality of lens groups, all spacings of adjacent lens groups in the middle group change during zooming. Assuming that a maximum image height is IH, and a focal length of a whole system in a state in which an infinite distance object is in focus at a telephoto end is ft, Conditional Expression (1) is satisfied, which is represented by $$0.011 < IH/ft < 0.042 \tag{1}.$$

It is preferable that the zoom lens of the above-mentioned aspect satisfies Conditional Expression (1-1).

$$0.017 < IH/ft < 0.036 \tag{1-1}$$

It is preferable that the middle group includes at least one lens group that has a positive refractive power.

It is preferable that the final lens group has a negative refractive power.

It is preferable that the first lens group remains stationary with respect to an image plane during zooming.

It is preferable that the middle group includes at least one lens group that has a positive refractive power. In a case where a lens group disposed closest to the object side is a PA lens group among lens groups that have positive refractive powers and that are included in the middle group, it is preferable that the zoom lens of the above-mentioned aspect includes a stop closer to the image side than a lens disposed closest to the image side in the PA lens group.

Assuming that a distance on an optical axis from a lens surface closest to the object side in the first lens group to a lens surface closest to the image side in the first lens group is DG1, it is preferable that the zoom lens of the above-mentioned aspect satisfies Conditional Expression (2), which is represented by $$0.6 < DG1/IH < 2.5 \tag{2}.$$

It is more preferable that the zoom lens satisfies Conditional Expression (2-1), which is represented by $$0.7 < DG1/IH < 2.2 \tag{2-1}.$$

It is preferable that the middle group includes at least one lens group that has a positive refractive power. In a case where a lens group disposed closest to the object side is a PA lens group among lens groups that have positive refractive powers and that are included in the middle group, it is preferable that the zoom lens of the above-mentioned aspect includes at least one focusing group that moves along an optical axis during focusing, at a position closer to the image side than a lens disposed closest to the image side in the PA lens group.

Assuming that a lateral magnification of the focusing group in a state in which the infinite distance object is in focus at the telephoto end is βft, a combined lateral magnification of all lenses closer to the image side than the focusing group in a state in which the infinite distance object is in focus at the telephoto end is βfrt, βfrt=1 in a case where the lens is not disposed closer to the image side than the focusing group, B is defined to be represented by $B = |(1-\beta ft^2) = \beta frt^2|$, and B in the focusing group in which B is a maximum value among the focusing groups included in the zoom lens is Bm in a case where the zoom lens includes a plurality of the focusing groups, and B=Bm in a case where the zoom lens includes only one focusing group, it is preferable that the zoom lens of the above-mentioned aspect satisfies Conditional Expression (3), which is represented by $$3.5 < Bm < 10 \tag{3}.$$

It is more preferable that the zoom lens satisfies Conditional Expression (3-1), which is represented by $$3.8 < Bm < 9.4 \tag{3-1}.$$

It is preferable that the middle group includes at least one lens group that has a positive refractive power. In a case where a lens group disposed closest to the object side is a PA lens group among lens groups that have positive refractive powers and that are included in the middle group, it is preferable that the zoom lens of the above-mentioned aspect includes a vibration-proof group that moves in a direction intersecting with an optical axis during image blur correction, at a position closer to the image side than a lens disposed closest to the image side in the PA lens group.

Assuming that a lateral magnification of the vibration-proof group in a state in which the infinite distance object is in focus at the telephoto end is βist, a combined lateral magnification of all lenses closer to the image side than the vibration-proof group in a state in which the infinite distance object is in focus at the telephoto end is βisrt, and βisrt=1 in a case where the lens is not disposed closer to the image side than the vibration-proof group, it is preferable that the zoom lens of the above-mentioned aspect satisfies Conditional Expression (4), which is represented by $$1.7<|(1-\beta ist)\times\beta isrt|<4.8 \qquad (4).$$

It is preferable that the vibration-proof group consists of one positive lens and two negative lenses.

Assuming that an Abbe number of a positive lens of the first lens group based on a d line is $v1p$, it is preferable that the zoom lens of the above-mentioned aspect includes at least one positive lens satisfying Conditional Expression (5), which is represented by $$81.7<v1p<105 \qquad (5).$$

Assuming that an average value of Abbe numbers of all positive lenses of the first lens group based on a d line is $v1pave$, it is preferable that the zoom lens of the above-mentioned aspect satisfies Conditional Expression (6), which is represented by $$81.7<v1pave<105 \qquad (6).$$

Assuming that an Abbe number of a positive lens of the first lens group based on a d line is $v1p$ and a partial dispersion ratio thereof between a g line and an F line is $\theta p$, and $$\Delta\theta 1p = \theta 1p + 0.00162 \times v1p - 0.64159,$$

it is preferable that the zoom lens of the above-mentioned aspect includes at least one positive lens satisfying Conditional Expression (7), which is represented by $$0.03<\Delta\theta 1p<0.06 \qquad (7).$$

Assuming that an Abbe number of a positive lens of the first lens group based on a d line is $v1p$ and a partial dispersion ratio thereof between a g line and an F line is $\theta 1p$, $$\Delta\theta 1p = \theta 1p + 0.00162 \times v1p - 0.64159, \text{ and}$$

an average value of $\Delta\theta 1p$ of all positive lenses of the first lens group is $\Delta\theta 1pave$,
it is preferable that the zoom lens of the above-mentioned aspect satisfies Conditional Expression (8), which is represented by $$0.03<\Delta\theta 1pave<0.06 \qquad (8).$$

It is preferable that the middle group includes at least one lens group that has a positive refractive power. Assuming that an Abbe number of a positive lens disposed in a lens group that has a strongest refractive power among lens groups that have positive refractive powers and that are included in the middle group based on a d line is $vMp$, it is preferable that the zoom lens of the above-mentioned aspect includes at least one positive lens satisfying Conditional Expression (9), which is represented by $$81.7<vMp<105 \qquad (9).$$

It is preferable that the middle group includes at least one lens group that has a positive refractive power. Assuming that an average value of Abbe numbers of all positive lenses disposed in a lens group that has a strongest refractive power among lens groups that have positive refractive powers and that are included in the middle group based on a d line is $vMpave$, it is preferable that the zoom lens of the above-mentioned aspect satisfies Conditional Expression (10), which is represented by $$81.7<vMpave<105 \qquad (10).$$

It is preferable that the middle group includes at least one lens group that has a positive refractive power. Assuming that an Abbe number of a positive lens disposed in a lens group that has a strongest refractive power among lens groups that have positive refractive powers and that are included in the middle group based on a d line is $vMp$ and a partial dispersion ratio thereof between a g line and an F line is $\theta Mp$, and $$\Delta\theta Mp = \theta Mp + 0.00162 \times vMp - 0.64159,$$

it is preferable that the zoom lens of the above-mentioned aspect includes at least one positive lens satisfying Conditional Expression (11), which is represented by $$0.014<\Delta\theta Mp<0.06 \qquad (11).$$

It is preferable that the middle group includes at least one lens group that has a positive refractive power. Assuming that an Abbe number of a positive lens disposed in a lens group that has a strongest refractive power among lens groups that have positive refractive powers and that are included in the middle group based on a d line is $vMp$ and a partial dispersion ratio thereof between a g line and an F line is $\theta Mp$, and $$\Delta\theta Mp = \theta Mp + 0.00162 \times vMp - 0.64159, \text{ and}$$

an average value of $\Delta\theta Mp$ of all positive lenses of a lens group that has a strongest refractive power among the lens groups that have positive refractive powers and that are included in the middle group is $\Delta\theta Mpave$,
it is preferable that the zoom lens of the above-mentioned aspect satisfies Conditional Expression (12), which is represented by $$0.014<\Delta\theta Mpave<0.06 \qquad (12).$$

It is preferable that the first lens group includes at least one negative lens. Assuming that a refractive index of a negative lens of the first lens group at a d line is $N1n$, it is preferable that the zoom lens of the above-mentioned aspect includes at least one negative lens satisfying Conditional Expression (13), which is represented by $$1.55<N1n<1.8 \qquad (13).$$

It is preferable that the second lens group includes at least one positive lens. Assuming that an Abbe number of the positive lens of the second lens group based on a d line is $v2p$, it is preferable that the zoom lens of the above-mentioned aspect includes at least one positive lens satisfying Conditional Expression (14), which is represented by $$15<v2p<25 \qquad (14).$$

It is preferable that the second lens group includes at least one positive lens. Assuming that an Abbe number of a positive lens of the second lens group based on a d line is $v2p$ and a partial dispersion ratio thereof between a g line and an F line is $\theta 2p$, and $$\Delta\theta 2p = \theta 2p + 0.00162 \times v2p - 0.64159,$$

it is preferable that the zoom lens of the above-mentioned aspect includes at least one positive lens satisfying Conditional Expression (15), which is represented by $$0.015<\Delta\theta 2p<0.06 \qquad (15).$$

Assuming that an Abbe number of a negative lens of the second lens group based on a d line is $v2n$, it is preferable that the zoom lens of the above-mentioned aspect includes at least one negative lens satisfying Conditional Expression (16), which is represented by $$70<v2n<105 \qquad (16).$$

Assuming that an Abbe number of a negative lens of the second lens group based on a d line is ν2n and a partial dispersion ratio thereof between a g line and an F line is θ2n, and $$\Delta\theta 2n = \theta 2n + 0.00162 \times \nu 2n - 0.64159,$$

it is preferable that the zoom lens of the above-mentioned aspect includes at least one negative lens satisfying Conditional Expression (17), which is represented by $$0.03 < \Delta\theta 2n < 0.06 \tag{17}.$$

Assuming that a lateral magnification of the final lens group in a state in which the infinite distance object is in focus at the telephoto end is βEt, it is preferable that the zoom lens of the above-mentioned aspect satisfies Conditional Expression (18), which is represented by $$1.4 < \beta Et < 4.7 \tag{18}.$$

It is preferable that the middle group includes at least one lens group that has a positive refractive power. Assuming that a focal length of a lens group that has a strongest refractive power among lens groups that have positive refractive powers and that are included in the middle group is fMp, and a focal length of the whole system in a state in which the infinite distance object is in focus at a wide angle end is fw, it is preferable that the zoom lens of the above-mentioned aspect satisfies Conditional Expression (19), which is represented by $$0.1 < fMp/(fw \times ft)^{1/2} < 0.7 \tag{19}.$$

Assuming that a lateral magnification of the second lens group in a state in which the infinite distance object is in focus at the telephoto end is β2t, it is preferable that the zoom lens of the above-mentioned aspect satisfies Conditional Expression (20), which is represented by $$0.9 < |\beta 2t| < 4.6 \tag{20}.$$

It is preferable that the zoom lens includes a vibration-proof group that moves in a direction intersecting with an optical axis during image blur correction, and it is preferable that the zoom lens of the above-mentioned aspect includes a stationary group that is disposed adjacent to the vibration-proof group on the image side of the vibration-proof group, that has a refractive power of which a sign is opposite to a sign of a refractive power of the vibration-proof group, and that remains stationary with respect to an image plane during zooming and focusing. Assuming that a focal length of the vibration-proof group is fis, and a focal length of the stationary group is fisr, it is preferable that the zoom lens of the above-mentioned aspect satisfies Conditional Expression (21), which is represented by $$0.32 < |fis/fisr| < 1.1 \tag{21}.$$

It is preferable that the first lens group includes at least one negative lens. Assuming that a center thickness of a negative lens disposed closest to the object side among negative lenses included in the first lens group is D1n, and an F number in a state in which the infinite distance object is in focus at the telephoto end is FNot, it is preferable that the zoom lens of the above-mentioned aspect satisfies Conditional Expression (22), which is represented by $$0.01 < D1n/(ft/FNot) < 0.04 \tag{22}.$$

It is preferable that a single lens that has a negative refractive power is disposed closest to the object side in the first lens group.

Assuming that a focal length of the middle group in a state in which the infinite distance object is in focus at a wide angle end is fMw, a focal length of the middle group in a state in which the infinite distance object is in focus at the telephoto end is fMt, and a focal length of the whole system in a state in which the infinite distance object is in focus at the wide angle end is fw, it is preferable that the zoom lens of the above-mentioned aspect satisfies Conditional Expression (23), which is represented by $$0.16 < (fMw \times fMt)^{1/2}/(fw \times ft)^{1/2} < 0.3 \tag{23}.$$

It is preferable that the middle group includes at least one lens group that has a positive refractive power, and a lens group disposed closest to the object side is a PA lens group among lens groups that have positive refractive powers and that are included in the middle group. Assuming that a focal length of the PA lens group is fPA, and a focal length of the second lens group is f2, it is preferable that the zoom lens of the above-mentioned aspect satisfies Conditional Expression (24), which is represented by $$0.25 < |f2|/fPA < 3 \tag{24}.$$

It is preferable that the final lens group remains stationary with respect to an image plane during zooming.

It is preferable that the second lens group and all lens groups in the middle group move during zooming.

It is preferable that the middle group includes at least one lens group that has a positive refractive power. In a case where a lens group disposed closest to the object side is a PA lens group among lens groups that have positive refractive powers and that are included in the middle group, it is preferable that a lens group that has a strongest refractive power among lens groups that have positive refractive powers and that are included in the middle group is the PA lens group.

Assuming that a sum of a back focal length of the whole system at an air-equivalent distance and a distance on an optical axis from a lens surface closest to the object side in the first lens group to a lens surface closest to the image side in the final lens group in a state in which the infinite distance object is in focus at the telephoto end is TLt, it is preferable that the zoom lens of the above-mentioned aspect satisfies Conditional Expression (25), which is represented by $$0.42 < TLt/ft < 0.94 \tag{25}.$$

It is preferable that the first lens group includes, in order from the object side to the image side, a negative lens, a positive lens, and a positive lens.

It is preferable that the first lens group consists of, in order from the object side to the image side, a negative lens, a positive lens, and a positive lens.

It is preferable that the zoom lens includes at least one focusing group that moves along an optical axis during focusing, and the at least one focusing group consists of two or fewer lenses.

Assuming that a focal length of the final lens group is fE, it is preferable that the zoom lens of the above-mentioned aspect satisfies Conditional Expression (26), which is represented by $$0.02 < |fE|/ft < 0.2 \tag{26}.$$

It is preferable that the zoom lens includes at least one focusing group that moves along an optical axis during focusing, and the at least one focusing group has a negative refractive power.

It is preferable that the zoom lens includes a vibration-proof group that moves in a direction intersecting with an optical axis during image blur correction, and the vibration-proof group has a negative refractive power.

The middle group may be configured to include at least two lens groups that have positive refractive powers.

All of lens groups included in the middle group may be configured to be lens groups that have positive refractive powers.

In the final lens group, at least one focusing group that moves along an optical axis during focusing and a vibration-proof group that moves in a direction intersecting with the optical axis during image blur correction may be configured to be disposed. In that case, it is preferable that at least one focusing group is disposed closer to the object side than the vibration-proof group.

It is preferable that the middle group includes at least one lens group that has a positive refractive power, and a lens group that has a strongest refractive power among lens groups that have positive refractive powers and that are included in the middle group includes at least three positive lenses and at least one negative lens.

Assuming that a lateral magnification of the second lens group in a state in which the infinite distance object is in focus at the telephoto end is β2t, and a lateral magnification of the second lens group in a state in which the infinite distance object is in focus at a wide angle end is β2w, it is preferable that the zoom lens of the above-mentioned aspect satisfies Conditional Expression (27), which is represented by $$2.5 < \beta 2t/\beta 2w < 7.9 \quad (27).$$

It is preferable that the middle group includes at least one lens group that has a positive refractive power, and a lens group disposed closest to the object side is a PA lens group among lens groups that have positive refractive powers and that are included in the middle group. Assuming that a combined lateral magnification of all lenses closer to the image side than the PA lens group in a state in which the infinite distance object is in focus at the telephoto end is βPArt, it is preferable that the zoom lens of the above-mentioned aspect satisfies Conditional Expression (28), which is represented by $$0.8 < \beta PArt < 4.5 \quad (28).$$

Assuming that a focal length of the first lens group is f1, and a focal length of the whole system in a state in which the infinite distance object is in focus at the wide angle end is fw, it is preferable that the zoom lens of the above-mentioned aspect satisfies Conditional Expression (29), which is represented by $$0.43 < f1/(fw \times ft)^{1/2} < 1.03 \quad (29).$$

Assuming that a focal length of the second lens group is f2, and a focal length of the whole system in a state in which the infinite distance object is in focus at a wide angle end is fw, it is preferable that the zoom lens of the above-mentioned aspect satisfies Conditional Expression (30), which is represented by $$0.23 < |f2|/fw < 0.66 \quad (30).$$

It is preferable that the zoom lens includes at least one focusing group that moves along an optical axis during focusing, and the at least one focusing group consists of one negative lens and one positive lens. Assuming that a focal length of the positive lens of the focusing group consisting of one negative lens and one positive lens is ffp, and a focal length of the negative lens of the focusing group consisting of one negative lens and one positive lens is ffn, it is preferable that the zoom lens of the above-mentioned aspect satisfies Conditional Expression (31), which is represented by $$0.9 < ffp/|ffn| < 2.8 \quad (31).$$

Assuming that a focal length of the first lens group is f1, and a focal length of the second lens group is f2, it is preferable that the zoom lens of the above-mentioned aspect satisfies Conditional Expression (32), which is represented by $$2.1 < f1/|f2| < 4.8 \quad (32).$$

Assuming that a focal length of the second lens group is f2, and a focal length of the whole system in a state in which the infinite distance object is in focus at a wide angle end is fw, it is preferable that the zoom lens of the above-mentioned aspect satisfies Conditional Expression (33), which is represented by $$0.13 < |f2|/(fw \times ft)^{1/2} < 0.32 \quad (33).$$

It is preferable that the middle group includes at least one lens group that has a positive refractive power, and a lens group disposed closest to the object side is a PA lens group among lens groups that have positive refractive powers and that are included in the middle group. Assuming that a focal length of the PA lens group is fPA, and a focal length of the whole system in a state in which the infinite distance object is in focus at the wide angle end is fw, it is preferable that the zoom lens of the above-mentioned aspect satisfies Conditional Expression (34), which is represented by $$0.12 < fPA/(fw \times ft)^{1/2} < 0.45 \quad (34).$$

Assuming that a focal length of the final lens group is fE, and a focal length of the whole system in a state in which the infinite distance object is in focus at the wide angle end is fw, it is preferable that the zoom lens of the above-mentioned aspect satisfies Conditional Expression (35), which is represented by $$0.06 < |fE|/(fw \times ft)^{1/2} < 0.25 \quad (35).$$

It is preferable that the zoom lens includes at least one focusing group that moves along an optical axis during focusing. Assuming that a focal length of the focusing group is ff, and a focal length of the whole system in a state in which the infinite distance object is in focus at a wide angle end is fw, it is preferable that the zoom lens of the above-mentioned aspect includes at least one focusing group satisfying Conditional Expression (36), which is represented by $$0.14 < |ff|/(fw \times ft)^{1/2} < 0.7 \quad (36).$$

It is preferable that the zoom lens includes a vibration-proof group that moves in a direction intersecting with an optical axis during image blur correction. Assuming that a focal length of the vibration-proof group is fis, and a focal length of the whole system in a state in which the infinite distance object is in focus at a wide angle end is fw, it is preferable that the zoom lens of the above-mentioned aspect satisfies Conditional Expression (37), which is represented by $$0.05 < |fis|/(fw \times ft)^{1/2} < 0.15 \quad (37).$$

It is preferable that the middle group includes a lens pair consisting of a negative lens and a positive lens that are adjacent to each other with an air spacing interposed therebetween. Assuming that a spacing on an optical axis of the air spacing in the lens pair of the middle group is DMnp, a curvature radius of an object side surface of an air lens formed by the air spacing in the lens pair of the middle group is RMnpf, and a curvature radius of an image side surface of the air lens formed by the air spacing in the lens pair of the middle group is RMnpr, it is preferable that the zoom lens of the above-mentioned aspect includes at least one lens pair satisfying Conditional Expression (38), which is represented by $$0.002<DMnp/(RMnpf+RMnpr)<0.1 \quad (38).$$

It is preferable that the final lens group includes a lens pair consisting of a negative lens and a positive lens that are adjacent to each other with an air spacing interposed therebetween. Assuming that a spacing on an optical axis of the air spacing in the lens pair of the final lens group is DEnp, a curvature radius of an object side surface of an air lens formed by the air spacing in the lens pair of the final lens group is REnpf, and a curvature radius of an image side surface of the air lens formed by the air spacing in the lens pair of the final lens group is REnpr, it is preferable that the zoom lens of the above-mentioned aspect includes at least one lens pair satisfying Conditional Expression (39), which is represented by $$-0.5<DEnp/(REnpf+REnpr)<-0.01 \quad (39).$$

The imaging apparatus according to another aspect of the present disclosure includes a zoom lens according to the above-mentioned aspect of the present disclosure.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the terms "group that has a positive refractive power" and "group has a positive refractive power" mean that the group as a whole has a positive refractive power. Similarly, the terms "group that has a negative refractive power" and "group has a negative refractive power" mean that the group as a whole has a negative refractive power. The term "a lens that has a positive refractive power" and the term "a positive lens" are synonymous. The term "a lens that has a negative refractive power" and the term "negative lens" are synonymous. Each of the terms "first lens group", "second lens group", "middle group", "lens group", "final lens group", "focusing group", "vibration-proof group", and "stationary group" in the present specification is not limited to a configuration consisting of a plurality of lenses, but may be a configuration consisting of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The curvature radius, the sign of the refractive power, and the surface shape of the lens including the aspherical surface will be used in terms of the paraxial region unless otherwise specified. The sign of the curvature radius of the convex surface facing toward the object side is positive, and the sign of the curvature radius of the convex surface facing toward the image side is negative.

In the present specification, the term "whole system" means "zoom lens". The "back focal length at the air-equivalent distance" is the air-equivalent distance on the optical axis from the lens surface closest to the image side in the whole system to the image plane. The "focal length" used in a conditional expression is a paraxial focal length.

The values used in Conditional Expressions are values in a case where the d line is used as a reference in a state in which the infinite distance object is in focus unless otherwise specified.

According to the present disclosure, it is possible to provide a telephoto zoom lens which has a small size, has a longer focal length at the telephoto end, and maintains favorable optical performance, and an imaging apparatus including the zoom lens.

DESCRIPTION OF EMBODIMENTS

Hereinafter, embodiments of the present disclosure will be described with reference to the accompanying drawings.

Figure 1:
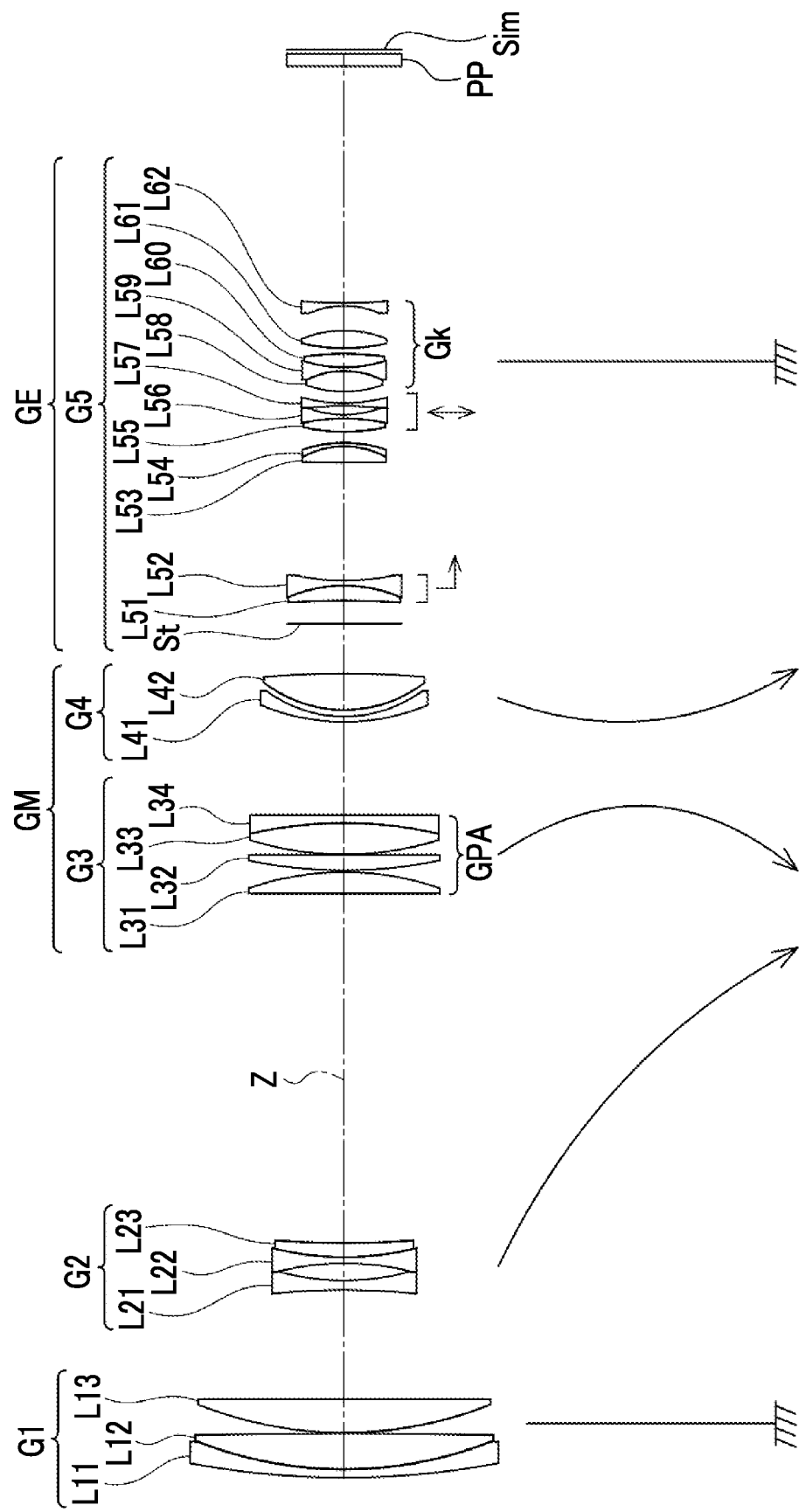
FIG. 1 is a cross-sectional view showing a configuration of a zoom lens according to an embodiment and a diagram showing movement loci thereof, the zoom lens corresponding to a zoom lens of Example 1.
Figure 2:
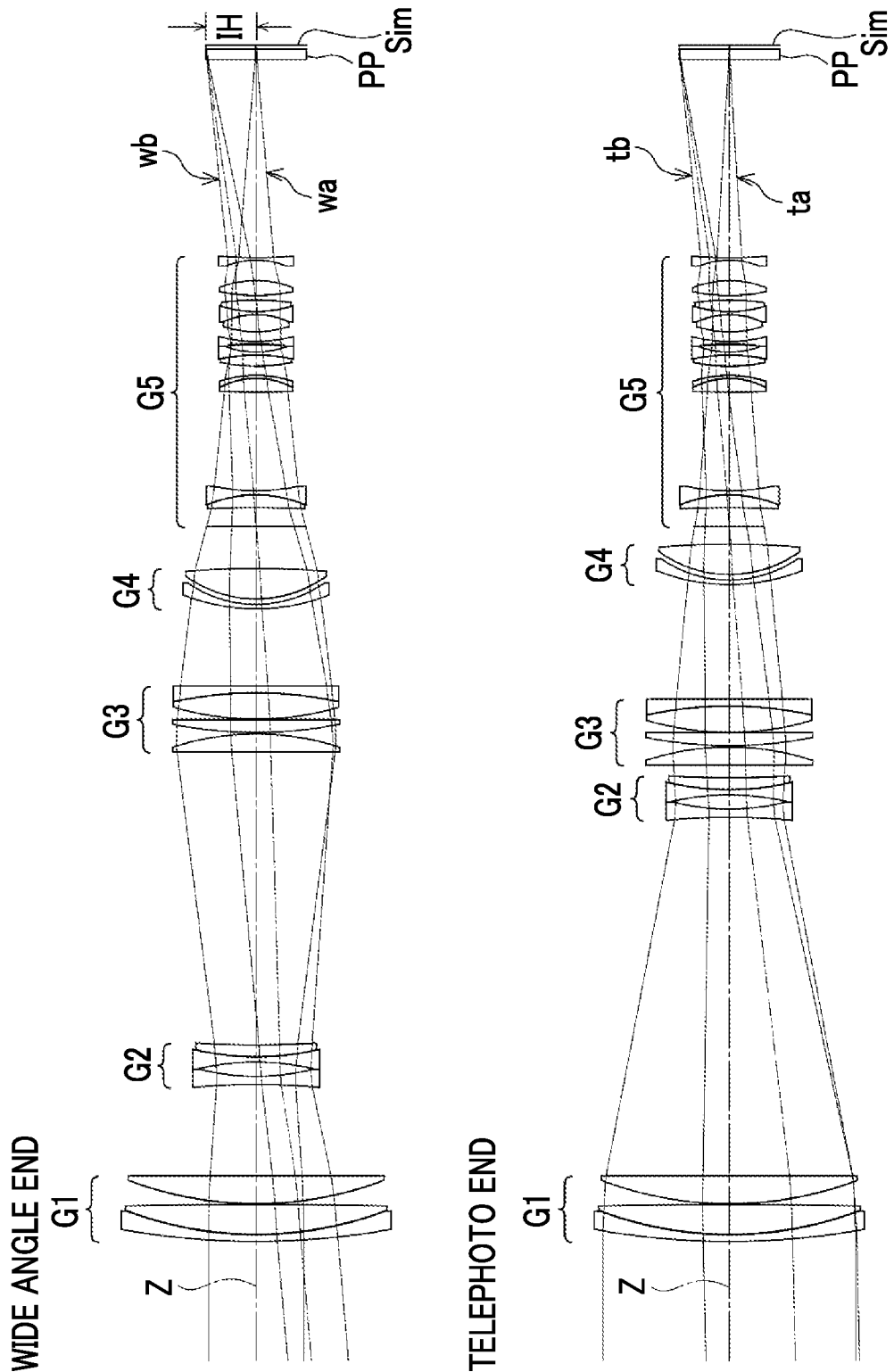
FIG. 2 is a diagram showing a configuration and a luminous flux in each zooming state of the zoom lens of FIG. 1.

FIG. 1 shows a cross-sectional view of a configuration and movement loci of a zoom lens according to an embodiment of the present disclosure at a wide angle end. Further, FIG. 2 shows a cross-sectional view and a luminous flux of the configuration of the zoom lens of FIG. 1 in each state. In FIG. 2, the upper part labeled "wide angle end" shows a wide angle end state, and the lower part labeled "telephoto end" shows a telephoto end state. FIG. 2 shows, as the luminous flux, an on-axis luminous flux wa and a luminous flux wb with a maximum image height IH in the wide angle end state and an on-axis luminous flux to and a luminous flux tb with the maximum image height in the telephoto end state. The examples shown in FIGS. 1 and 2 correspond to a zoom lens of Example 1 described later. FIGS. 1 and 2 show situations where an infinite distance object is in focus, the left side thereof is an object side, and the right side thereof is an image side. Hereinafter, the zoom lens according to the embodiment of the present disclosure will be described mainly with reference to FIG. 1.

FIG. 1 shows an example in which an optical member PP of which the incident surface and emission surface are parallel is disposed between the zoom lens and an image plane Sim under the assumption that the zoom lens is applied to an imaging apparatus. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The zoom lens of the present disclosure consists of, in order from the object side to the image side along an optical axis Z, a first lens group G1 that has a positive refractive power, a second lens group G2 that has a negative refractive power, a middle group GM that includes one or more lens groups, and a final lens group GE. The middle group GM has a positive refractive power as a whole throughout the entire zoom range. During zooming, the spacing between the first lens group G1 and the second lens group G2 changes, the spacing between the second lens group G2 and the middle group GM changes, and the spacing between the middle group GM and the final lens group GE changes. Further, in a case where the middle group GM includes a plurality of lens groups, all the spacings of adjacent lens groups in the middle group GM change during zooming. According to the above-mentioned configuration, there is an advantage in achieving an increase in focal length at the telephoto end, and there is also an advantage in realizing a zoom lens having a high zoom ratio while maintaining reduction in size.

The "first lens group G1", "second lens group G2", "lens groups" included in the middle group GM, and "final lens group GE" in the present specification are constituent parts of the zoom lens, and are parts which are separated by the air spacings that change during zooming, and each of which includes at least one lens. During zooming, each lens group moves or remains stationary, and the mutual spacing between the lenses in each lens group does not change. That is, in the present specification, one lens group is a group in which the spacing between adjacent groups changes during zooming and the total spacing between adjacent lenses does not change within itself.

For example, the zoom lens of FIG. 1 consists of a first lens group G1, a second lens group G2, a third lens group G3, a fourth lens group G4, and a fifth lens group G5, in order from the object side to the image side. In the example of FIG. 1, the middle group GM consists of a third lens group G3 and a fourth lens group G4, and the final lens group GE consists of a fifth lens group G5.

For example, each lens group in FIG. 1 is composed of lenses described below. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side. The aperture stop St shown in FIG. 1 does not indicate the shape and size, but indicates the position in an optical axis direction.

In the example of FIG. 1, during zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. A grounding symbol under each of the first lens group G1 and the fifth lens group G5 in FIG. 1 indicates that the lens group remains stationary with respect to the image plane Sim during zooming. A curved arrow under each of the second lens group G2, the third lens group G3, and the fourth lens group G4 in FIG. 1 shows an approximate movement locus of each of these lens groups during zooming from the wide angle end to the telephoto end.

During zooming, it is preferable that the first lens group G1 remains stationary with respect to the image plane Sim. In such a case, fluctuation in center of gravity of the lens system during zooming can be reduced. Therefore, the convenience during imaging can be enhanced.

During zooming, it is preferable that the second lens group G2 and all the lens groups in the middle group GM move. In such a case, it is possible to suppress fluctuation in aberrations during zooming.

During zooming, it is preferable that the final lens group GE remains stationary with respect to the image plane Sim. In such a case, it is easy to simplify a mechanism for operating each lens group during zooming.

It is preferable that the middle group GM includes at least one lens group that has a positive refractive power. In such a case, there is an advantage in obtaining a high zoom ratio while maintaining reduction in size.

It is preferable that the middle group GM includes at least two lens groups that have positive refractive powers. In such a case, there is an advantage in suppressing spherical aberration.

The lens group included in the middle group GM may be configured to be a lens group that has a positive refractive power. With such a configuration, there is an advantage in achieving reduction in size.

In a case where the middle group GM includes at least one lens group that has a positive refractive power, a lens group that has a strongest refractive power among lens groups that have positive refractive powers and that are included in the middle group GM includes at least three positive lenses and at least one negative lens. In such a case, there is an advantage in correcting longitudinal chromatic aberration.

In a case where there is only one lens group that has a positive refractive power included in the middle group GM, the only one lens group that has a positive refractive power is referred to as "a lens group that has the strongest refractive power among the lens groups that have positive refractive powers and that are included in the middle group GM". The point is the same in the following description.

In the present specification, among the lens groups that have positive refractive powers and that are included in the middle group GM, the lens group disposed closest to the object side is referred to as a PA lens group GPA. In the example of FIG. 1, the third lens group G3 corresponds to the PA lens group GPA.

Among the lens groups that have positive refractive powers and that are included in the middle group GM, it is preferable that the lens group that has the strongest refractive power is the PA lens group GPA. In such a case, there is an advantage in achieving reduction in size.

It is preferable that the zoom lens includes an aperture stop St closer to the image side than a lens disposed closest to the image side in the PA lens group GPA. In such a case, it is easy to reduce the diameter of the aperture stop St, and there is an advantage in achieving reduction in size. For example, the aperture stop St in FIG. 1 is disposed closest to the object side in the final lens group GE.

It is preferable that the final lens group GE has a negative refractive power. In such a case, there is an advantage in achieving reduction in size of the middle group GM.

It is preferable that the zoom lens includes at least one focusing group that moves along the optical axis Z during focusing from an infinite distance object to a close range object. It is preferable that the focusing group consists of two or fewer lenses. In such a case, there is an advantage in achieving reduction in weight of the focusing group. Further, at least one focusing group may be configured to have a negative refractive power. In such a case, the positive refractive power of the group on the object side of the focusing group becomes stronger. Therefore, a more concentrated luminous flux is incident on the focusing group. As a result, the effective diameter of the focusing group can be reduced, and there is an advantage in achieving reduction in weight of the focusing group.

It is preferable that the zoom lens includes at least one focusing group that moves along the optical axis Z during focusing, at a position closer to the image side than the lens disposed closest to the image side in the PA lens group GPA. In such a case, there is an advantage in achieving reduction in size of the focusing group. For example, the focusing group of FIG. 1 consists of two lenses L51 and L52. The parentheses and right-pointing arrows below the lenses L51 and L52 in FIG. 1 indicate that the focusing group consists of these two lenses and that the focusing group moves toward the image side during focusing from the infinite distance object to the close range object.

It is preferable that the zoom lens includes a vibration-proof group that moves in a direction intersecting with the optical axis Z during image blur correction. It is preferable that the vibration-proof group has a negative refractive power. In such a case, the positive refractive power of the group on the object side of the vibration-proof group becomes strong. Therefore, a more concentrated luminous flux is incident on the vibration-proof group. As a result, the effective diameter of the vibration-proof group can be reduced, and there is an advantage in achieving reduction in weight of the vibration-proof group.

It is preferable that the zoom lens includes a vibration-proof group that moves in a direction intersecting with the optical axis Z during image blur correction, at a position closer to the image side than the lens disposed closest to the image side in the PA lens group GPA. In such a case, there is an advantage in achieving reduction in size of the vibration-proof group. For example, the vibration-proof group of FIG. 1 consists of three lenses L55 to L57. The parentheses and double-headed arrows below the lenses L55 to L57 in FIG. 1 indicate that the vibration-proof group consists of these three lenses.

In the final lens group GE, at least one focusing group that moves along the optical axis Z during focusing and a vibration-proof group that moves in a direction intersecting with the optical axis Z during image blur correction may be configured to be disposed. In such a case, since the mechanism can be packed in a constituent unit of one lens group, it is easy to simplify a mechanism for operating the lens groups during zooming. As described above, in a case where the final lens group GE includes at least one focusing group and the vibration-proof group, it is preferable that at least one focusing group is disposed closer to the object side than the vibration-proof group. In such a case, there is an advantage in achieving reduction in size of the vibration-proof group.

Next, preferable and possible configurations regarding conditional expressions of the zoom lens of the present disclosure will be described. In the following description of conditional expressions, in order to avoid redundant descriptions, the same symbols are used for those having the same definition, and some duplicate descriptions of the symbols will not be repeated. Further, in the following description, the term "zoom lens of the present disclosure" is also simply referred to as a "zoom lens" in order to avoid redundant description.

Assuming that a maximum image height is IH and a focal length of the whole system in a state in which the infinite distance object is in focus at the telephoto end is ft, it is preferable that the zoom lens satisfies Conditional Expression (1). By not allowing the corresponding value of Conditional Expression (1) to be equal to or less than the lower limit, there is an advantage in achieving reduction in size while suppressing various aberrations. By not allowing the corresponding value of Conditional Expression (1) to be equal to or greater than the upper limit, it is easy to capture an image of a distant subject in an enlarged manner. In order to obtain more favorable characteristics, it is more preferable that the zoom lens satisfies Conditional Expression (1-1), and it is yet more preferable that the zoom lens satisfies Conditional Expression (1-2).

$$0.011 < \mathrm{IH}/ft < 0.042 \tag{1}$$

$$0.017 < \mathrm{IH}/ft < 0.036 \tag{1-1}$$

$$0.021 < \mathrm{IH}/ft < 0.031 \tag{1-2}$$

Figure 3:
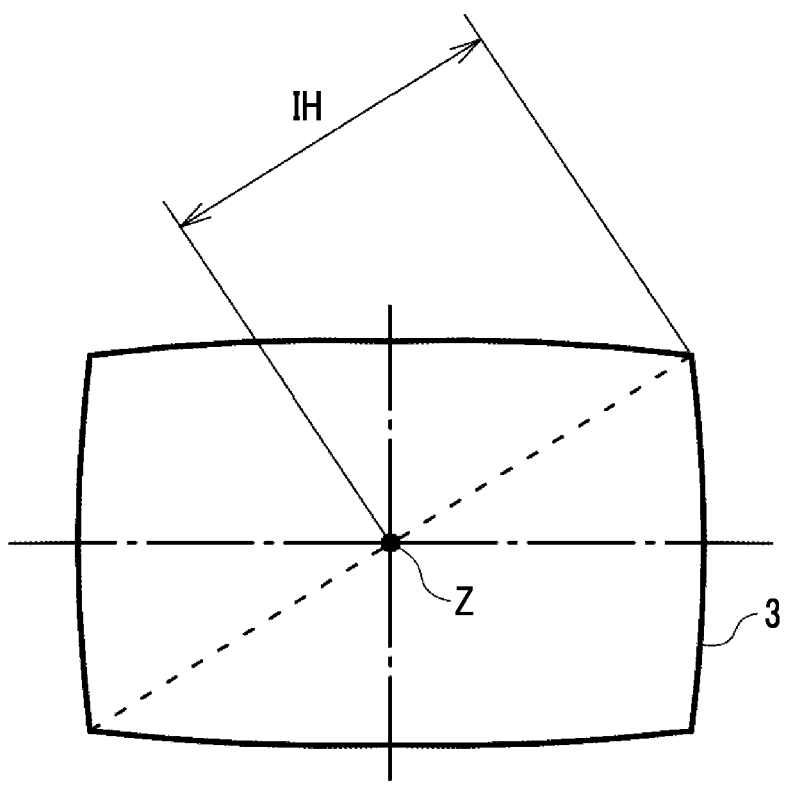
FIG. 3 is a diagram for explaining a maximum image height.

For example, the upper part of FIG. 2 shows the maximum image height IH. In the present specification, the maximum image height IH is a half number of the length that is the longest in the linear distance in the imaging region used as a captured image in the image plane Sim. For example, in a case where the imaging region is rectangular, the half number of the diagonal length is the maximum image height IH, and in a case where the imaging region is circular, the radius is the maximum image height IH. Even in a case where a region 3 having a barrel shape in the plane perpendicular to the optical axis Z as shown in FIG. 3 is used as the imaging region, the half number of the longest linear distance in the region is the maximum image height IH. Further, in a case of an imaging apparatus in which the imaging region used as the captured image is moved in a direction intersecting with the optical axis Z to perform image blur correction, the value is set in a state in which image blur correction is not performed.

Assuming that a distance on the optical axis from the lens surface closest to the object side in the first lens group G1 to the lens surface closest to the image side in the first lens group G1 is DG1 and the maximum image height is IH, it is preferable that the zoom lens satisfies Conditional Expression (2). By not allowing the corresponding value of Conditional Expression (2) to be equal to or less than the lower limit, there is an advantage in suppressing longitudinal chromatic aberration. By not allowing the corresponding value of Conditional Expression (2) to be equal to or greater than the upper limit, there is an advantage in achieving reduction in weight. In order to obtain more favorable characteristics, it is more preferable that the zoom lens satisfies Conditional Expression (2-1), and it is yet more preferable that the zoom lens satisfies Conditional Expression (2-2).

$$0.6 < DG1/\mathrm{IH} < 2.5 \tag{2}$$

$$0.7 < DG1/\mathrm{IH} < 2.2 \tag{2-1}$$

$$0.76 < DG1/\mathrm{IH} < 2.03 \tag{2-2}$$

It is preferable that the zoom lens satisfies Conditional Expression (3) with respect to the focusing group. Here, it is assumed that a lateral magnification of the focusing group in a state in which the infinite distance object is in focus at the telephoto end is $\beta ft$, and a combined lateral magnification of all lenses closer to the image side than the focusing group in a state in which the infinite distance object is in focus at the telephoto end is $\beta frt$. In a case where the lens is not disposed closer to the image side than the focusing group, $\beta frt=1$. Then, B is defined to be represented by $B=|(1-\beta ft^2) \times \beta frt^2|$. B in the focusing group in which B is a maximum value among the focusing groups included in the zoom lens is Bm in a case where the zoom lens includes a plurality of the focusing groups, and B=Bm in a case where the zoom lens includes only one focusing group. B defined above is a ratio of the amount of movement of the image plane to the unit amount of movement of the focusing group. By not allowing the corresponding value of Conditional Expression (3) to be equal to or less than the lower limit, there is an advantage in achieving reduction in size. By not allowing the corresponding value of Conditional Expression (3) to be equal to or greater than the upper limit, there is an advantage in suppressing fluctuation in aberrations during focusing. In order to obtain more favorable characteristics, it is more preferable that the zoom lens satisfies Conditional Expression (3-1), and it is yet more preferable that the zoom lens satisfies Conditional Expression (3-2).

$$3.5 < Bm < 10 \tag{3}$$

$$3.8 < Bm < 9.4 \tag{3-1}$$

$$4.2 < Bm < 9.2 \tag{3-2}$$

It is preferable that the zoom lens satisfies Conditional Expression (4) with respect to the vibration-proof group. Here, it is assumed that a lateral magnification of the vibration-proof group in a state in which the infinite distance object is in focus at the telephoto end is $\beta ist$, and a combined lateral magnification of all lenses closer to the image side than the vibration-proof group in a state in which the infinite distance object is in focus at the telephoto end is $\beta isrt$. In a case where the lens is not disposed closer to the image side than the vibration-proof group, $\beta isrt=1$. By not allowing the corresponding value of Conditional Expression (4) to be equal to or less than the lower limit, there is an advantage in suppressing the amount of movement of the vibration-proof group during image blur correction. By not allowing the corresponding value of Conditional Expression (4) to be equal to or greater than the upper limit, there is an advantage in suppressing fluctuation in aberrations during image blur correction. In order to obtain more favorable characteristics, it is more preferable that the zoom lens satisfies Conditional Expression (4-1), and it is yet more preferable that the zoom lens satisfies Conditional Expression (4-2).

$$1.7<|(1-\beta ist)\times\beta isr|<4.8 \quad (4)$$

$$1.9<|(1-\beta ist)\times\beta isr|<4 \quad (4\text{-}1)$$

$$2.1<|(1-\beta ist)\times\beta isr|<3.7 \quad (4\text{-}2)$$

Assuming that an Abbe number of the positive lens of the first lens group G1 based on a d line is ν1p, it is preferable that the zoom lens includes at least one positive lens satisfying Conditional Expression (5). By not allowing the corresponding value of Conditional Expression (5) to be equal to or less than the lower limit, there is an advantage in suppressing longitudinal chromatic aberration. By not allowing the corresponding value of Conditional Expression (5) to be equal to or greater than the upper limit, the availability of the material is increased, and a material that is easier to manufacture can be used. In order to obtain more favorable characteristics, it is more preferable that at least one positive lens satisfying Conditional Expression (5) satisfies Conditional Expression (5-1), and it is yet more preferable that the lens satisfies Conditional Expression (5-2).

$$81.7<\nu 1p<105 \quad (5)$$

$$83<\nu 1p<103 \quad (5\text{-}1)$$

$$89<\nu 1p<101 \quad (5\text{-}2)$$

Assuming that an average value of Abbe numbers of all the positive lenses of the first lens group G1 based on the d line is ν1pave, it is preferable that the zoom lens satisfies Conditional Expression (6). By not allowing the corresponding value of Conditional Expression (6) to be equal to or less than the lower limit, there is an advantage in suppressing longitudinal chromatic aberration. By not allowing the corresponding value of Conditional Expression (6) to be equal to or greater than the upper limit, the availability of the material is increased, and a material that is easier to manufacture can be used. In order to obtain more favorable characteristics, it is more preferable that the zoom lens satisfies Conditional Expression (6-1), and it is yet more preferable that the zoom lens satisfies Conditional Expression (6-2).

$$81.7<\nu 1pave<105 \quad (6)$$

$$83<\nu 1pave<103 \quad (6\text{-}1)$$

$$89<\nu 1pave<101 \quad (6\text{-}2)$$

Assuming that an Abbe number of the positive lens of the first lens group G1 based on the d line is ν1p and a partial dispersion ratio thereof between a g line and an F line is θ1p, in a case where Δθ1p=θ1p+0.00162×ν1p−0.64159, it is preferable that the zoom lens includes at least one positive lens satisfying Conditional Expression (7). Δθ1p is an amount that indicates anomalous dispersibility. By not allowing the corresponding value of Conditional Expression (7) to be equal to or less than the lower limit, there is an advantage in suppressing secondary longitudinal chromatic aberration. By not allowing the corresponding value of Conditional Expression (7) to be equal to or greater than the upper limit, the availability of the material is increased, and a material that is easier to manufacture can be used. In order to obtain more favorable characteristics, it is more preferable that at least one positive lens satisfying Conditional Expression (7) satisfies Conditional Expression (7-1), and it is yet more preferable that the lens satisfies Conditional Expression (7-2).

$$0.03<\Delta\theta 1p<0.06 \quad (7)$$

$$0.032<\Delta\theta 1p<0.058 \quad (7\text{-}1)$$

$$0.038<\Delta\theta 1p<0.056 \quad (7\text{-}2)$$

Assuming that refractive indexes for the g line, F line, and C line of a certain lens are Ng, NF, and NC, respectively, and the partial dispersion ratios thereof between the g line and F line of the lens is θg,F, θg,F is defined by the following expression.

$$\theta g,F=(Ng-NF)/(NF-NC)$$

Further, the "d line", "C line", "F line", and "g line" described in the present specification are emission lines. The wavelength of the d line is 587.56 nm (nanometers), the wavelength of the C line is 656.27 nm (nanometers), the wavelength of the F line is 486.13 nm (nanometers), and the wavelength of the g line is 435.84 nm (nanometers).

Assuming that an average value of Δθ1p of all the positive lenses of the first lens group G1 is Δθ1pave, it is preferable that the zoom lens satisfies Conditional Expression (8). By not allowing the corresponding value of Conditional Expression (8) to be equal to or less than the lower limit, there is an advantage in suppressing secondary longitudinal chromatic aberration. By not allowing the corresponding value of Conditional Expression (8) to be equal to or greater than the upper limit, the availability of the material is increased, and a material that is easier to manufacture can be used. In order to obtain more favorable characteristics, it is more preferable that the zoom lens satisfies Conditional Expression (8-1), and it is yet more preferable that the zoom lens satisfies Conditional Expression (8-2).

$$0.03<\Delta\theta 1pave<0.06 \quad (8)$$

$$0.032<\Delta\theta 1pave<0.058 \quad (8\text{-}1)$$

$$0.038<\Delta\theta 1pave<0.056 \quad (8\text{-}2)$$

Assuming that an Abbe number of the positive lens disposed in the lens group that has the strongest refractive power among the lens groups that have positive refractive powers and that are included in the middle group GM based on the d line is νMp, it is preferable that the zoom lens includes at least one positive lens satisfying Conditional Expression (9). By not allowing the corresponding value of Conditional Expression (9) to be equal to or less than the lower limit, there is an advantage in suppressing fluctuation in longitudinal chromatic aberration during zooming. By not allowing the corresponding value of Conditional Expression (9) to be equal to or greater than the upper limit, the availability of the material is increased, and a material that is easier to manufacture can be used. In order to obtain more favorable characteristics, it is more preferable that at least one positive lens satisfying Conditional Expression (9) satisfies Conditional Expression (9-1), and it is yet more preferable that the lens satisfies Conditional Expression (9-2).

$$81.7<\nu Mp<105 \quad (9)$$

$$83<\nu Mp<103 \quad (9\text{-}1)$$

$$89<\nu Mp<101 \quad (9\text{-}2)$$

Assuming that an average value of the Abbe numbers of all the positive lenses disposed in the lens group that has the strongest refractive power among the lens groups having the positive refractive power and included in the middle group GM based on the d line is νMpave, it is preferable that the zoom lens satisfies Conditional Expression (10). By not allowing the corresponding value of Conditional Expression (10) to be equal to or less than the lower limit, there is an advantage in suppressing fluctuation in longitudinal chromatic aberration during zooming. By not allowing the corresponding value of Conditional Expression (10) to be equal to or greater than the upper limit, the availability of the material is increased, and a material that is easier to manufacture can be used. In order to obtain more favorable characteristics, it is more preferable that the zoom lens satisfies Conditional Expression (10-1), and it is yet more preferable that the zoom lens satisfies Conditional Expression (10-2).

$$81.7 < \nu Mpave < 105 \tag{10}$$

$$83 < \nu Mpave < 103 \tag{10-1}$$

$$89 < \nu Mpave < 101 \tag{10-2}$$

Assuming that an Abbe number of the positive lens disposed in a lens group that has a strongest refractive power among the lens groups that have positive refractive powers and that are included in the middle group GM based on the d line is νMp and a partial dispersion ratio thereof between the g line and the F line is θMp, in a case where ΔθMp is represented by ΔθMp=θMp+ 0.00162×νMp−0.64159, it is preferable that the zoom lens includes at least one positive lens satisfying Conditional Expression (11). ΔθMp is an amount that indicates anomalous dispersibility. By not allowing the corresponding value of Conditional Expression (11) to be equal to or less than the lower limit, there is an advantage in suppressing fluctuation in longitudinal chromatic aberration during zooming. By not allowing the corresponding value of Conditional Expression (11) to be equal to or greater than the upper limit, the availability of the material is increased, and a material that is easier to manufacture can be used. In order to obtain more favorable characteristics, it is more preferable that at least one positive lens satisfying Conditional Expression (11) satisfies Conditional Expression (11-1), and it is yet more preferable that the lens satisfies Conditional Expression (11-2).

$$0.014 < \Delta \theta Mp < 0.06 \tag{11}$$

$$0.03 < \Delta \theta Mp < 0.058 \tag{11-1}$$

$$0.032 < \Delta \theta Mp < 0.056 \tag{11-2}$$

Assuming that an average value of ΔθMp of all the positive lenses of the lens group that has the strongest refractive power among the lens groups that have positive refractive powers and that are included in the middle group GM is ΔθMpave, it is preferable that the zoom lens satisfies Conditional Expression (12). By not allowing the corresponding value of Conditional Expression (12) to be equal to or less than the lower limit, there is an advantage in suppressing fluctuation in longitudinal chromatic aberration during zooming. By not allowing the corresponding value of Conditional Expression (12) to be equal to or greater than the upper limit, the availability of the material is increased, and a material that is easier to manufacture can be used. In order to obtain more favorable characteristics, it is more preferable that the zoom lens satisfies Conditional Expression (12-1), and it is yet more preferable that the zoom lens satisfies Conditional Expression (12-2).

$$0.014 < \Delta \theta Mpave < 0.06 \tag{12}$$

$$0.03 < \Delta \theta Mpave < 0.058 \tag{12-1}$$

$$0.032 < \Delta \theta Mpave < 0.056 \tag{12-2}$$

In a configuration in which the first lens group G1 includes at least one negative lens, assuming that a refractive index of the negative lens of the first lens group G1 at the d line is N1n, it is preferable that the zoom lens includes at least one negative lens satisfying Conditional Expression (13). By not allowing the corresponding value of Conditional Expression (13) to be equal to or less than the lower limit, there is an advantage in achieving reduction in weight. By not allowing the corresponding value of Conditional Expression (13) to be equal to or greater than the upper limit, the availability of the material is increased, and a material that is easier to manufacture can be used. In order to obtain more favorable characteristics, it is more preferable that at least one negative lens satisfying Conditional Expression (13) satisfies Conditional Expression (13-1), and it is yet more preferable that the lens satisfies Conditional Expression (13-2).

$$1.55 < N1n < 1.8 \tag{13}$$

$$1.57 < N1n < 1.79 \tag{13-1}$$

$$1.58 < N1n < 1.77 \tag{13-2}$$

In a configuration in which the second lens group G2 includes at least one positive lens, assuming that an Abbe number of the positive lens of the second lens group G2 based on the d line is ν2p, it is preferable that the zoom lens includes at least one positive lens satisfying Conditional Expression (14). By not allowing the corresponding value of Conditional Expression (14) to be equal to or less than the lower limit, the availability of the material is improved, and a material that is easier to manufacture can be used. By not allowing the corresponding value of Conditional Expression (14) to be equal to or greater than the upper limit, there is an advantage in suppressing longitudinal chromatic aberration. In order to obtain more favorable characteristics, it is more preferable that at least one positive lens satisfying Conditional Expression (14) satisfies Conditional Expression (14-1), and it is yet more preferable that the lens satisfies Conditional Expression (14-2).

$$15 < \nu 2p < 25 \tag{14}$$

$$16 < \nu 2p < 23 \tag{14-1}$$

$$17 < \nu 2p < 22 \tag{14-2}$$

In a configuration in which the second lens group G2 includes at least one positive lens, assuming that an Abbe number of the positive lens of the second lens group G2 based on the d line is ν2p and a partial dispersion ratio thereof between the g line and the F line is θ2p, in a case where Δθ2p is represented by Δθ2p=θ2p+ 0.00162×ν2p−0.64159, it is preferable that the zoom lens includes at least one positive lens satisfying Conditional Expression (15). Δθ2p is an amount that indicates anomalous dispersibility. By not allowing the corresponding value of Conditional Expression (15) to be equal to or less than the lower limit, there is an advantage in suppressing secondary longitudinal chromatic aberration. By not allowing the corresponding value of Conditional Expression (15) to be equal to or greater than the upper limit, the availability of the material is increased, and a material that is easier to manufacture can be used. In order to obtain more favorable characteristics, it is more preferable that at least one positive lens satisfying Conditional Expression (15) satisfies Conditional Expression (15-1), and it is yet more preferable that the lens satisfies Conditional Expression (15-2).

$$0.015 < \Delta\theta 2p < 0.06 \tag{15}$$

$$0.03 < \Delta\theta 2p < 0.055 \tag{15-1}$$

$$0.035 < \Delta\theta 2p < 0.053 \tag{15-2}$$

Assuming that an Abbe number of the negative lens of the second lens group G2 based on the d line is $\nu 2n$, it is preferable that the zoom lens includes at least one negative lens satisfying Conditional Expression (16). By not allowing the corresponding value of Conditional Expression (16) to be equal to or less than the lower limit, there is an advantage in suppressing lateral chromatic aberration. By not allowing the corresponding value of Conditional Expression (16) to be equal to or greater than the upper limit, the availability of the material is increased, and a material that is easier to manufacture can be used. In order to obtain more favorable characteristics, it is more preferable that at least one negative lens satisfying Conditional Expression (16) satisfies Conditional Expression (16-1), and it is yet more preferable that the lens satisfies Conditional Expression (16-2).

$$70 < \nu 2n < 105 \tag{16}$$

$$81.7 < \nu 2n < 103 \tag{16-1}$$

$$82.4 < \nu 2n < 101 \tag{16-2}$$

Assuming that an Abbe number of a negative lens of the second lens group G2 based on the d line is $\nu 2n$ and a partial dispersion ratio thereof between the g line and the F line is $\theta 2n$, in a case where $\theta 2n$ is represented by $\Delta\theta 2n = \theta 2n + 0.00162 \times \nu 2n - 0.64159$, it is preferable that the zoom lens includes at least one negative lens satisfying Conditional Expression (17). $\Delta\theta 2n$ is an amount that indicates anomalous dispersibility. By not allowing the corresponding value of Conditional Expression (17) to be equal to or less than the lower limit, there is an advantage in suppressing second-order lateral chromatic aberration. By not allowing the corresponding value of Conditional Expression (17) to be equal to or greater than the upper limit, the availability of the material is increased, and a material that is easier to manufacture can be used. In order to obtain more favorable characteristics, it is more preferable that at least one negative lens satisfying Conditional Expression (17) satisfies Conditional Expression (17-1), and it is yet more preferable that the lens satisfies Conditional Expression (17-2).

$$0.03 < \Delta\theta 2n < 0.06 \tag{17}$$

$$0.032 < \Delta\theta 2n < 0.058 \tag{17-1}$$

$$0.035 < \Delta\theta 2n < 0.05 \tag{17-2}$$

Assuming that a lateral magnification of the final lens group GE in a state in which the infinite distance object is in focus at the telephoto end is $\beta Et$, it is preferable that the zoom lens satisfies Conditional Expression (18). By not allowing the corresponding value of Conditional Expression (18) to be equal to or less than the lower limit, there is an advantage in achieving reduction in size. By not allowing the corresponding value of Conditional Expression (18) to be equal to or greater than the upper limit, there is an advantage in suppressing field curvature. In order to obtain more favorable characteristics, it is more preferable that the zoom lens satisfies Conditional Expression (18-1), and it is yet more preferable that the zoom lens satisfies Conditional Expression (18-2).

$$1.4 < \beta Et < 4.7 \tag{18}$$

$$1.7 < \beta Et < 4 \tag{18-1}$$

$$2.1 < \beta Et < 3.6 \tag{18-2}$$

Assuming that a focal length of the lens group that has the strongest refractive power among the lens groups that have positive refractive powers and that are included in the middle group GM is fMp, it is preferable that the zoom lens satisfies Conditional Expression (19). Here, it is assumed that a focal length of the whole system in a state in which the infinite distance object is in focus at the wide angle end is fw, and a focal length of the whole system in a state in which the infinite distance object is in focus at the telephoto end is ft. By not allowing the corresponding value of Conditional Expression (19) to be equal to or less than the lower limit, there is an advantage in suppressing spherical aberration. By not allowing the corresponding value of Conditional Expression (19) to be equal to or greater than the upper limit, there is an advantage in achieving reduction in size. In order to obtain more favorable characteristics, it is more preferable that the zoom lens satisfies Conditional Expression (19-1), and it is yet more preferable that the zoom lens satisfies Conditional Expression (19-2).

$$0.1 < fMp/(fw \times ft)^{1/2} < 0.7 \tag{19}$$

$$0.14 < fMp/(fw \times ft)^{1/2} < 0.5 \tag{19-1}$$

$$0.24 < fMp/(fw \times ft)^{1/2} < 0.42 \tag{19-2}$$

Assuming that a lateral magnification of the second lens group G2 in a state in which the infinite distance object is in focus at the telephoto end is $\beta 2t$, it is preferable that the zoom lens satisfies Conditional Expression (20). By not allowing the corresponding value of Conditional Expression (20) to be equal to or less than the lower limit, there is an advantage in achieving an increase in zoom ratio. By not allowing the corresponding value of Conditional Expression (20) to be equal to or greater than the upper limit, there is an advantage in suppressing fluctuation in aberrations during zooming. In order to obtain more favorable characteristics, it is more preferable that the zoom lens satisfies Conditional Expression (20-1), and it is yet more preferable that the zoom lens satisfies Conditional Expression (20-2).

$$0.9 < |\beta 2t| < 4.6 \tag{20}$$

$$1.3 < |\beta 2t| < 4.1 \tag{20-1}$$

$$2.1 < |\beta 2t| < 3.9 \tag{20-2}$$

In a case where the zoom lens includes a vibration-proof group that moves in a direction intersecting with the optical axis Z during image blur correction, it is preferable that the zoom lens further includes a stationary group Gk disposed adjacent to the vibration-proof group on the image side of the vibration-proof group. It is preferable that the stationary group Gk has a refractive power opposite to that of the vibration-proof group and remains stationary with respect to the image plane Sim during zooming and focusing. In such a configuration, assuming that a focal length of the vibration-proof group is fis and a focal length of the stationary group Gk is fisr, it is preferable that the zoom lens satisfies Conditional Expression (21). By not allowing the corresponding value of Conditional Expression (21) to be equal to or less than the lower limit, there is an advantage in suppressing fluctuation in aberrations during image blur correction. By not allowing the corresponding value of Conditional Expression (21) to be equal to or greater than the upper limit, there is an advantage in achieving reduction in weight of the vibration-proof group. In order to obtain more favorable characteristics, it is more preferable that the zoom lens satisfies Conditional Expression (21-1), and it is yet more preferable that the zoom lens satisfies Conditional Expression (21-2).

$$0.32 < |fis/fis| < 1.1 \quad (21)$$

$$0.37 < |fis/fis| < 0.9 \quad (21\text{-}1)$$

$$0.41 < |fis/fis| < 0.8 \quad (21\text{-}2)$$

For example, the zoom lens of FIG. 1 includes a stationary group Gk consisting of a lens L58 to a lens L62. That is, the stationary group Gk in FIG. 1 consists of all lenses closer to the image side than the vibration-proof group. However, the stationary group Gk of the present disclosure is not limited to the configuration. In the technique of the present disclosure, the stationary group Gk may be configured to consist of at least one lens, and at least one lens may be disposed closer to the image side than the stationary group Gk.

In a configuration in which the first lens group G1 includes at least one negative lens, assuming that a center thickness of the negative lens disposed closest to the object side among negative lenses included in the first lens group G1 is D1n and an F number in a state in which the infinite distance object is in focus at the telephoto end is FNot, it is preferable that the zoom lens satisfies Conditional Expression (22). By not allowing the corresponding value of Conditional Expression (22) to be equal to or less than the lower limit, there is an advantage in increasing the mechanical strength of the negative lens disposed closest to the object side. By not allowing the corresponding value of Conditional Expression (22) to be equal to or greater than the upper limit, there is an advantage in achieving reduction in weight of the first lens group G1. In order to obtain more favorable characteristics, it is more preferable that the zoom lens satisfies Conditional Expression (22-1), and it is yet more preferable that the zoom lens satisfies Conditional Expression (22-2).

$$0.01 < D1n/(ft/FNot) < 0.04 \quad (22)$$

$$0.014 < D1n/(ft/FNot) < 0.033 \quad (22\text{-}1)$$

$$0.017 < D1n/(ft/FNot) < 0.03 \quad (22\text{-}2)$$

Assuming that a focal length of the middle group GM in a state in which the infinite distance object is in focus at the wide angle end is fMw and a focal length of the middle group GM in a state in which the infinite distance object is in focus at the telephoto end is fMt, it is preferable that the zoom lens satisfies Conditional Expression (23). By not allowing the corresponding value of Conditional Expression (23) to be equal to or less than the lower limit, there is an advantage in suppressing spherical aberration. By not allowing the corresponding value of Conditional Expression (23) to be equal to or greater than the upper limit, there is an advantage in achieving reduction in size. In order to obtain more favorable characteristics, it is more preferable that the zoom lens satisfies Conditional Expression (23-1), and it is yet more preferable that the zoom lens satisfies Conditional Expression (23-2).

$$0.16 < (fMw \times fMt)^{1/2}/(fw \times ft)^{1/2} < 0.3 \quad (23)$$

$$0.18 < (fMw \times fMt)^{1/2}/(fw \times ft)^{1/2} < 0.27 \quad (23\text{-}1)$$

$$0.19 < (fMw \times fMt)^{1/2}/(fw \times ft)^{1/2} < 0.25 \quad (23\text{-}2)$$

Assuming that a focal length of the PA lens group GPA is WA and a focal length of the second lens group G2 is f2, it is preferable that the zoom lens satisfies Conditional Expression (24). By not allowing the corresponding value of Conditional Expression (24) to be equal to or less than the lower limit, there is an advantage in achieving reduction in size. By not allowing the corresponding value of Conditional Expression (24) to be equal to or greater than the upper limit, there is an advantage in achieving an increase in zoom ratio. In order to obtain more favorable characteristics, it is more preferable that the zoom lens satisfies Conditional Expression (24-1), and it is yet more preferable that the zoom lens satisfies Conditional Expression (24-2).

$$0.25 < |f2|/fPA < 3 \quad (24)$$

$$0.35 < |f2|/fPA < 1.5 \quad (24\text{-}1)$$

$$0.45 < |f2|/fPA < 0.83 \quad (24\text{-}2)$$

Assuming that a sum of a back focal length of the whole system at an air-equivalent distance and a distance on an optical axis from a lens surface closest to the object side in the first lens group G1 to a lens surface closest to the image side in the final lens group GE in a state in which the infinite distance object is in focus at the telephoto end is TLt, it is preferable that the zoom lens satisfies Conditional Expression (25). By not allowing the corresponding value of Conditional Expression (25) to be equal to or less than the lower limit, there is an advantage in suppressing longitudinal chromatic aberration. By not allowing the corresponding value of Conditional Expression (25) to be equal to or greater than the upper limit, there is an advantage in achieving reduction in size. In order to obtain more favorable characteristics, it is more preferable that the zoom lens satisfies Conditional Expression (25-1), and it is yet more preferable that the zoom lens satisfies Conditional Expression (25-2).

$$0.42 < TLt/ft < 0.94 \quad (25)$$

$$0.48 < TLt/ft < 0.78 \quad (25\text{-}1)$$

$$0.5 < TLt/ft < 0.65 \quad (25\text{-}2)$$

Assuming that a focal length of the final lens group GE is fE, it is preferable that the zoom lens satisfies Conditional Expression (26). By not allowing the corresponding value of Conditional Expression (26) to be equal to or less than the lower limit, sensitivity to error of the final lens group GE can be suppressed. By not allowing the corresponding value of Conditional Expression (26) to be equal to or greater than the upper limit, there is an advantage in suppressing various aberrations at the telephoto end. In order to obtain more favorable characteristics, it is more preferable that the zoom lens satisfies Conditional Expression (26-1), and it is yet more preferable that the zoom lens satisfies Conditional Expression (26-2).

$$0.02<|fE|/ft<0.2 \qquad (26)$$

$$0.03<|fE|/ft<0.14 \qquad (26\text{-}1)$$

$$0.04<|fE|/ft<0.1 \qquad (26\text{-}2)$$

Assuming that a lateral magnification of the second lens group G2 in a state in which the infinite distance object is in focus at the telephoto end is β2t and a lateral magnification of the second lens group G2 in a state in which the infinite distance object is in focus at the wide angle end is β2w, it is preferable that the zoom lens satisfies Conditional Expression (27). By not allowing the corresponding value of Conditional Expression (27) to be equal to or less than the lower limit, there is an advantage in achieving an increase in zoom ratio. By not allowing the corresponding value of Conditional Expression (27) to be equal to or greater than the upper limit, there is an advantage in suppressing fluctuation in aberrations during zooming. In order to obtain more favorable characteristics, it is more preferable that the zoom lens satisfies Conditional Expression (27-1), and it is yet more preferable that the zoom lens satisfies Conditional Expression (27-2).

$$2.5<\beta 2t/\beta 2w<7.9 \qquad (27)$$

$$2.7\beta 2t/\beta 2w<7 \qquad (27\text{-}1)$$

$$2.9\beta 2t/\beta 2w<6.6 \qquad (27\text{-}2)$$

Assuming that a combined lateral magnification of all the lenses closer to the image side than the PA lens group GPA in a state in which the infinite distance object is in focus at the telephoto end is βPArt it is preferable that the zoom lens satisfies Conditional Expression (28). By not allowing the corresponding value of Conditional Expression (28) to be equal to or less than the lower limit, there is an advantage in achieving reduction in size. By not allowing the corresponding value of Conditional Expression (28) to be equal to or greater than the upper limit, there is an advantage in suppressing spherical aberration. In order to obtain more favorable characteristics, it is more preferable that the zoom lens satisfies Conditional Expression (28-1), and it is yet more preferable that the zoom lens satisfies Conditional Expression (28-2).

$$0.8<\beta PArt<4.5 \qquad (28)$$

$$1<\beta PArt<4 \qquad (28\text{-}1)$$

$$1.12<\beta PArt<3.65 \qquad (28\text{-}2)$$

Assuming that a focal length of the first lens group G1 is f1, it is preferable that the zoom lens satisfies Conditional Expression (29). By not allowing the corresponding value of Conditional Expression (29) to be equal to or less than the lower limit, there is an advantage in suppressing spherical aberration. By not allowing the corresponding value of Conditional Expression (29) to be equal to or greater than the upper limit, there is an advantage in achieving reduction in size. In order to obtain more favorable characteristics, it is more preferable that the zoom lens satisfies Conditional Expression (29-1), and it is yet more preferable that the zoom lens satisfies Conditional Expression (29-2).

$$0.43<f1/(fw\times ft)^{1/2}<1.03 \qquad (29)$$

$$0.52<f1/(fw\times ft)^{1/2}<0.91 \qquad (29\text{-}1)$$

$$0.58<f1/(fw\times ft)^{1/2}<0.83 \qquad (29\text{-}2)$$

Assuming that a focal length of the second lens group G2 is f2, it is preferable that the zoom lens satisfies Conditional Expression (30). By not allowing the corresponding value of Conditional Expression (30) to be equal to or less than the lower limit, there is an advantage in suppressing field curvature. By not allowing the corresponding value of Conditional Expression (30) to be equal to or greater than the upper limit, there is an advantage in achieving an increase in zoom ratio. In order to obtain more favorable characteristics, it is more preferable that the zoom lens satisfies Conditional Expression (30-1), and it is yet more preferable that the zoom lens satisfies Conditional Expression (30-2).

$$0.23<|f2|/fw<0.66 \qquad (30)$$

$$0.28<|f2|/fw<0.58 \qquad (30\text{-}1)$$

$$0.318<|f2|/fw<0.531 \qquad (30\text{-}2)$$

In a case where the zoom lens includes at least one focusing group that moves along the optical axis Z during focusing, the at least one focusing group may be configured to consist of one negative lens and one positive lens. Assuming that a focal length of the positive lens of the focusing group consisting of one negative lens and one positive lens is ffp, and a focal length of the negative lens of the focusing group consisting of one negative lens and one positive lens is ffn, it is preferable that the zoom lens satisfies Conditional Expression (31). By not allowing the corresponding value of Conditional Expression (31) to be equal to or less than the lower limit, there is an advantage in suppressing the amount of movement of the focusing group during focusing. By not allowing the corresponding value of Conditional Expression (31) to be equal to or greater than the upper limit, there is an advantage in suppressing fluctuation in aberrations during focusing. In order to obtain more favorable characteristics, it is more preferable that the zoom lens satisfies Conditional Expression (31-1), and it is yet more preferable that the zoom lens satisfies Conditional Expression (31-2).

$$0.9<ffp/|ffn|<2.8 \qquad (31)$$

$$1.1<ffp/|ffn|<2.5 \qquad (31\text{-}1)$$

$$1.2<ffp/|ffn|<2.3 \qquad (31\text{-}2)$$

Assuming that a focal length of the first lens group G1 is f1, and a focal length of the second lens group G2 is f2, it is preferable that the zoom lens satisfies Conditional Expression (32). By not allowing the corresponding value of Conditional Expression (32) to be equal to or less than the lower limit, there is an advantage in achieving an increase in zoom ratio. By not allowing the corresponding value of Conditional Expression (32) to be equal to or greater than the upper limit, there is an advantage in achieving reduction in size. In order to obtain more favorable characteristics, it is more preferable that the zoom lens satisfies Conditional Expression (32-1), and it is yet more preferable that the zoom lens satisfies Conditional Expression (32-2).

$$2.1<f1/|f2|<4.8 \qquad (32)$$

$$2.6<f1/|f2|<4.3 \qquad (32\text{-}1)$$

$$2.9<f1/|f2|<3.9 \qquad (32\text{-}2)$$

It is preferable that the zoom lens satisfies Conditional Expression (33). By not allowing the corresponding value of Conditional Expression (33) to be equal to or less than the lower limit, there is an advantage in suppressing fluctuation in aberrations during zooming. By not allowing the corresponding value of Conditional Expression (33) to be equal to or greater than the upper limit, there is an advantage in achieving an increase in zoom ratio. In order to obtain more favorable characteristics, it is more preferable that the zoom lens satisfies Conditional Expression (33-1), and it is yet more preferable that the zoom lens satisfies Conditional Expression (33-2).

$$0.13<|f2|/(fw\times ft)^{1/2}<0.32 \quad (33)$$

$$0.15<|f2|/(fw\times ft)^{1/2}<0.28 \quad (33\text{-}1)$$

$$0.17<|f2|/(fw\times ft)^{1/2}<0.26 \quad (33\text{-}2)$$

It is preferable that the zoom lens satisfies Conditional Expression (34). By not allowing the corresponding value of Conditional Expression (34) to be equal to or less than the lower limit, there is an advantage in suppressing spherical aberration. By not allowing the corresponding value of Conditional Expression (34) to be equal to or greater than the upper limit, there is an advantage in achieving reduction in size. In order to obtain more favorable characteristics, it is more preferable that the zoom lens satisfies Conditional Expression (34-1), and it is yet more preferable that the zoom lens satisfies Conditional Expression (34-2).

$$0.12<fP4/(fw\times ft)^{1/2}<0.45 \quad (34)$$

$$0.15<fP4/(fw\times ft)^{1/2}<0.4 \quad (34\text{-}1)$$

$$0.17<fP4/(fw\times ft)^{1/2}<0.36 \quad (34\text{-}2)$$

Assuming that a focal length of the final lens group GE is fE, it is preferable that the zoom lens satisfies Conditional Expression (35). By not allowing the corresponding value of Conditional Expression (35) to be equal to or less than the lower limit, sensitivity to error of the final lens group GE can be suppressed. By not allowing the corresponding value of Conditional Expression (35) to be equal to or greater than the upper limit, there is an advantage in suppressing various aberrations in the entire zoom range. In order to obtain more favorable characteristics, it is more preferable that the zoom lens satisfies Conditional Expression (35-1), and it is yet more preferable that the zoom lens satisfies Conditional Expression (35-2).

$$0.06<|fE|/(fw\times ft)^{1/2}<0.25 \quad (35)$$

$$0.07<|fE|/(fw\times ft)^{1/2}<0.22 \quad (35\text{-}1)$$

$$0.08<|fE|/(fw\times ft)^{1/2}<0.2 \quad (35\text{-}2)$$

Assuming that a focal length of the focusing group is ff, it is preferable that the zoom lens includes at least one focusing group satisfying Conditional Expression (36). By not allowing the corresponding value of Conditional Expression (36) to be equal to or less than the lower limit, there is an advantage in suppressing fluctuation in aberrations during focusing. By not allowing the corresponding value of Conditional Expression (36) to be equal to or greater than the upper limit, there is an advantage in suppressing the amount of movement of the focusing group during focusing. In order to obtain more favorable characteristics, it is more preferable that at least one focusing group satisfying Conditional Expression (36) satisfies Conditional Expression (36-1), and it is yet more preferable that the focusing group satisfies Conditional Expression (36-2).

$$0.14<|ff|/(fw\times ft)^{1/2}<0.7 \quad (36)$$

$$0.17<|ff|/(fw\times ft)^{1/2}<0.62 \quad (36\text{-}1)$$

$$0.19<|ff|/(fw\times ft)^{1/2}<0.56 \quad (36\text{-}2)$$

Assuming that a focal length of the vibration-proof group is fis, it is preferable that the zoom lens satisfies Conditional Expression (37). By not allowing the corresponding value of Conditional Expression (37) to be equal to or less than the lower limit, there is an advantage in suppressing fluctuation in aberrations during image blur correction. By not allowing the corresponding value of Conditional Expression (37) to be equal to or greater than the upper limit, there is an advantage in suppressing the amount of movement of the vibration-proof group during image blur correction. In order to obtain more favorable characteristics, it is more preferable that the zoom lens satisfies Conditional Expression (37-1), and it is yet more preferable that the zoom lens satisfies Conditional Expression (37-2).

$$0.05<|fis|/(fw\times ft)^{1/2}<0.15 \quad (37)$$

$$0.06<|fis|/(fw\times ft)^{1/2}<0.14 \quad (37\text{-}1)$$

$$0.063<|fis|/(fw\times ft)^{1/2}<0.124 \quad (37\text{-}2)$$

The middle group GM may be configured to include a lens pair consisting of a negative lens and a positive lens that are adjacent to each other with an air spacing interposed therebetween. In the configuration in which the middle group GM includes the above-mentioned lens pair, it is preferable that the zoom lens includes at least one lens pair satisfying Conditional Expression (38). Here, it is assumed that a spacing on the optical axis of the air spacing in the lens pair of the middle group GM is DMnp. It is assumed that a curvature radius of an object side surface of an air lens formed by the air spacing in the lens pair of the middle group GM is RMnpf. It is assumed that a curvature radius of an image side surface of the air lens formed by the air spacing in the lens pair of the middle group GM is RMnpr. By not allowing the corresponding value of Conditional Expression (38) to be equal to or less than the lower limit, there is an advantage in suppressing spherical aberration. By not allowing the corresponding value of Conditional Expression (38) to be equal to or greater than the upper limit, there is an advantage in achieving reduction in size. In order to obtain more favorable characteristics, it is more preferable that at least one lens pair satisfying Conditional Expression (38) satisfies Conditional Expression (38-1), and it is yet more preferable that the lens pair satisfies Conditional Expression (38-2).

$$0.002<DMnp/(RMnpf+RMnpr)<0.1 \quad (38)$$

$$0.005<DMnp/(RMnpf+RMnpr)<0.04 \quad (38\text{-}1)$$

$$0.01<DMnp/(RMnpf+RMnpr)<0.027 \quad (38\text{-}2)$$

It is preferable that the final lens group GE includes a lens pair consisting of a negative lens and a positive lens that are adjacent to each other with an air spacing interposed therebetween. In a configuration in which the final lens group GE includes the above-mentioned lens pair, it is preferable that the zoom lens includes at least one lens pair satisfying Conditional Expression (39). Here, it is assumed that a spacing on the optical axis of the air spacing in the lens pair of the final lens group GE is DEnp. It is assumed that a curvature radius of an object side surface of an air lens formed by the air spacing in the lens pair of the final lens group GE is REnpf. It is assumed that a curvature radius of an image side surface of the air lens formed by the air spacing in the lens pair of the final lens group GE is REnpr. By not allowing the corresponding value of Conditional Expression (39) to be equal to or less than the lower limit, there is an advantage in suppressing field curvature. By not allowing the corresponding value of Conditional Expression (39) to be equal to or greater than the upper limit, there is an advantage in achieving reduction in size. In order to obtain more favorable characteristics, it is more preferable that at least one lens pair satisfying Conditional Expression (39) satisfies Conditional Expression (39-1), and it is yet more preferable that the lens satisfies Conditional Expression (39-2).

$$-0.5 < DEnp/(REnpf+REnpr) < -0.01 \qquad (39)$$

$$-0.35 < DEnp/(REnpf+REnpr) < -0.04 \qquad (39\text{-}1)$$

$$-0.23 < DEnp/(REnpf+REnpr) < -0.07 \qquad (39\text{-}2)$$

In the present specification, in the "lens pair consisting of a negative lens and a positive lens which are adjacent to each other with an air spacing interposed therebetween", the negative lens, the air spacing, and the positive lens may be arranged, in order from the object side to the image side, or the positive lens, the air spacing, and the negative lens may be arranged, in order from the object side to the image side. The "air lens" means that the air spacing interposed between two opposing lens surfaces is regarded as a lens having a refractive index of 1. For example, in the case of the lens pair in which the negative lens, the air spacing, and the positive lens are arranged in order from the object side to the image side, the "object side surface of the air lens" corresponds to a lens surface of the negative lens of the lens pair on the image side, and the "image side surface of the air lens" corresponds to a lens surface of the positive lens of the lens pair on the object side.

The example shown in FIG. 1 is an example, and various modifications can be made without departing from the scope of the technique of the present disclosure. For example, the number of lens groups included in the middle group GM is two in the example of FIG. 1, but may be different from the example of FIG. 1, and may be, for example, one or three. The number of lenses included in each lens group may be different from the number shown in FIG. 1. For example, each group can be configured as follows.

A single lens that has a negative refractive power may be disposed closest to the object side in the first lens group G1. In such a case, there is an advantage in correcting spherical aberration.

The first lens group G1 may be configured to include a negative lens, a positive lens, and a positive lens, in order from the object side to the image side. In such a case, there is an advantage in achieving an increase in zoom ratio while satisfactorily maintaining various aberrations. More preferably, the first lens group G1 includes a negative lens, a positive lens, and a positive lens, in order from the position closest to the object side to the image side.

The first lens group G1 may be configured to consist of a negative lens, a positive lens, and a positive lens, in order from the object side to the image side. In such a case, there is an advantage in achieving an increase in zoom ratio while satisfactorily maintaining various aberrations and achieving reduction in weight.

The first lens group G1 may be configured to consist of a negative lens and a positive lens, in order from the object side to the image side. Alternatively, the first lens group G1 may be configured to consist of a negative lens, a positive lens, a positive lens, and a positive lens, in order from the object side to the image side.

In a case where the first lens group G1 includes a negative lens and a positive lens which is disposed adjacent to the image side of the negative lens, the negative lens and the positive lens may be cemented or do not have to be cemented.

The second lens group G2 may be configured to include a negative lens, a negative lens, and a positive lens, in order from the object side to the image side. In such a case, there is an advantage in achieving an increase in zoom ratio while satisfactorily maintaining various aberrations. Further, in a case where the second lens group G2 is configured to consist of a negative lens, a negative lens, and a positive lens in order from the object side to the image side, in addition to the above-mentioned effect, there is an advantage in achieving reduction in size.

The middle group GM may be configured to consist of two lens groups that have positive refractive powers. In such a case, the lens group that has a positive refractive power on the object side in the middle group GM may be configured to consist of a positive lens, a positive lens, a positive lens, and a negative lens, in order from the object side to the image side, and the lens group that has a positive refractive power on the image side in the middle group GM may be configured to consist of a negative lens and a positive lens, in order from the object side to the image side.

The middle group GM may be configured to consist of one lens group that has a positive refractive power. In such a case, the lens group that has a positive refractive power and that constitutes the middle group GM may be configured to consist of four positive lenses and two negative lenses.

The middle group GM may be configured to consist of a lens group that has a positive refractive power and a lens group that has a negative refractive power, in order from the object side to the image side. In such a case, the lens group that has a positive refractive power in the middle group GM may be configured to consist of a positive lens, a positive lens, a positive lens, and a negative lens in order from the object side to the image side, and the lens group that has a negative refractive power in the middle group GM may be configured to consist of a negative lens and a positive lens.

The middle group GM may be configured to consist of a lens group having three positive refractive powers. In such a case, the lens group that has a positive refractive power at a position closest to the object side in the middle group GM may be configured to consist of two positive lenses. The lens group that has a positive refractive power and that is second from the object side in the middle group GM may be configured to consist of a positive lens and a negative lens in order from the object side to the image side. The lens group that has a positive refractive power at a position closest to the image side in the middle group GM may be configured to consist of a negative lens and a positive lens, in order from the object side to the image side.

The middle group GM may be configured to consist of a lens group that has a positive refractive power, a lens group that has a negative refractive power, and a lens group that has a positive refractive power, in order from the object side to the image side. In such a case, the lens group that has a positive refractive power on the object side in the middle group GM may be configured to consist of two positive lenses. The lens group that has a negative refractive power in the middle group GM may be configured to consist of a positive lens and a negative lens, in order from the object side to the image side. The lens group that has a positive refractive power on the image side in the middle group GM may be configured to consist of a negative lens and a positive lens, in order from the object side to the image side.

The aperture stop St may be configured to be disposed closest to the object side in the final lens group GE. In such a case, there is an advantage in achieving reduction in size of the final lens group GE.

The focusing group may be disposed adjacent to the aperture stop St. In such a case, there is an advantage in achieving reduction in size of the focusing group. The focusing group may be disposed adjacent to the object side of the aperture stop St, or may be disposed adjacent to the image side of the aperture stop St.

The focusing group may be disposed closest to the image side in the middle group GM. The focusing group may be configured to consist of the lens component closest to the object side in the final lens group GE, or may be configured to consist of the lens component which is second from the object side in the final lens group GE. It should be noted that one lens component means one cemented lens or one single lens.

In a case where the zoom lens contains two focusing groups, the signs of the refractive powers of these two focusing groups may be configured to be different from each other. In such a case, there is an advantage in suppressing fluctuation in aberrations during focusing.

The vibration-proof group may be configured to consist of one positive lens and two negative lenses. In such a case, there is an advantage in suppressing fluctuation in aberrations during image blur correction. More preferably, the vibration-proof group consists of one positive lens and two negative lenses, in order from the object side to the image side.

The above-mentioned preferred configurations and available configurations may be optional combinations, and it is preferable to selectively adopt the configurations in accordance with required specification. It should be noted that conditional expressions that the zoom lens of the present disclosure preferably satisfies are not limited to conditional expressions described in the form of expressions, and the lower limit and the upper limit are selected from the preferable, more preferable, and yet more preferable conditional expressions. Conditional Expressions may include all conditional expressions obtained through optional combinations.

For example, one preferred embodiment of the zoom lens of the present disclosure consists of, in order from the object side to the image side, a first lens group G1 that has a positive refractive power, a second lens group G2 that has a negative refractive power, a middle group GM that includes the above-mentioned lens groups, and a final lens group GE. The middle group GM has a positive refractive power as a whole throughout the entire zoom range. During zooming, the spacing between the first lens group G1 and the second lens group G2 changes, the spacing between the second lens group G2 and the middle group GM changes, and the spacing between the middle group GM and the final lens group GE changes. In a case where the middle group GM includes a plurality of lens groups, all the spacings of adjacent lens groups in the middle group GM change during zooming. Then, Conditional Expression (1) is satisfied.

Next, examples of the zoom lens of the present disclosure will be described with reference to the drawings. The reference numerals attached to the lenses in the cross-sectional views of each example are used independently for each example in order to avoid complication of description and drawings due to an increase in the number of digits of the reference numerals. Therefore, even in a case where common reference numerals are attached in the drawings of different examples, components do not necessarily have a common configuration.

Example 1

FIG. 1 shows a configuration and movement loci of a zoom lens of Example 1, and an illustration method and a configuration thereof are as described above. Therefore, some description is not repeated herein. The zoom lens of Example 1 consists of a first lens group G1, a second lens group G2, a third lens group G3, a fourth lens group G4, and a fifth lens group G5, in order from the object side to the image side. During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Regarding the zoom lens of Example 1, Tables 1A and 1B show basic lens data, and Table 2 shows specifications and variable surface spacings. The table of basic lens data is divided into two tables including Table 1A and Table 1B in order to avoid lengthening of one table. Table 1A shows groups from the first lens group G1 to the middle group GM, and Table 1B shows the final lens group GE and the optical member PP.

The table of basic lens data will be described as follows. The group number column shows the numbers of the corresponding lens groups, and shows the signs of the refractive powers of the respective lens groups in parentheses. For example, the term "1 (positive)" in the group number column corresponds to the first lens group G1 and indicates that the first lens group G1 has a positive refractive power. The surface number column shows surface numbers in a case where the surface closest to the object side is the first surface and the number is increased one by one toward the image side. The curvature radius column shows curvature radii of the respective surfaces. The surface spacing column shows surface spacings between each surface and the surface adjacent to the image side on the optical axis. The Nd column shows a refractive index of each component at the d line. The vd column shows an Abbe number of each component based on the d line. The θg,F column shows a partial dispersion ratio of each component between the g line and the F line. In the rightmost column, the surfaces corresponding to the focusing group and the vibration-proof group are separated and shown in parentheses, and the sign of the refractive power of each group is shown.

In the table of basic lens data, the sign of the curvature radius of the convex surface facing toward the object side is positive, and the sign of the curvature radius of the convex surface facing toward the image side is negative. In a cell of a surface number of a surface corresponding to the aperture stop St, the surface number and a term of (St) are noted. A value at the bottom cell of the surface spacing column in the table indicates a spacing between the image plane Sim and the surface closest to the image side in the table. The symbol DD[ ] is used for each variable surface spacing during zooming, and the object side surface number of the spacing is given in [ ] and is noted in the surfacing spacing column.

Table 2 shows a zoom magnification Zr, a focal length f, an F number FNo, a maximum total angle of view 2ω, and the variable surface spacing, based on the d line. The zoom magnification Zr is a zoom ratio. [°] in the cell of 2ω indicates that the unit thereof is degrees. Table 2 shows four types of states in which two types of zooming states and two types of imaging distances are combined. That is, Table 2 shows, in order from the left, the following states: a wide angle end state in which the imaging distance is infinite; a telephoto end state in which the imaging distance is infinite; a wide angle end state in which the imaging distance is 2.4 m (meters); and a telephoto end state in which the imaging distance is 2.4 m (meters). However, the zoom magnification and the focal length are shown only in a case where the imaging distance is infinite. The imaging distance is a distance from the image plane Sim.

In the data of each table, degrees are used as a unit of an angle, and millimeters (mm) are used as a unit of a length other than the imaging distance, but appropriate different units may be used since the optical system can be used even in a case where the system is enlarged or reduced in proportion. Further, each of the following tables shows numerical values rounded off to predetermined decimal places.

TABLE 1A

| Group number | Surface number | Curvature radius | Surface spacing | Nd | vd | θg, F |
|---|---|---|---|---|---|---|
| 1 (Positive) | 1 | 219.92339 | 1.800 | 1.62005 | 36.35 | 0.58602 |
| | 2 | 106.03107 | 0.173 | | | |
| | 3 | 107.10239 | 8.084 | 1.43700 | 95.10 | 0.53364 |
| | 4 | −1680.72811 | 0.200 | | | |
| | 5 | 104.53654 | 7.587 | 1.43700 | 95.10 | 0.53364 |
| | 6 | ∞ | DD[6] | | | |
| 2 (Negative) | 7 | −189.34115 | 2.156 | 1.69680 | 55.53 | 0.54404 |
| | 8 | 64.65608 | 3.911 | | | |
| | 9 | −72.79432 | 1.424 | 1.43700 | 95.10 | 0.53364 |
| | 10 | 77.59181 | 3.220 | 1.85896 | 22.73 | 0.62844 |
| | 11 | 259.94009 | DD[11] | | | |
| 3 (Positive) | 12 | ∞ | 4.886 | 1.49700 | 81.54 | 0.53748 |
| | 13 | −77.53366 | 0.394 | | | |
| | 14 | 123.85155 | 3.510 | 1.49700 | 81.54 | 0.53748 |
| | 15 | ∞ | 0.100 | | | |
| | 16 | 83.54384 | 7.171 | 1.43700 | 95.10 | 0.53364 |
| | 17 | −112.04376 | 1.836 | 1.91082 | 35.25 | 0.58224 |
| | 18 | ∞ | DD[18] | | | |
| 4 (Positive) | 19 | 57.39355 | 1.224 | 1.78590 | 44.20 | 0.56317 |
| | 20 | 34.62265 | 1.500 | | | |
| | 21 | 34.60758 | 8.297 | 1.49700 | 81.54 | 0.53748 |
| | 22 | −244.56997 | DD[22] | | | |

TABLE 1B

| Group number | Surface number | Curvature radius | Surface spacing | Nd | vd | θg, F | |
|---|---|---|---|---|---|---|---|
| 5 (Negative) | 23(St) | ∞ | DD[23] | | | | |
| | 24 | −279.12302 | 3.447 | 1.73800 | 32.33 | 0.59005 | Focusing group |
| | 25 | −37.04456 | 1.148 | 1.69680 | 55.53 | 0.54404 | (Negative) |
| | 26 | 62.10900 | DD[26] | | | | |
| | 27 | 434.57118 | 3.680 | 1.54814 | 45.78 | 0.56859 | |
| | 28 | −22.53399 | 0.827 | 2.00069 | 25.46 | 0.61364 | |
| | 29 | −33.25735 | 2.500 | | | | |
| | 30 | 51.14499 | 3.011 | 1.80519 | 25.48 | 0.61354 | Vibration-proof |
| | 31 | −51.14499 | 0.839 | 1.72915 | 54.64 | 0.54488 | group |
| | 32 | 26.55426 | 1.993 | | | | (Negative) |
| | 33 | −96.45008 | 0.666 | 1.81600 | 46.54 | 0.55532 | |
| | 34 | 42.45805 | 2.614 | | | | |
| | 35 | 30.17232 | 4.692 | 1.67300 | 38.26 | 0.57580 | |
| | 36 | −22.16027 | 0.810 | 2.00069 | 25.46 | 0.61364 | |
| | 37 | 33.82280 | 3.126 | 1.73800 | 32.33 | 0.59005 | |
| | 38 | −72.36949 | 1.252 | | | | |
| | 39 | 49.39686 | 4.043 | 1.60342 | 38.03 | 0.58356 | |
| | 40 | −29.15715 | 5.600 | | | | |
| | 41 | −23.02408 | 0.657 | 1.62041 | 60.37 | 0.54240 | |
| | 42 | 126.75141 | 53.922 | | | | |
| | 43 | ∞ | 2.850 | 1.51680 | 64.20 | 0.53430 | |
| | 44 | ∞ | 1.000 | | | | |

TABLE 2

|  | Wide angle end | Telephoto end | Wide angle end | Telephoto end |
|---|---|---|---|---|
| Imaging distance | Infinity | Infinity | 2.4 m | 2.4 m |
| Zoom magnification | 1.00 | 3.77 | | |
| f | 154.611 | 582.420 | | |
| FNo. | 5.76 | 8.19 | 5.85 | 9.48 |
| 2ω[°] | 10.4 | 2.8 | 10.2 | 2.4 |
| DD[6] | 24.897 | 97.402 | 24.897 | 97.402 |
| DD[11] | 79.546 | 3.466 | 79.546 | 3.466 |
| DD[18] | 20.998 | 31.214 | 20.998 | 31.214 |
| DD[22] | 11.323 | 4.682 | 11.323 | 4.682 |
| DD[23] | 5.239 | 5.239 | 6.686 | 26.890 |
| DD[26] | 26.884 | 26.884 | 25.437 | 5.233 |

Figure 4:
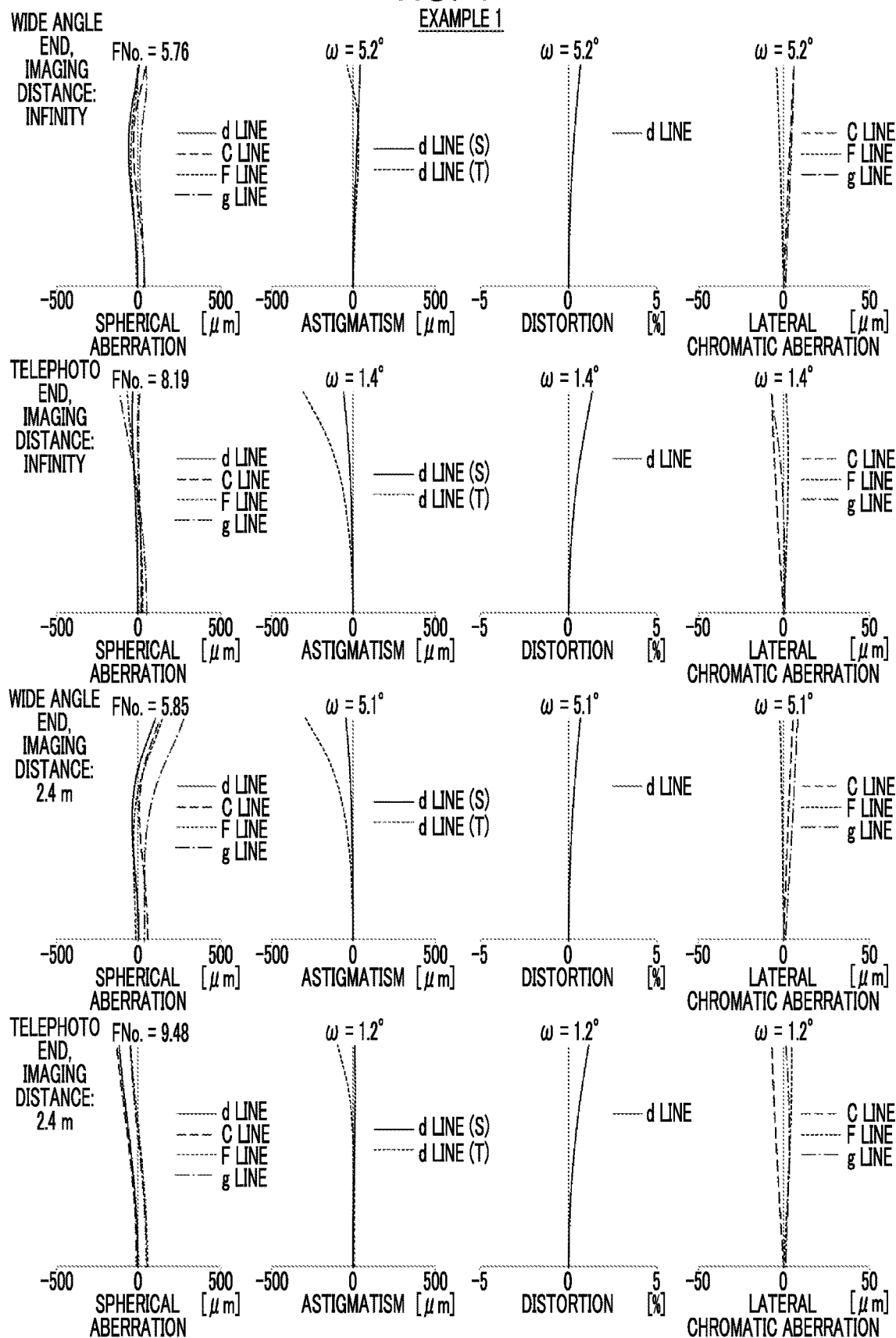
FIG. 4 is a diagram showing aberrations of the zoom lens of Example 1.

FIG. 4 shows a diagram of aberrations of the zoom lens of Example 1. In FIG. 4, in order from the left side, spherical aberration, astigmatism, distortion, and lateral chromatic aberration are shown. In FIG. 4, the top row labeled "wide angle end, imaging distance: infinity" shows aberrations in the wide angle end state in which the imaging distance is infinite. The second row labeled "telephoto end, imaging distance: infinity" shows aberrations in the telephoto end state in which the imaging distance is infinite. The third row labeled "wide angle end, imaging distance: 2.4 m" shows aberrations in the wide angle end state in which the imaging distance is 2.4 m (meters). The bottom row labeled "telephoto end, imaging distance: 2.4 m" shows aberrations in the telephoto end state with the imaging distance of 2.4 m (meters). In the spherical aberration diagram, aberrations at the d line, the C line, the F line, and the g line are indicated by a solid line, a long broken line, a short broken line, and a chain line, respectively. In the astigmatism diagram, aberration in a sagittal direction at the d line is indicated by a solid line, and aberration in a tangential direction at the d line is indicated by a short broken line. In the distortion diagram, aberration at the d line is indicated by a solid line. In the lateral chromatic aberration diagram, aberrations at the C line, the F line, and the g line are respectively indicated by a long broken line, a short broken line, and a chain line. In the spherical aberration diagram, the value of the F number is shown after FNo.=. In other aberration diagrams, the value of the maximum half angle of view is shown after ω=.

Symbols, meanings, description methods, and illustration methods of the respective data pieces according to Example 1 are generally similar to those in the following examples unless otherwise specified. Therefore, in the following description, repeated description will not be given. In the cross-sectional view of the following examples, the PA lens group GPA and the stationary group Gk are not shown.

Example 2

Figure 5:
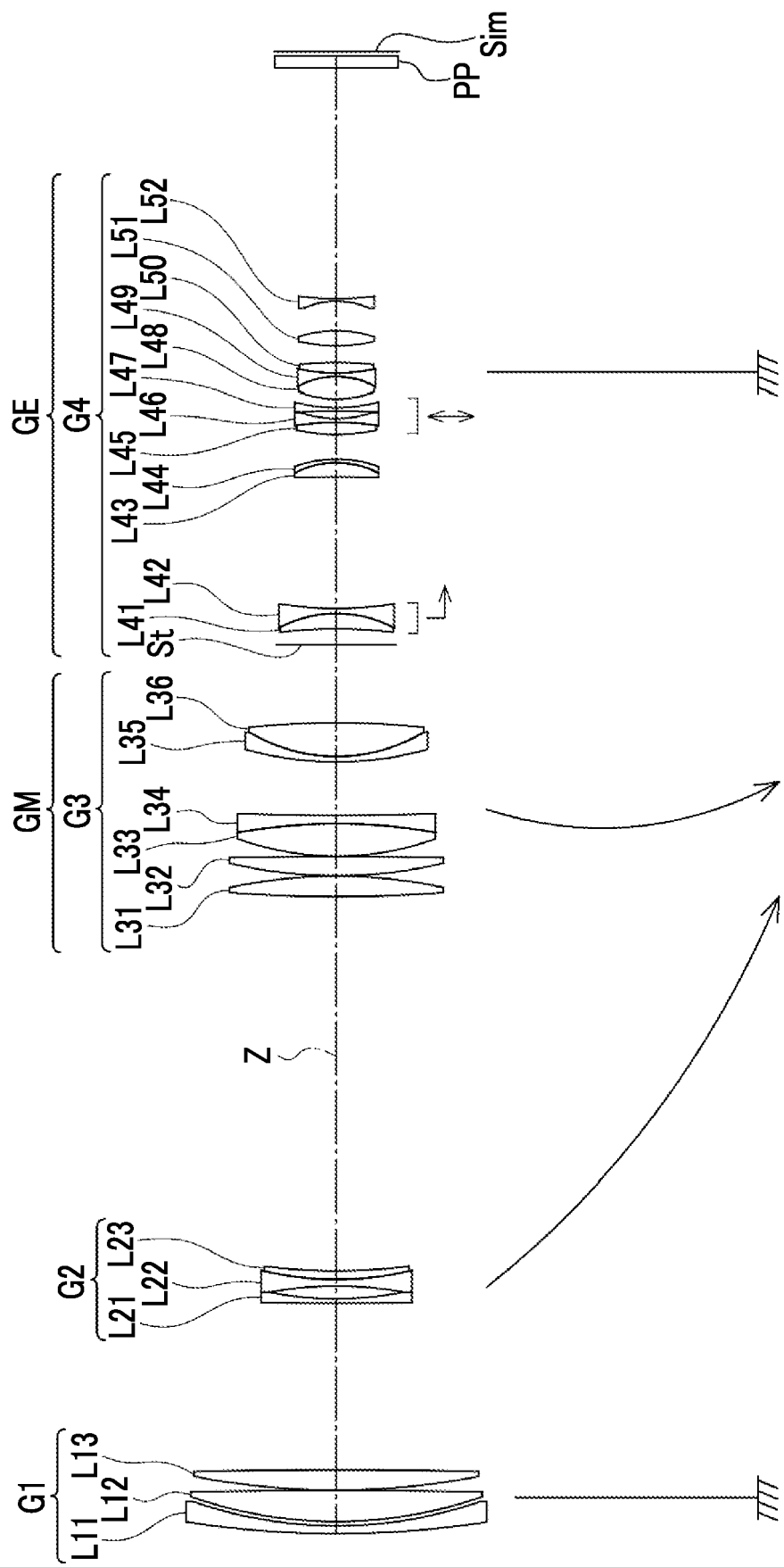
FIG. 5 is a cross-sectional view of a configuration of a zoom lens of Example 2 and a diagram showing movement loci thereof.

FIG. 5 shows a configuration and movement loci of the zoom lens of Example 2. The zoom lens of Example 2 consists of a first lens group G1, a second lens group G2, a third lens group G3, and a fourth lens group G4, in order from the object side to the image side. The first lens group G1 consists of three lenses L11 to L13, in order from the object side to the image side. The second lens group G2 consists of three lenses L21 to L23, in order from the object side to the image side. The third lens group G3 consists of six lenses L31 to L36, in order from the object side to the image side. The fourth lens group G4 consists of an aperture stop St and twelve lenses L41 to L52, in order from the object side to the image side.

During zooming, the first lens group G1 and the fourth lens group G4 remain stationary with respect to the image plane Sim, and the second lens group G2 and the third lens group G3 move along the optical axis Z by changing the spacing from the adjacent lens groups. The middle group GM consists of the third lens group G3. The final lens group GE consists of the fourth lens group G4. The focusing group has a negative refractive power and consists of lenses L41 and L42. The vibration-proof group has a negative refractive power and consists of lenses L45 to L47.

Figure 6:
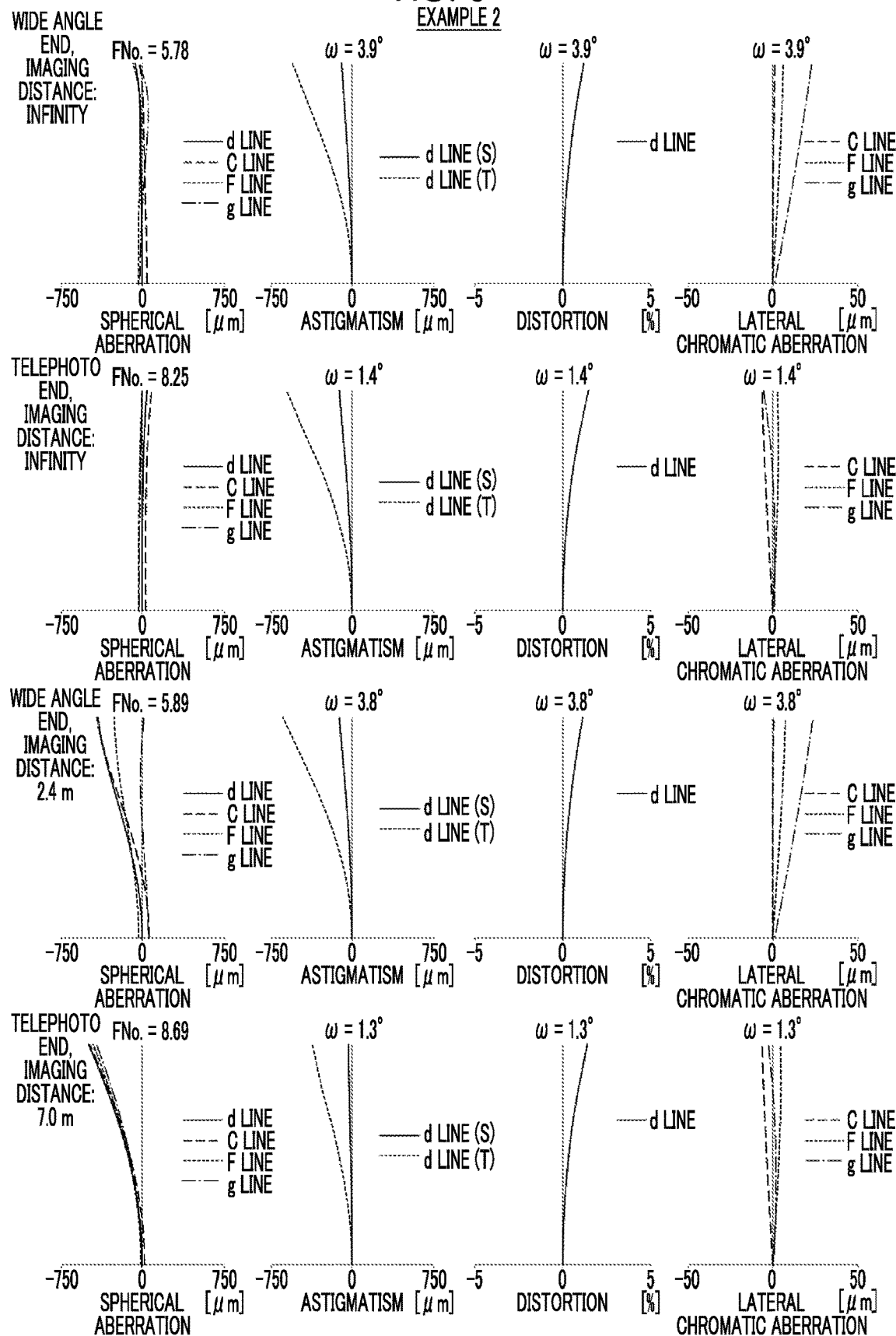
FIG. 6 is a diagram showing aberrations of the zoom lens of Example 2.

Regarding the zoom lens of Example 2, Tables 3A and 3B show basic lens data, and Table 4 shows specifications and variable surface spacings. FIG. 6 shows aberration diagrams. In FIG. 6, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 7.0 m (meters).

TABLE 3A

| Group number | Surface number | Curvature radius | Surface spacing | Nd | νd | θg, F |
|---|---|---|---|---|---|---|
| 1 (Positive) | 1 | 267.53470 | 1.798 | 1.62005 | 36.35 | 0.58602 |
| | 2 | 119.05353 | 1.000 | | | |
| | 3 | 119.82712 | 7.234 | 1.48563 | 85.19 | 0.53858 |
| | 4 | −2365.52175 | 0.100 | | | |
| | 5 | 205.25843 | 4.701 | 1.48563 | 85.19 | 0.53858 |
| | 6 | −1734.33018 | DD[6] | | | |
| 2 (Negative) | 7 | 2669.26989 | 1.065 | 1.69680 | 55.53 | 0.54341 |
| | 8 | 94.96048 | 2.959 | | | |
| | 9 | −102.12467 | 1.526 | 1.48563 | 85.19 | 0.53858 |
| | 10 | 85.08299 | 2.022 | 1.92286 | 20.88 | 0.63900 |
| | 11 | 157.45815 | DD[11] | | | |
| 3 (Positive) | 12 | 403.82852 | 4.788 | 1.49700 | 81.61 | 0.53887 |
| | 13 | −138.72000 | 0.100 | | | |
| | 14 | 126.44658 | 4.457 | 1.49700 | 81.61 | 0.53887 |
| | 15 | −1357.18415 | 0.100 | | | |
| | 16 | 79.12120 | 7.585 | 1.48563 | 85.19 | 0.53858 |
| | 17 | −150.38413 | 1.901 | 1.96413 | 31.07 | 0.59414 |
| | 18 | 752.80732 | 12.500 | | | |
| | 19 | 91.89548 | 1.267 | 1.73167 | 54.83 | 0.54292 |
| | 20 | 45.59423 | 7.879 | 1.49700 | 81.61 | 0.53887 |
| | 21 | −221.25846 | DD[21] | | | |

TABLE 3B

| Group number | Surface number | Curvature radius | Surface spacing | Nd | νd | θg, F | |
|---|---|---|---|---|---|---|---|
| 4 (Negative) | 22(St) | ∞ | DD[22] | | | | |
| | 23 | −129.87507 | 3.577 | 1.73800 | 32.33 | 0.59005 | Focusing group |
| | 24 | −33.06322 | 1.170 | 1.69680 | 55.53 | 0.54404 | (Negative) |
| | 25 | 97.50538 | DD[25] | | | | |
| | 26 | −371.19310 | 3.324 | 1.54814 | 45.78 | 0.56859 | |
| | 27 | −23.98114 | 0.838 | 2.00069 | 25.46 | 0.61364 | |

TABLE 3B-continued

| Group number | Surface number | Curvature radius | Surface spacing | Nd | vd | θg, F | |
|---|---|---|---|---|---|---|---|
| | 28 | −33.35730 | 5.742 | | | | |
| | 29 | 50.50377 | 2.848 | 1.80519 | 25.48 | 0.61354 | Vibration-proof |
| | 30 | −63.72850 | 0.847 | 1.72915 | 54.64 | 0.54488 | group |
| | 31 | 29.55327 | 1.823 | | | | (Negative) |
| | 32 | −126.77320 | 0.682 | 1.81600 | 46.54 | 0.55532 | |
| | 33 | 41.94644 | 2.000 | | | | |
| | 34 | 28.03045 | 5.129 | 1.67300 | 38.26 | 0.57580 | |
| | 35 | −21.38109 | 0.779 | 2.00069 | 25.46 | 0.61364 | |
| | 36 | 46.23941 | 2.464 | 1.73800 | 32.33 | 0.59005 | |
| | 37 | −91.27596 | 3.878 | | | | |
| | 38 | 43.03775 | 3.539 | 1.58144 | 40.75 | 0.57757 | |
| | 39 | −32.29011 | 6.865 | | | | |
| | 40 | −21.46995 | 0.599 | 1.62041 | 60.29 | 0.54266 | |
| | 41 | 78.68602 | 53.766 | | | | |
| | 42 | ∞ | 2.850 | 1.51680 | 64.20 | 0.53430 | |
| | 43 | ∞ | 1.000 | | | | |

TABLE 4

| | Wide angle end | Telephoto end | Wide angle end | Telephoto end |
|---|---|---|---|---|
| Imaging distance | Infinity | Infinity | 2.4 m | 7.0 m |
| Zoom magnification | 1.00 | 2.83 | | |
| f | 206.176 | 582.496 | | |
| FNo. | 5.78 | 8.25 | 5.89 | 8.69 |
| 2ω[°] | 7.8 | 2.8 | 7.6 | 2.6 |
| DD[6] | 38.845 | 129.593 | 38.845 | 129.593 |
| DD[11] | 87.012 | 2.727 | 87.012 | 2.727 |
| DD[21] | 18.103 | 11.640 | 18.103 | 11.640 |
| DD[22] | 3.748 | 3.748 | 6.230 | 10.201 |
| DD[25] | 30.668 | 30.668 | 28.186 | 24.215 |

Example 3

Figure 7:
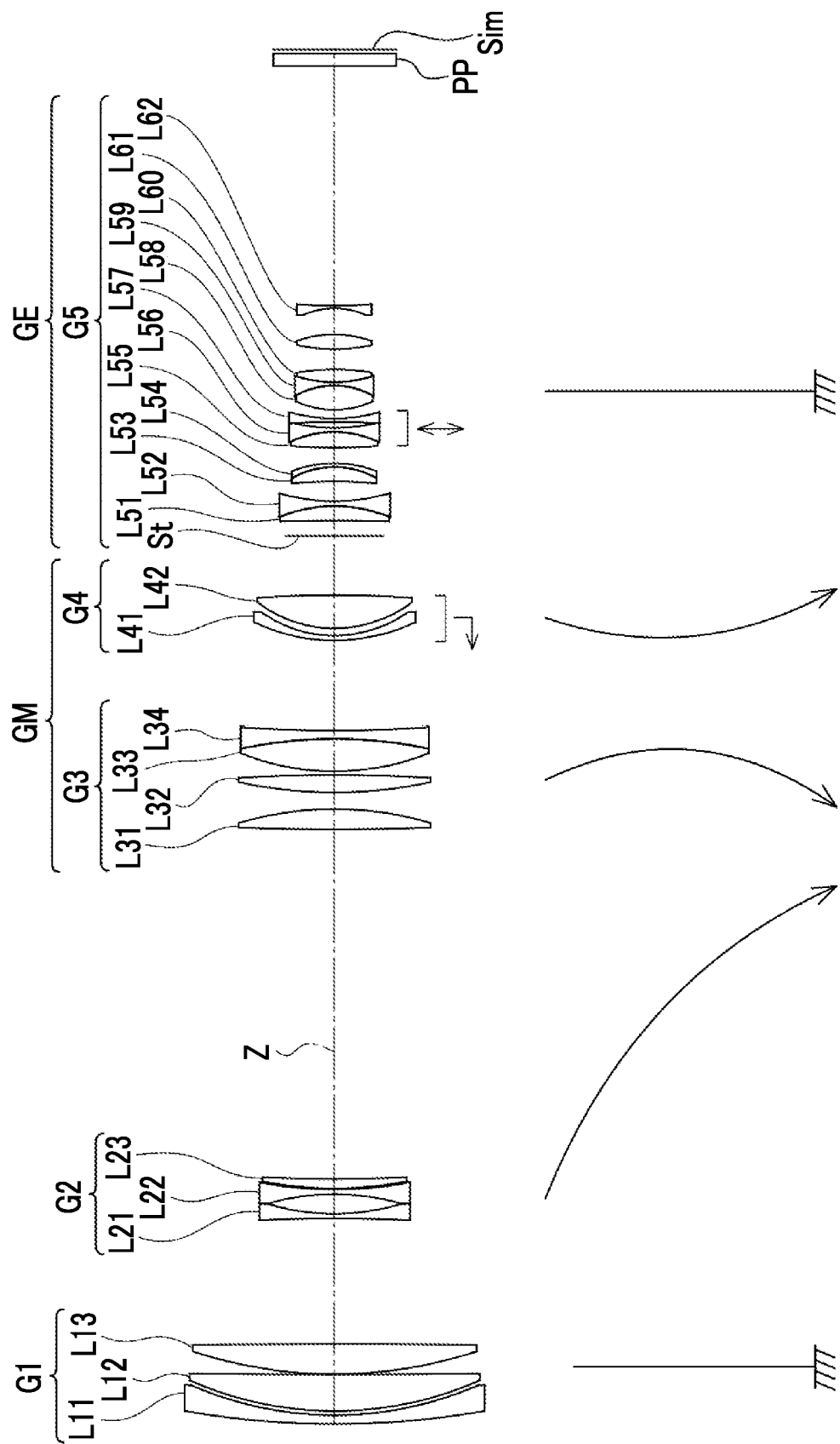
FIG. 7 is a cross-sectional view of a configuration of a zoom lens of Example 3 and a diagram showing movement loci thereof.

FIG. 7 shows a configuration and movement loci of the zoom lens of Example 3. The zoom lens of Example 3 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a positive refractive power and consists of the fourth lens group G4. The vibration-proof group has a negative refractive power and consists of lenses L55 to L57.

Figure 8:
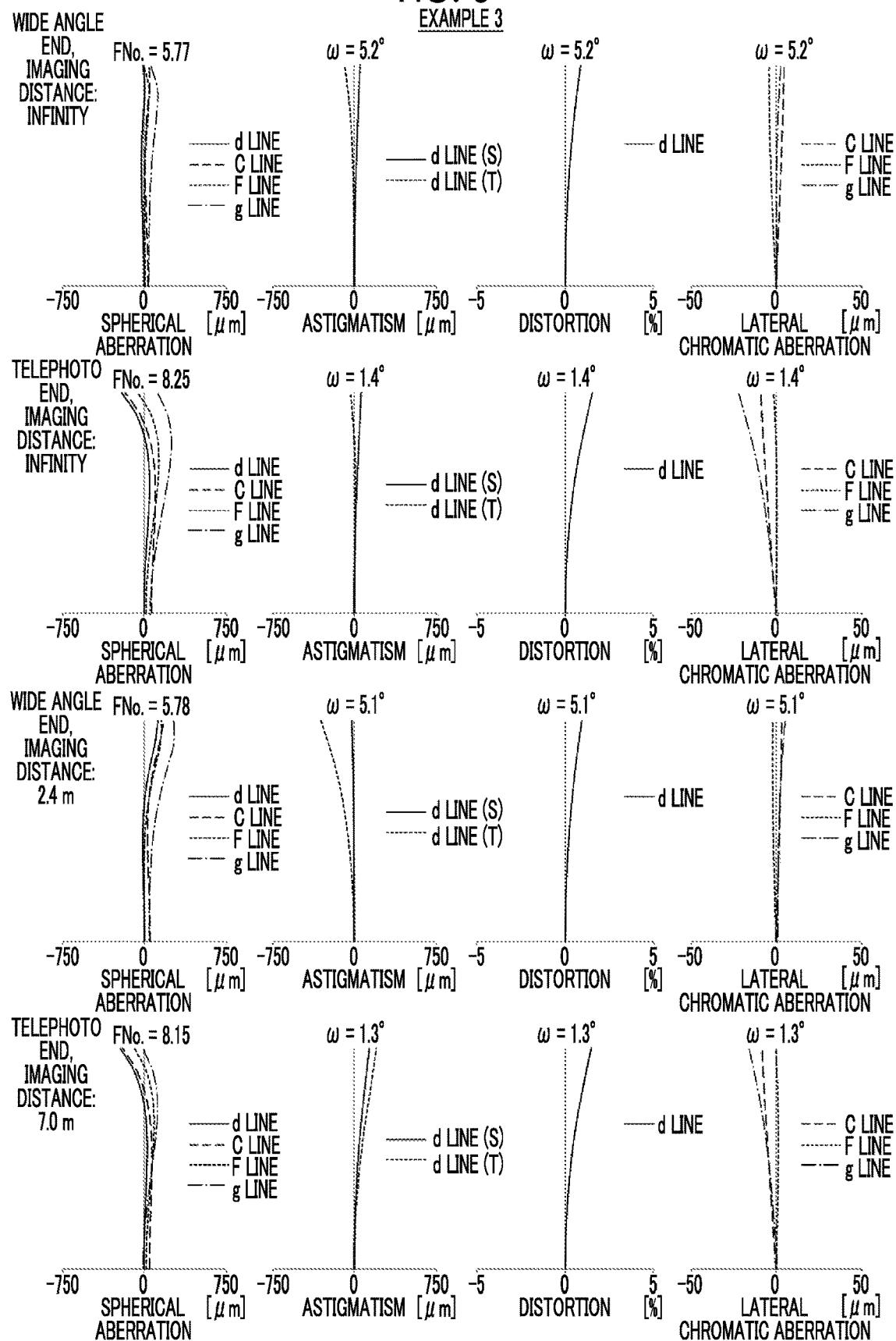
FIG. 8 is a diagram showing aberrations of the zoom lens of Example 3.

Regarding the zoom lens of Example 3, Tables 5A and 5B show basic lens data, and Table 6 shows specifications and variable surface spacings. FIG. 8 shows aberration diagrams. In FIG. 8, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 7.0 m (meters).

TABLE 5A

| Group number | Surface number | Curvature radius | Surface spacing | Nd | vd | θg, F |
|---|---|---|---|---|---|---|
| 1 (Positive) | 1 | 239.68561 | 2.022 | 1.62005 | 36.35 | 0.58602 |
| | 2 | 97.71521 | 1.000 | | | |
| | 3 | 97.93859 | 8.497 | 1.49782 | 82.57 | 0.53862 |
| | 4 | 3190.43571 | 0.100 | | | |
| | 5 | 124.17187 | 6.996 | 1.49782 | 82.57 | 0.53862 |
| | 6 | −6005.50007 | DD[6] | | | |
| 2 (Negative) | 7 | −403.99495 | 1.065 | 1.65100 | 56.24 | 0.54210 |
| | 8 | 62.79646 | 4.577 | | | |
| | 9 | −65.83933 | 1.065 | 1.49782 | 82.57 | 0.53862 |
| | 10 | 105.01234 | 0.290 | | | |
| | 11 | 101.25520 | 2.191 | 1.89286 | 20.36 | 0.63944 |
| | 12 | 407.80057 | DD[12] | | | |
| 3 (Positive) | 13 | 654.41603 | 4.777 | 1.49700 | 81.54 | 0.53748 |
| | 14 | −91.29180 | 3.874 | | | |
| | 15 | 123.47041 | 4.105 | 1.49700 | 81.54 | 0.53748 |
| | 16 | −420.23575 | 0.820 | | | |

TABLE 5A-continued

| Group number | Surface number | Curvature radius | Surface spacing | Nd | vd | θg, F | |
|---|---|---|---|---|---|---|---|
| | 17 | 69.15986 | 7.626 | 1.41390 | 100.82 | 0.53373 | |
| | 18 | −121.40919 | 1.899 | 1.89190 | 37.13 | 0.57813 | |
| | 19 | 365.57038 | DD[19] | | | | |
| 4 (Positive) | 20 | 50.59572 | 1.127 | 1.83481 | 42.74 | 0.56490 | Focusing group (Positive) |
| | 21 | 33.98951 | 1.714 | | | | |
| | 22 | 34.43547 | 7.769 | 1.49700 | 81.54 | 0.53748 | |
| | 23 | −297.78914 | DD[23] | | | | |

TABLE 5B

| Group number | Surface number | Curvature radius | Surface spacing | Nd | vd | θg, F | |
|---|---|---|---|---|---|---|---|
| 5 (Positive) | 24(St) | ∞ | 3.535 | | | | |
| | 25 | −565.82821 | 3.395 | 1.73800 | 32.33 | 0.59005 | |
| | 26 | −39.54911 | 1.131 | 1.69680 | 55.53 | 0.54404 | |
| | 27 | 53.02269 | 4.626 | | | | |
| | 28 | −142.08619 | 3.395 | 1.54072 | 47.23 | 0.56511 | |
| | 29 | −23.25629 | 0.861 | 2.00069 | 25.46 | 0.61364 | |
| | 30 | −32.46323 | 3.665 | | | | |
| | 31 | 179.11799 | 3.649 | 1.80519 | 25.48 | 0.61354 | Vibration-proof group (Negative) |
| | 32 | −28.17442 | 0.931 | 1.72915 | 54.64 | 0.54488 | |
| | 33 | 50.20961 | 1.424 | | | | |
| | 34 | −175.65195 | 0.751 | 1.81600 | 46.54 | 0.55532 | |
| | 35 | 43.29035 | 2.058 | | | | |
| | 36 | 25.30650 | 5.669 | 1.67300 | 38.26 | 0.57580 | |
| | 37 | −21.52284 | 0.801 | 2.00069 | 25.46 | 0.61364 | |
| | 38 | 33.82121 | 2.986 | 1.73800 | 32.33 | 0.59005 | |
| | 39 | −61.44915 | 4.729 | | | | |
| | 40 | 50.74558 | 3.419 | 1.62004 | 36.26 | 0.58800 | |
| | 41 | −31.13747 | 6.124 | | | | |
| | 42 | −20.76988 | 0.600 | 1.77250 | 49.60 | 0.55212 | |
| | 43 | 124.34634 | 55.976 | | | | |
| | 44 | ∞ | 2.850 | 1.51680 | 64.20 | 0.53430 | |
| | 45 | ∞ | 1.000 | | | | |

TABLE 6

| | Wide angle end | Telephoto end | Wide angle end | Telephoto end |
|---|---|---|---|---|
| Imaging distance | Infinity | Infinity | 2.4 m | 7.0 m |
| Zoom magnification | 1.00 | 3.77 | | |
| f | 154.651 | 583.093 | | |
| FNo. | 5.77 | 8.25 | 5.78 | 8.15 |
| 2ω[°] | 10.4 | 2.8 | 10.2 | 2.6 |
| DD[6] | 29.414 | 102.475 | 29.414 | 102.475 |
| DD[12] | 81.669 | 2.331 | 81.669 | 2.331 |
| DD[19] | 20.831 | 33.855 | 19.329 | 26.832 |
| DD[23] | 13.867 | 7.120 | 15.369 | 14.143 |

Example 4

Figure 9:
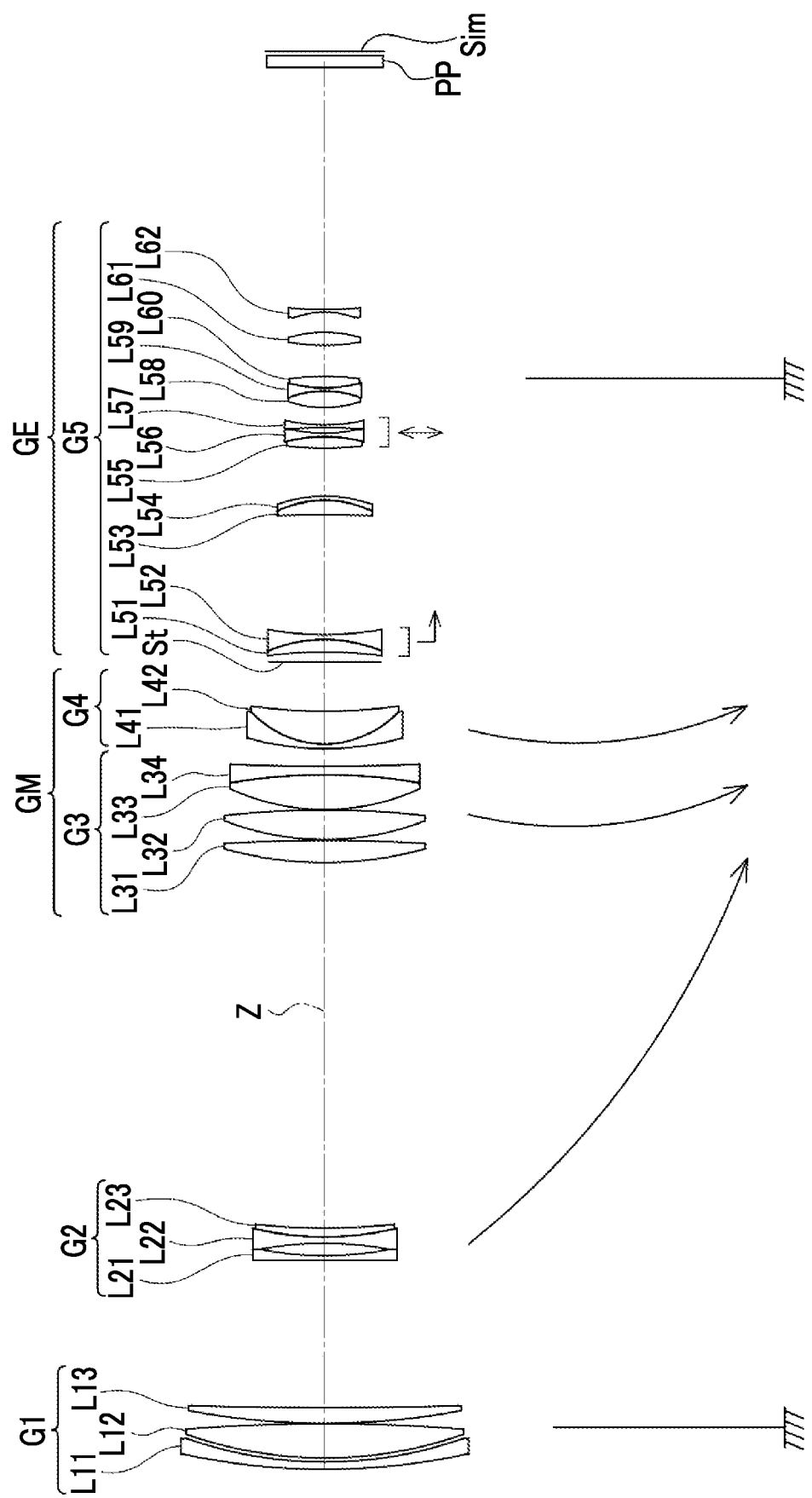
FIG. 9 is a cross-sectional view of a configuration of a zoom lens of Example 4 and a diagram showing movement loci thereof.

FIG. 9 shows a configuration and movement loci of the zoom lens of Example 4. The zoom lens of Example 4 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 10:
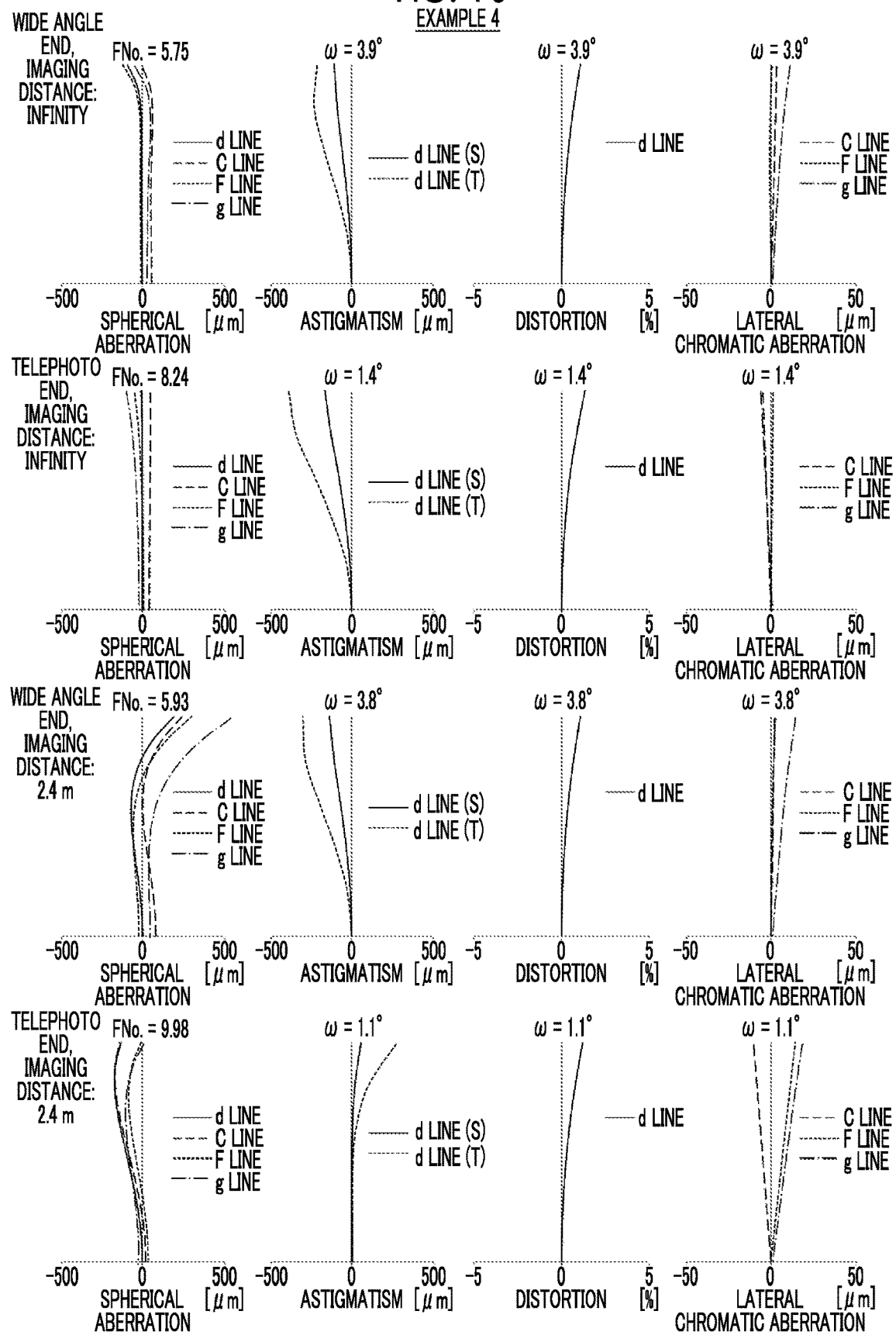
FIG. 10 is a diagram showing aberrations of the zoom lens of Example 4.

Regarding the zoom lens of Example 4, Tables 7A and 7B show basic lens data, and Table 8 shows specifications and variable surface spacings. FIG. 10 shows aberration diagrams. In FIG. 10, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 2.4 m (meters).

TABLE 7A

| Group number | Surface number | Curvature radius | Surface spacing | Nd | vd | θg, F |
|---|---|---|---|---|---|---|
| 1 (Positive) | 1 | 190.29743 | 1.802 | 1.66715 | 35.27 | 0.58693 |
| | 2 | 119.04662 | 1.000 | | | |

TABLE 7A-continued

| Group number | Surface number | Curvature radius | Surface spacing | Nd | vd | θg, F |
|---|---|---|---|---|---|---|
| | 3 | 120.08727 | 8.353 | 1.42537 | 97.75 | 0.53434 |
| | 4 | −503.01147 | 0.100 | | | |
| | 5 | 211.95080 | 3.842 | 1.42537 | 97.75 | 0.53434 |
| | 6 | 1425.19769 | DD[6] | | | |
| 2 (Negative) | 7 | −2120.41580 | 1.067 | 1.69680 | 55.53 | 0.54341 |
| | 8 | 92.95453 | 3.079 | | | |
| | 9 | −96.39368 | 1.532 | 1.43700 | 95.10 | 0.53364 |
| | 10 | 86.50588 | 2.175 | 1.80809 | 22.76 | 0.63073 |
| | 11 | 189.93183 | DD[11] | | | |
| 3 (Positive) | 12 | 105.32247 | 5.463 | 1.55200 | 70.70 | 0.54219 |
| | 13 | −458.55800 | 0.177 | | | |
| | 14 | 78.74310 | 7.230 | 1.49700 | 81.54 | 0.53748 |
| | 15 | −258.26434 | 0.100 | | | |
| | 16 | 64.11641 | 8.523 | 1.42537 | 97.75 | 0.53434 |
| | 17 | −156.31072 | 2.004 | 1.94645 | 33.35 | 0.58657 |
| | 18 | 579.02860 | DD[18] | | | |
| 4 (Negative) | 19 | 80.63363 | 1.130 | 1.82350 | 45.65 | 0.55644 |
| | 20 | 27.96823 | 8.042 | 1.57242 | 57.46 | 0.54893 |
| | 21 | 156.01684 | DD[21] | | | |

TABLE 7B

| Group number | Surface number | Curvature radius | Surface spacing | Nd | vd | θg, F | |
|---|---|---|---|---|---|---|---|
| 5 (Negative) | 22(St) | ∞ | DD[22] | | | | |
| | 23 | −121.20397 | 2.991 | 1.73800 | 32.33 | 0.59005 | Focusing group |
| | 24 | −41.73123 | 1.210 | 1.69680 | 55.53 | 0.54404 | (Negative) |
| | 25 | 90.27079 | DD[25] | | | | |
| | 26 | −500.48801 | 3.618 | 1.54814 | 45.78 | 0.56859 | |
| | 27 | −30.62443 | 1.002 | 2.00069 | 25.46 | 0.61364 | |
| | 28 | −39.40937 | 11.727 | | | | |
| | 29 | 95.86716 | 2.766 | 1.80519 | 25.48 | 0.61354 | Vibration-proof |
| | 30 | −45.22919 | 0.849 | 1.72915 | 54.64 | 0.54488 | group |
| | 31 | 42.36693 | 1.348 | | | | (Negative) |
| | 32 | −131.43380 | 0.684 | 1.81600 | 46.54 | 0.55532 | |
| | 33 | 49.73081 | 4.226 | | | | |
| | 34 | 32.43273 | 4.047 | 1.67300 | 38.26 | 0.57580 | |
| | 35 | −29.15422 | 0.781 | 2.00069 | 25.46 | 0.61364 | |
| | 36 | 39.69493 | 2.774 | 1.73800 | 32.33 | 0.59005 | |
| | 37 | −77.08721 | 7.573 | | | | |
| | 38 | 56.51114 | 3.235 | 1.58144 | 40.75 | 0.57757 | |
| | 39 | −34.93685 | 4.926 | | | | |
| | 40 | −25.01023 | 0.602 | 1.62041 | 60.29 | 0.54266 | |
| | 41 | 107.52290 | 59.174 | | | | |
| | 42 | ∞ | 2.850 | 1.51680 | 64.20 | 0.53430 | |
| | 43 | ∞ | 1.000 | | | | |

TABLE 8

| | Wide angle end | Telephoto end | Wide angle end | Telephoto end |
|---|---|---|---|---|
| Imaging distance | Infinity | Infinity | 2.4 m | 2.4 m |
| Zoom magnification | 1.00 | 2.83 | | |
| f | 206.086 | 582.244 | | |
| FNo. | 5.75 | 8.24 | 5.93 | 9.98 |
| 2ω[°] | 7.8 | 2.8 | 7.6 | 2.2 |
| DD[6] | 36.000 | 130.149 | 36.000 | 130.149 |
| DD[11] | 89.219 | 2.223 | 89.219 | 2.223 |
| DD[18] | 4.133 | 2.911 | 4.133 | 2.911 |
| DD[21] | 12.016 | 6.085 | 12.016 | 6.085 |
| DD[22] | 2.480 | 2.480 | 4.802 | 22.857 |
| DD[25] | 29.222 | 29.222 | 26.900 | 8.845 |

Example 5

Figure 11:
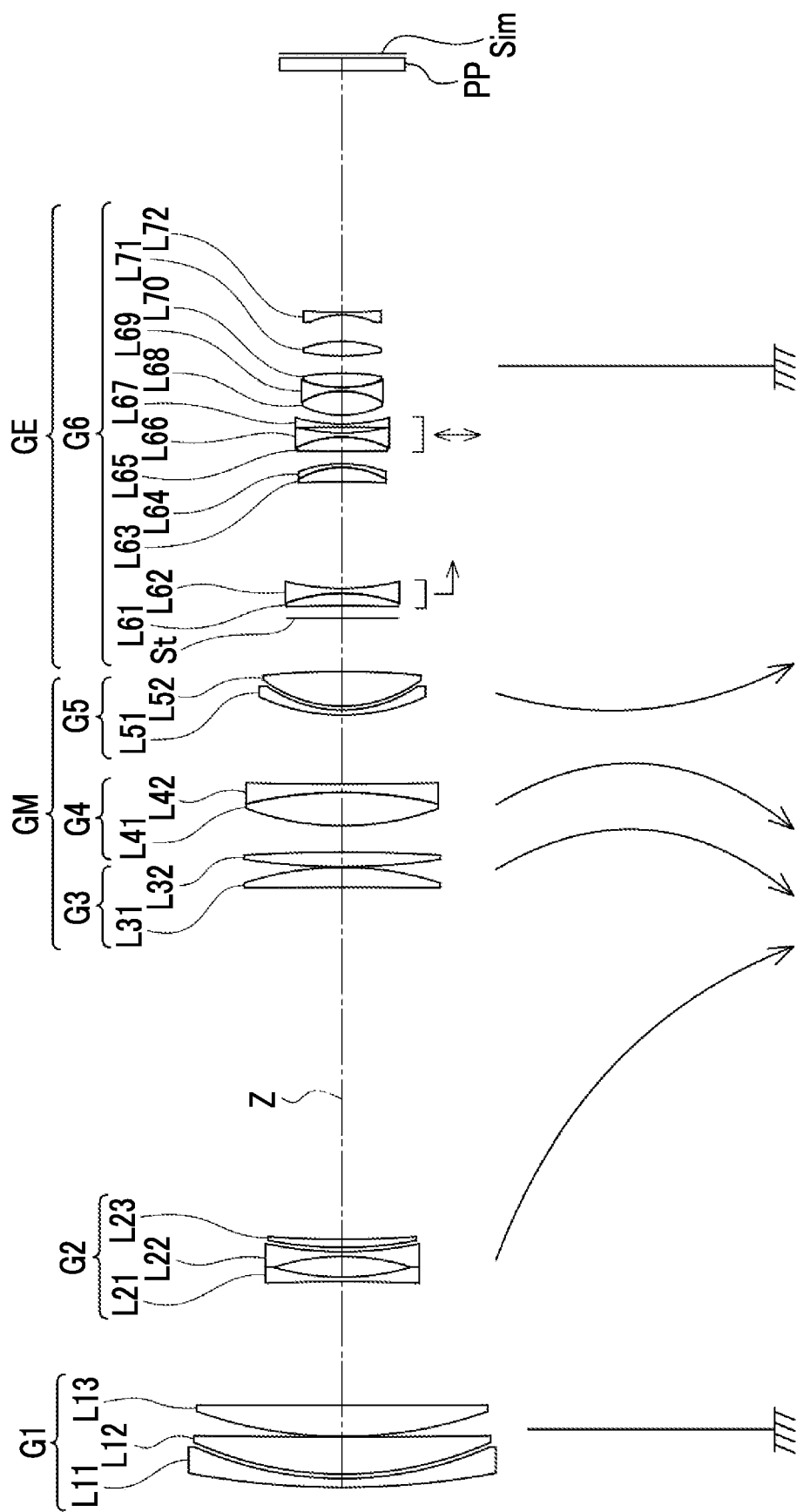
FIG. 11 is a cross-sectional view of a configuration of a zoom lens of Example 5 and a diagram showing movement loci thereof.

FIG. 11 shows a configuration and movement loci of the zoom lens of Example 5. The zoom lens in Example 5 consists of, in order from the object side to the image side, a first lens group G1, a second lens group G2, a third lens group G3, a fourth lens group G4, a fifth lens group G5, and a sixth lens group G6. The first lens group G1 consists of three lenses L11 to L13, in order from the object side to the image side. The second lens group G2 consists of three lenses L21 to L23, in order from the object side to the image side. The third lens group G3 consists of two lenses L31 and L32, in order from the object side to the image side. The fourth lens group G4 consists of two lenses L41 and L42, in order from the object side to the image side. The fifth lens group G5 consists of two lenses L51 and L52, in order from the object side to the image side. The sixth lens group G6 consists of an aperture stop St and twelve lenses L61 to L72, in order from the object side to the image side.

During zooming, the first lens group G1 and the sixth lens group G6 remain stationary with respect to the image plane Sim, and the second lens group G2, the third lens group G3, the fourth lens group G4, and the fifth lens group G5 move along the optical axis Z by changing the spacings between the adjacent lens groups. The middle group GM consists of the third lens group G3, the fourth lens group G4, and the fifth lens group G5. The final lens group GE consists of the sixth lens group G6. The focusing group has a negative refractive power and consists of lenses L61 and L62. The vibration-proof group has a negative refractive power and consists of lenses L65 to L67.

Figure 12:
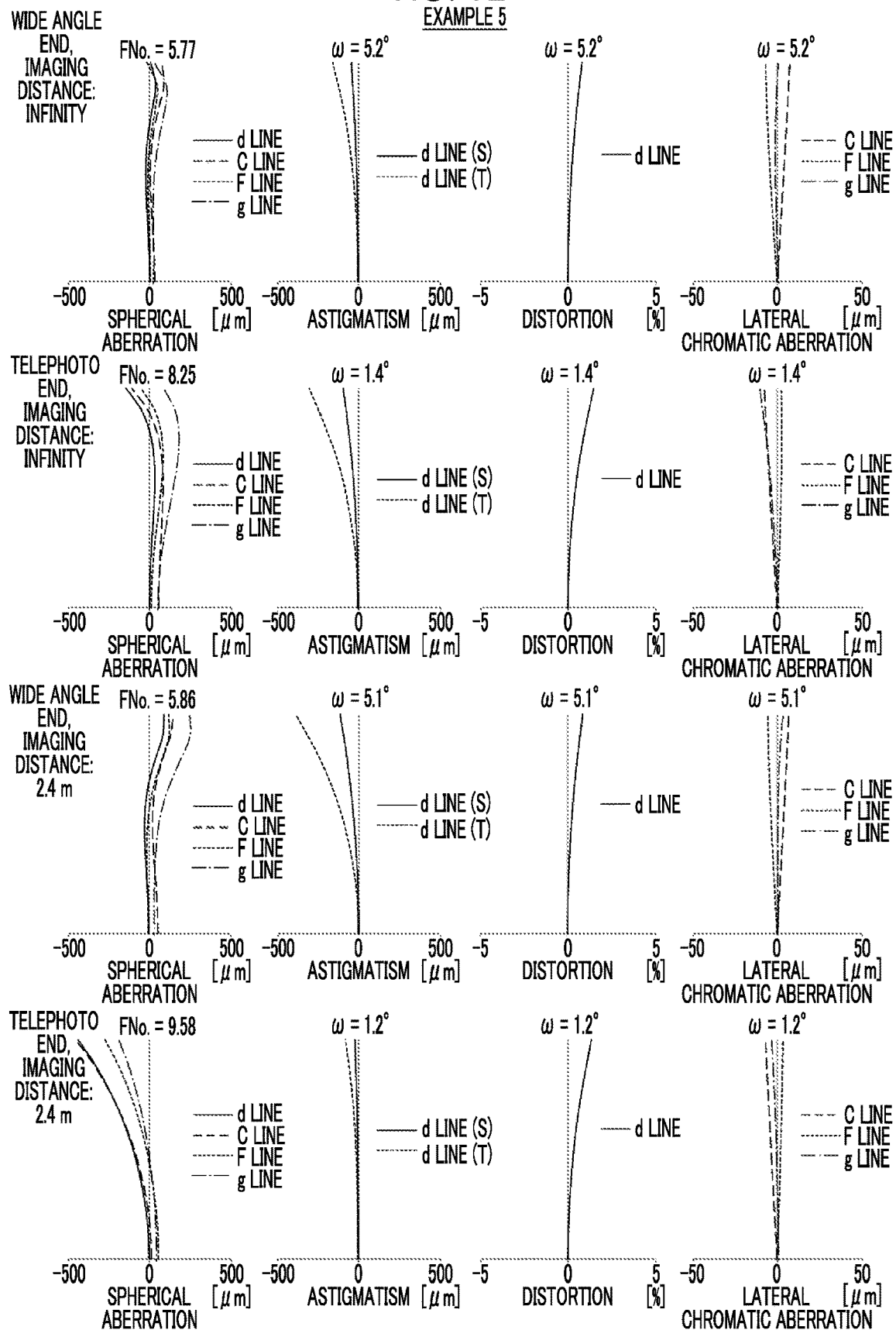
FIG. 12 is a diagram showing aberrations of the zoom lens of Example 5.

Regarding the zoom lens of Example 5, Tables 9A and 9B show basic lens data, and Table 10 shows specifications and variable surface spacings. FIG. 12 shows aberration diagrams. In FIG. 12, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 2.4 m (meters).

TABLE 9A

| Group number | Surface number | Curvature radius | Surface spacing | Nd | νd | θg, F |
|---|---|---|---|---|---|---|
| 1 (Positive) | 1 | 224.29925 | 2.020 | 1.62005 | 36.35 | 0.58602 |
|  | 2 | 96.13932 | 1.000 |  |  |  |
|  | 3 | 96.39725 | 8.508 | 1.48563 | 85.19 | 0.53858 |
|  | 4 | 2359.91868 | 0.100 |  |  |  |
|  | 5 | 116.29160 | 7.144 | 1.49782 | 82.57 | 0.53862 |
|  | 6 | 26534.95814 | DD[6] |  |  |  |
| 2 (Negative) | 7 | −743.19064 | 1.065 | 1.72916 | 54.09 | 0.54490 |
|  | 8 | 64.96697 | 4.728 |  |  |  |
|  | 9 | −59.87189 | 1.065 | 1.43875 | 94.66 | 0.53402 |
|  | 10 | 98.69517 | 0.971 |  |  |  |
|  | 11 | 105.11245 | 1.884 | 2.00272 | 19.32 | 0.64514 |
|  | 12 | 268.28768 | DD[12] |  |  |  |
| 3 (Positive) | 13 | −2521.15737 | 4.482 | 1.49782 | 82.57 | 0.53862 |
|  | 14 | −84.57882 | 0.166 |  |  |  |
|  | 15 | 176.97364 | 3.373 | 1.49782 | 82.57 | 0.53862 |
|  | 16 | −417.75706 | DD[16] |  |  |  |
| 4 (Positive) | 17 | 73.22707 | 7.620 | 1.43875 | 94.66 | 0.53402 |
|  | 18 | −109.51724 | 1.909 | 1.89190 | 37.13 | 0.57813 |
|  | 19 | 1246.73132 | DD[19] |  |  |  |
| 5 (Positive) | 20 | 52.82904 | 1.127 | 1.83481 | 42.74 | 0.56490 |
|  | 21 | 34.64336 | 0.902 |  |  |  |
|  | 22 | 34.72752 | 7.929 | 1.49700 | 81.54 | 0.53748 |
|  | 23 | −217.00119 | DD[23] |  |  |  |

TABLE 9B

| Group number | Surface number | Curvature radius | Surface spacing | Nd | νd | θg, F | |
|---|---|---|---|---|---|---|---|
| 6 (Negative) | 24(St) | ∞ | DD[24] |  |  |  |  |
|  | 25 | −422.55790 | 2.877 | 1.73800 | 32.33 | 0.59005 | Focusing group |
|  | 26 | −43.84508 | 1.130 | 1.69680 | 55.53 | 0.54404 | (Negative) |
|  | 27 | 62.67162 | DD[27] |  |  |  |  |
|  | 28 | −167.60755 | 3.217 | 1.54072 | 46.97 | 0.56555 |  |
|  | 29 | −22.79385 | 0.860 | 2.00069 | 25.46 | 0.61364 |  |
|  | 30 | −32.59909 | 2.886 |  |  |  |  |
|  | 31 | 1437.64894 | 3.183 | 1.80519 | 25.48 | 0.61354 | Vibration-proof |
|  | 32 | −27.63871 | 0.930 | 1.72915 | 54.64 | 0.54488 | group |
|  | 33 | 47.11749 | 1.331 |  |  |  | (Negative) |
|  | 34 | −378.34159 | 0.750 | 1.81600 | 46.54 | 0.55532 |  |
|  | 35 | 47.48196 | 2.000 |  |  |  |  |
|  | 36 | 24.03476 | 5.532 | 1.67300 | 38.26 | 0.57580 |  |
|  | 37 | −20.67528 | 0.800 | 2.00069 | 25.46 | 0.61364 |  |
|  | 38 | 30.36471 | 3.078 | 1.73800 | 32.33 | 0.59005 |  |
|  | 39 | −64.48170 | 3.915 |  |  |  |  |
|  | 40 | 51.57471 | 3.348 | 1.64769 | 33.84 | 0.59227 |  |
|  | 41 | −29.77684 | 6.052 |  |  |  |  |
|  | 42 | −19.75350 | 0.600 | 1.75500 | 52.32 | 0.54757 |  |
|  | 43 | 141.65548 | 55.226 |  |  |  |  |
|  | 44 | ∞ | 2.850 | 1.51680 | 64.20 | 0.53430 |  |
|  | 45 | ∞ | 1.000 |  |  |  |  |

TABLE 10

|  | Wide angle end | Telephoto end | Wide angle end | Telephoto end |
|---|---|---|---|---|
| Imaging distance | Infinity | Infinity | 2.4 m | 2.4 m |
| Zoom magnification | 1.00 | 3.77 |  |  |
| f | 154.681 | 583.207 |  |  |
| FNo. | 5.77 | 8.25 | 5.86 | 9.58 |
| 2ω[°] | 10.4 | 2.8 | 10.2 | 2.4 |
| DD[6] | 28.228 | 99.835 | 28.228 | 99.835 |
| DD[12] | 80.304 | 2.636 | 80.304 | 2.636 |
| DD[16] | 5.993 | 6.493 | 5.993 | 6.493 |
| DD[19] | 15.791 | 28.082 | 15.791 | 28.082 |
| DD[23] | 12.112 | 5.382 | 12.112 | 5.382 |
| DD[24] | 2.878 | 2.878 | 4.329 | 24.547 |
| DD[27] | 24.424 | 24.424 | 22.973 | 2.755 |

Example 6

Figure 13:
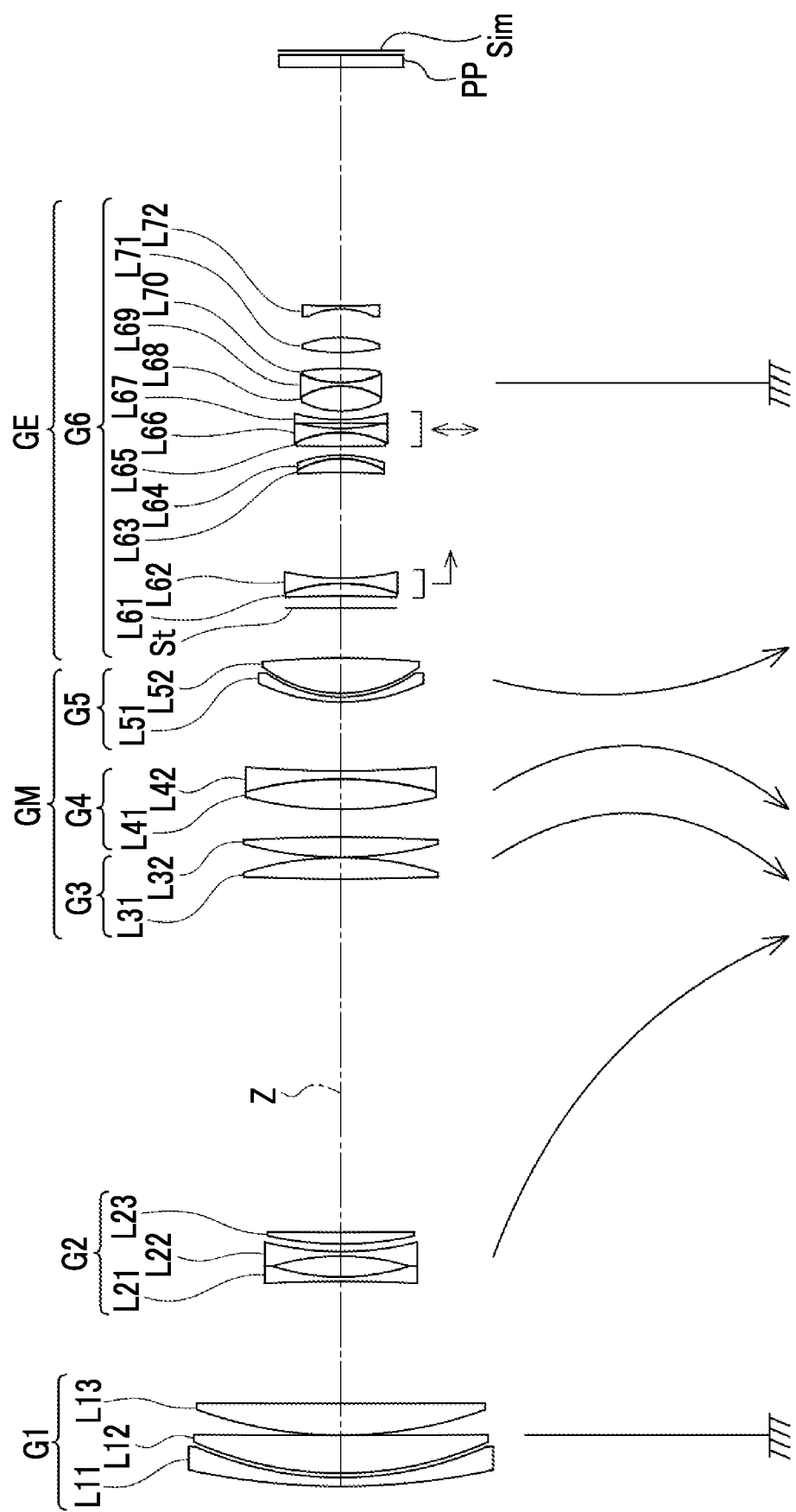
FIG. 13 is a cross-sectional view of a configuration of a zoom lens of Example 6 and a diagram showing movement loci thereof.

FIG. 13 shows a configuration and movement loci of the zoom lens of Example 6. The zoom lens in Example 6 consists of, in order from the object side to the image side, a first lens group G1, a second lens group G2, a third lens group G3, a fourth lens group G4, a fifth lens group G5, and a sixth lens group G6. The first lens group G1 consists of three lenses L11 to L13, in order from the object side to the image side. The second lens group G2 consists of three lenses L21 to L23, in order from the object side to the image side. The third lens group G3 consists of two lenses L31 and L32, in order from the object side to the image side. The fourth lens group G4 consists of two lenses L41 and L42, in order from the object side to the image side. The fifth lens group G5 consists of two lenses L51 and L52, in order from the object side to the image side. The sixth lens group G6 consists of an aperture stop St and twelve lenses L61 to L72, in order from the object side to the image side.

During zooming, the first lens group G1 and the sixth lens group G6 remain stationary with respect to the image plane Sim, and the second lens group G2, the third lens group G3, the fourth lens group G4, and the fifth lens group G5 move along the optical axis Z by changing the spacings between the adjacent lens groups. The middle group GM consists of the third lens group G3, the fourth lens group G4, and the fifth lens group G5. The final lens group GE consists of a sixth lens group G6. The focusing group has a negative refractive power and consists of lenses L61 and L62. The vibration-proof group has a negative refractive power and consists of lenses L65 to L67.

Figure 14:
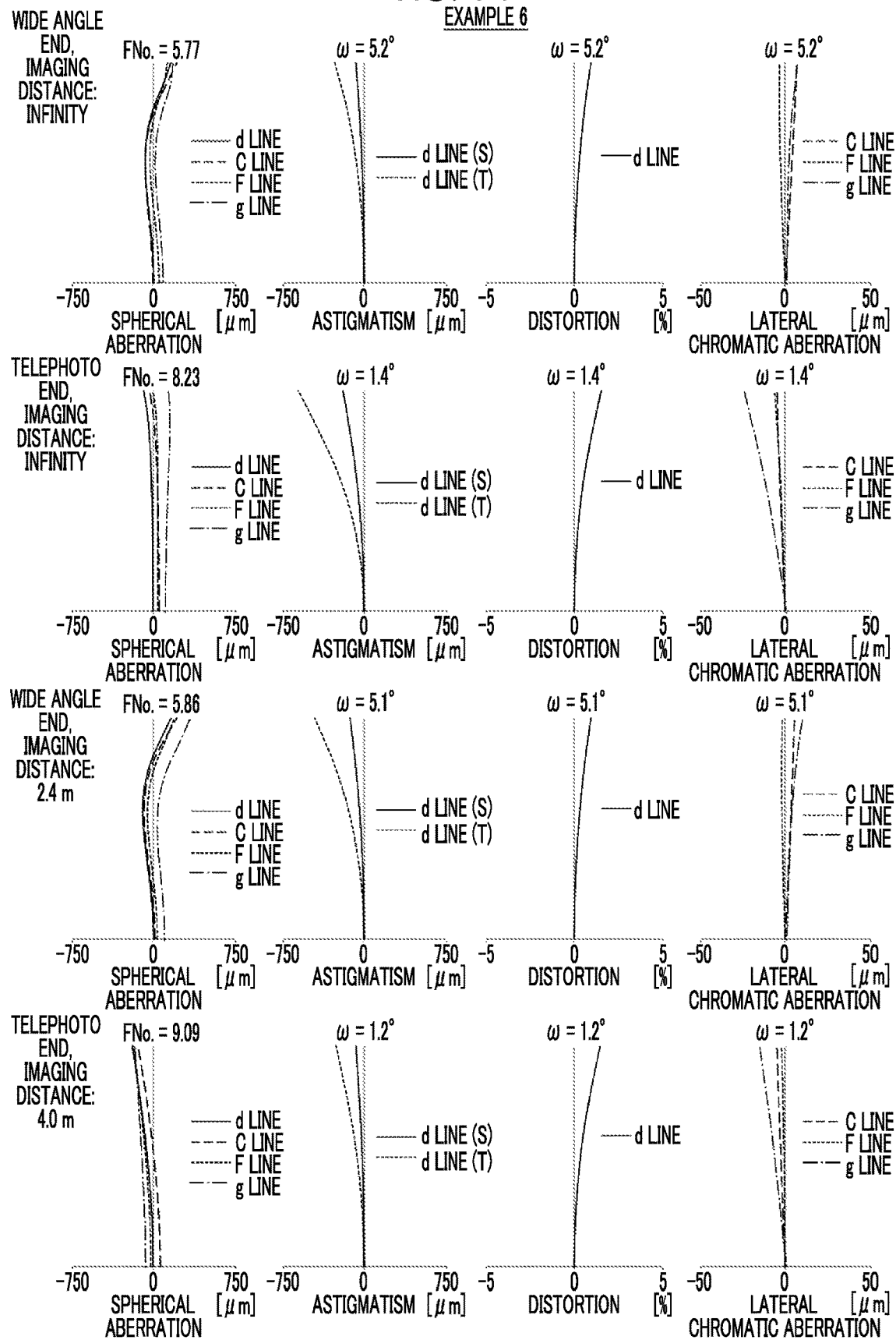
FIG. 14 is a diagram showing aberrations of the zoom lens of Example 6.

Regarding the zoom lens of Example 6, Tables 11A and 11B show basic lens data, and Table 12 shows specifications and variable surface spacings. FIG. 14 shows aberration diagrams. In FIG. 14, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 11A

| Group number | Surface number | Curvature radius | Surface spacing | Nd | νd | θg, F |
|---|---|---|---|---|---|---|
| 1 (Positive) | 1 | 193.87998 | 2.013 | 1.62005 | 36.35 | 0.58602 |
|  | 2 | 96.75205 | 1.000 |  |  |  |
|  | 3 | 97.13320 | 8.680 | 1.45600 | 91.37 | 0.53439 |
|  | 4 | 3080.59078 | 0.100 |  |  |  |
|  | 5 | 113.33728 | 7.319 | 1.45600 | 91.37 | 0.53439 |
|  | 6 | 95802.64353 | DD[6] |  |  |  |
| 2 (Negative) | 7 | −461.03477 | 1.054 | 1.72916 | 54.09 | 0.54490 |
|  | 8 | 59.79912 | 4.789 |  |  |  |
|  | 9 | −63.38897 | 1.047 | 1.45600 | 91.37 | 0.53439 |
|  | 10 | 84.71468 | 1.759 |  |  |  |
|  | 11 | 90.41550 | 2.669 | 1.77830 | 23.91 | 0.62490 |
|  | 12 | 1862.27738 | DD[12] |  |  |  |
| 3 (Positive) | 13 | 613.07874 | 4.919 | 1.45600 | 91.37 | 0.53439 |
|  | 14 | −87.23632 | 0.100 |  |  |  |
|  | 15 | 98.51590 | 4.615 | 1.45600 | 91.37 | 0.53439 |
|  | 16 | −448.50319 | DD[16] |  |  |  |
| 4 (Negative) | 17 | 101.92607 | 6.998 | 1.49700 | 81.54 | 0.53748 |
|  | 18 | −96.23619 | 1.897 | 1.86507 | 39.80 | 0.56997 |
|  | 19 | 334.45544 | DD[19] |  |  |  |
| 5 (Positive) | 20 | 50.68480 | 1.154 | 1.83481 | 42.74 | 0.56490 |
|  | 21 | 34.06454 | 0.851 |  |  |  |
|  | 22 | 34.26046 | 8.159 | 1.49700 | 81.54 | 0.53748 |
|  | 23 | −220.57584 | DD[23] |  |  |  |

TABLE 11B

| Group number | Surface number | Curvature radius | Surface spacing | Nd | νd | θg, F |  |
|---|---|---|---|---|---|---|---|
| 6 (Negative) | 24(St) | ∞ | DD[24] |  |  |  |  |
|  | 25 | −347.10378 | 2.962 | 1.73800 | 32.33 | 0.59005 | Focusing group |
|  | 26 | −42.87406 | 1.141 | 1.69680 | 55.53 | 0.54404 | (Negative) |
|  | 27 | 64.39857 | DD[27] |  |  |  |  |
|  | 28 | −161.97155 | 3.138 | 1.54072 | 46.97 | 0.56555 |  |
|  | 29 | −23.26647 | 0.850 | 2.00069 | 25.46 | 0.61364 |  |
|  | 30 | −33.35404 | 2.011 |  |  |  |  |
|  | 31 | 746.75366 | 3.205 | 1.80519 | 25.48 | 0.61354 | Vibration-proof |
|  | 32 | −27.64972 | 0.931 | 1.72915 | 54.64 | 0.54488 | group |
|  | 33 | 50.00121 | 1.279 |  |  |  | (Negative) |
|  | 34 | −336.18192 | 0.739 | 1.81600 | 46.54 | 0.55532 |  |
|  | 35 | 48.16777 | 2.000 |  |  |  |  |
|  | 36 | 23.64024 | 5.740 | 1.67300 | 38.26 | 0.57580 |  |
|  | 37 | −20.24796 | 0.786 | 2.00069 | 25.46 | 0.61364 |  |
|  | 38 | 29.54475 | 3.123 | 1.73800 | 32.33 | 0.59005 |  |
|  | 39 | −64.92123 | 3.631 |  |  |  |  |
|  | 40 | 51.60231 | 3.451 | 1.64769 | 33.84 | 0.59227 |  |
|  | 41 | −30.06231 | 6.607 |  |  |  |  |
|  | 42 | −19.33147 | 0.592 | 1.75500 | 52.32 | 0.54757 |  |
|  | 43 | 122.81190 | 55.119 |  |  |  |  |
|  | 44 | ∞ | 2.850 | 1.51680 | 64.20 | 0.53430 |  |
|  | 45 | ∞ | 1.000 |  |  |  |  |

TABLE 12

|  | Wide angle | Telephoto end | Wide angle | Telephoto end |
|---|---|---|---|---|
| Imaging distance | Infinity | Infinity | 2.4 m | 4.0 m |
| Zoom magnification | 1.00 | 3.77 |  |  |
| f | 154.649 | 583.084 |  |  |
| FNo. | 5.77 | 8.23 | 5.86 | 9.09 |
| 2ω[°] | 10.4 | 2.8 | 10.2 | 2.4 |
| DD[6] | 28.097 | 101.798 | 28.097 | 101.798 |
| DD[12] | 81.263 | 2.629 | 81.263 | 2.629 |
| DD[16] | 6.411 | 6.911 | 6.411 | 6.911 |
| DD[19] | 15.839 | 27.731 | 15.839 | 27.731 |
| DD[23] | 11.520 | 4.060 | 11.520 | 4.060 |
| DD[24] | 2.715 | 2.715 | 4.164 | 14.794 |
| DD[27] | 24.448 | 24.448 | 22.999 | 12.369 |

Example 7

Figure 15:
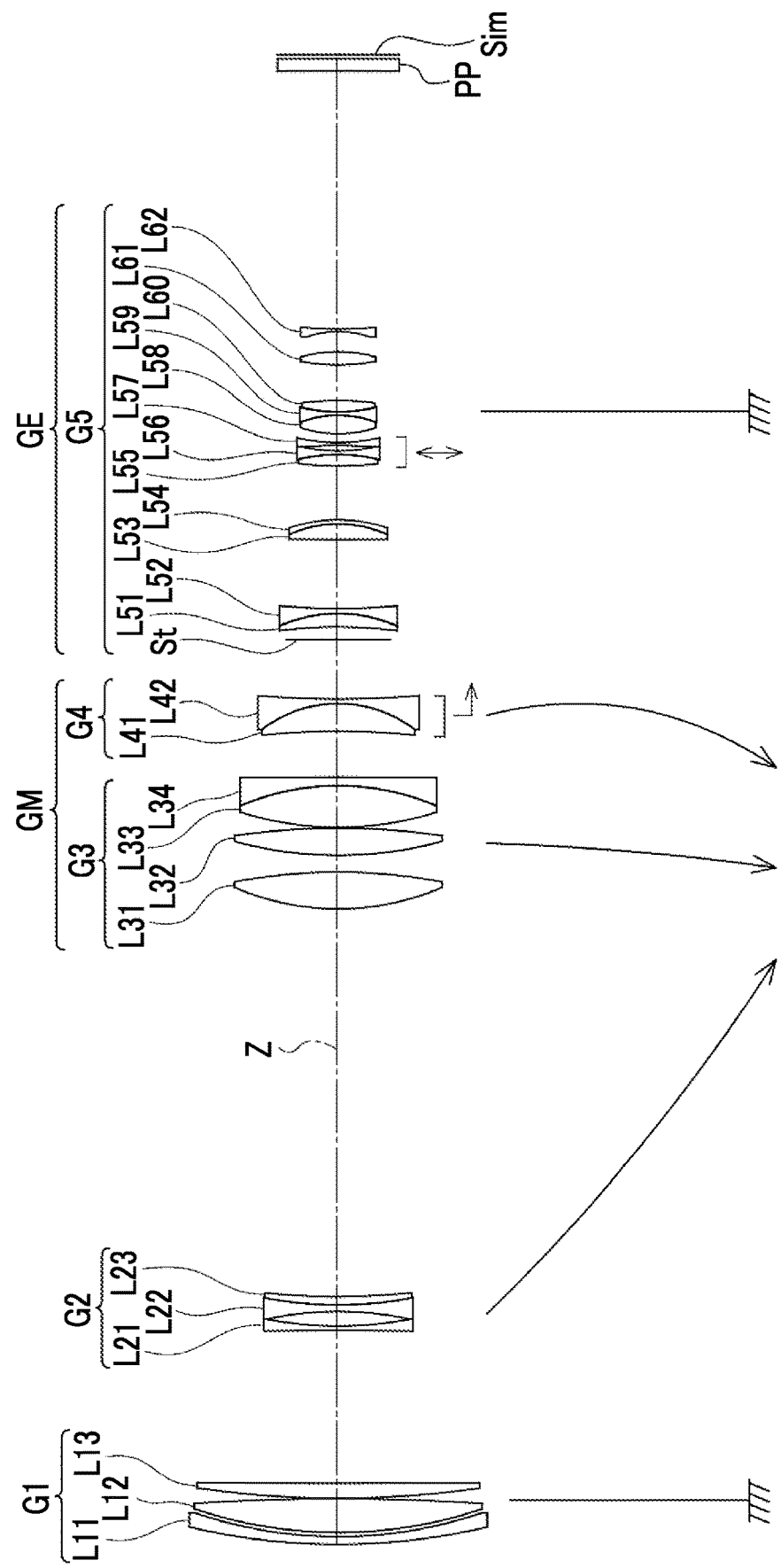
FIG. 15 is a cross-sectional view of a configuration of a zoom lens of Example 7 and a diagram showing movement loci thereof.

FIG. 15 shows a configuration and movement loci of the zoom lens of Example 7. The zoom lens of Example 7 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of the fourth lens group G4. The vibration-proof group has a negative refractive power and consists of lenses L55 to L57.

Figure 16:
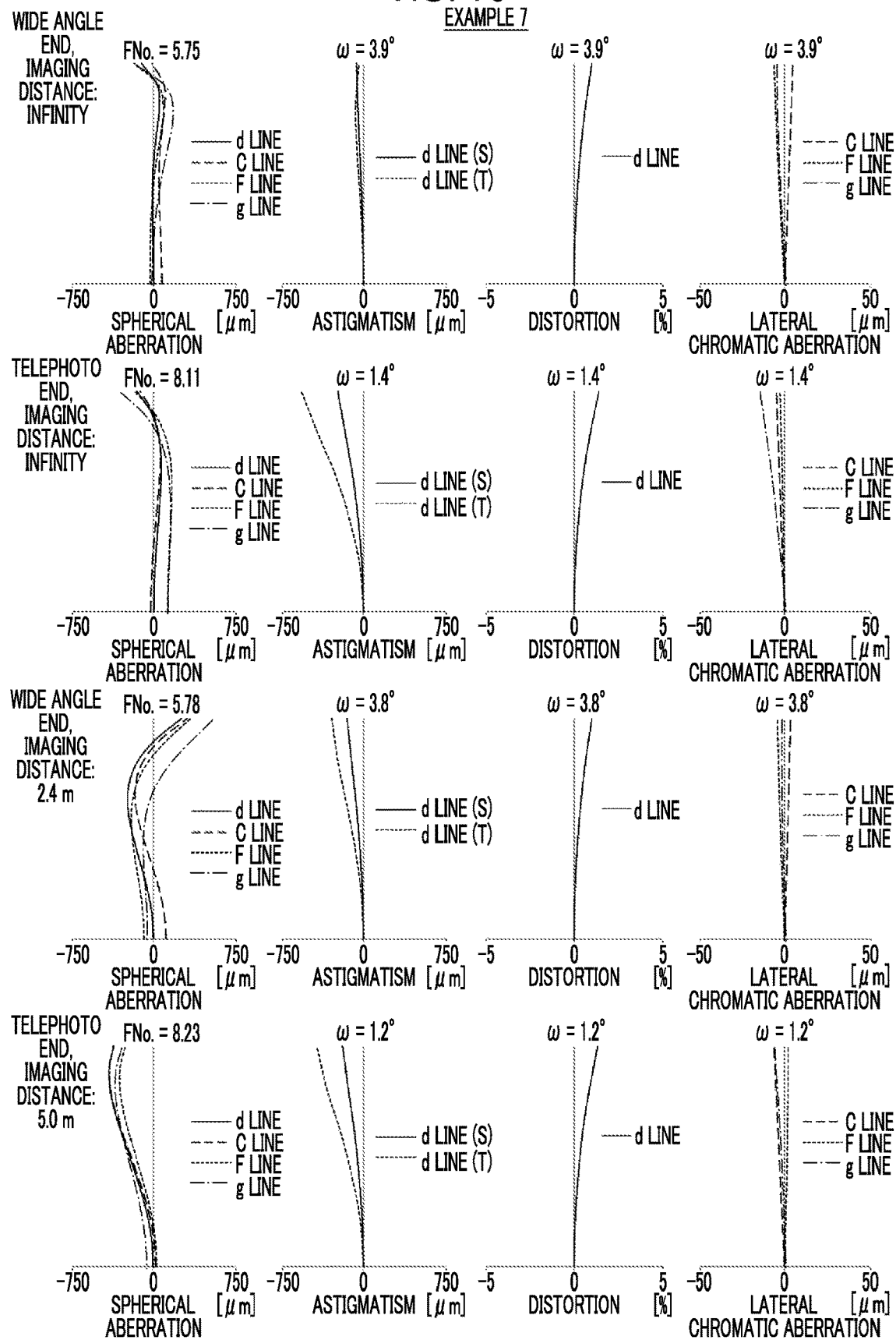
FIG. 16 is a diagram showing aberrations of the zoom lens of Example 7.

Regarding the zoom lens of Example 7, Tables 13A and 13B show basic lens data, and Table 14 shows specifications and variable surface spacings. FIG. 16 shows aberration diagrams. In FIG. 16, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 5.0 m (meters).

TABLE 13A

| Group number | Surface number | Curvature radius | Surface spacing | Nd | vd | θg, F | |
|---|---|---|---|---|---|---|---|
| 1 | 1 | 177.95552 | 1.802 | 1.71534 | 31.79 | 0.59470 | |
| (Positive) | 2 | 122.61425 | 1.006 | | | | |
| | 3 | 124.64540 | 7.942 | 1.43425 | 94.77 | 0.53209 | |
| | 4 | −595.96280 | 0.100 | | | | |
| | 5 | 269.22282 | 3.496 | 1.43425 | 94.77 | 0.53209 | |
| | 6 | 4626.27307 | DD[6] | | | | |
| 2 | 7 | −1420.90008 | 1.070 | 1.69680 | 55.53 | 0.54341 | |
| (Negative) | 8 | 105.27448 | 3.398 | | | | |
| | 9 | −93.22071 | 1.534 | 1.43425 | 94.77 | 0.53209 | |
| | 10 | 101.80983 | 1.995 | 1.89286 | 20.36 | 0.63944 | |
| | 11 | 190.68354 | DD[11] | | | | |
| 3 | 12 | 71.54230 | 8.726 | 1.49700 | 81.54 | 0.53748 | |
| (Positive) | 13 | −152.56997 | 3.968 | | | | |
| | 14 | 108.36919 | 6.383 | 1.49700 | 81.54 | 0.53748 | |
| | 15 | −199.27836 | 0.187 | | | | |
| | 16 | 90.15258 | 9.783 | 1.43425 | 94.77 | 0.53209 | |
| | 17 | −68.60997 | 1.997 | 1.92431 | 35.42 | 0.58045 | |
| | 18 | −3102.69540 | DD[18] | | | | |
| 4 | 19 | −202.33884 | 6.539 | 1.75567 | 46.58 | 0.55980 | Focusing |
| (Negative) | 20 | −34.04935 | 1.075 | 1.71585 | 55.40 | 0.54337 | group (Negative) |
| | 21 | 257.72254 | DD[21] | | | | |

TABLE 13B

| Group number | Surface number | Curvature radius | Surface spacing | Nd | vd | θg, F | |
|---|---|---|---|---|---|---|---|
| 5 | 22(St) | ∞ | 3.008 | | | | |
| (Negative) | 23 | −123.03765 | 3.159 | 1.74853 | 30.17 | 0.59879 | |
| | 24 | −39.53502 | 1.199 | 1.77017 | 41.38 | 0.57145 | |
| | 25 | 179.65038 | 16.201 | | | | |
| | 26 | 1367.99008 | 3.641 | 1.54814 | 45.78 | 0.56859 | |
| | 27 | −32.18403 | 1.012 | 2.00069 | 25.46 | 0.61364 | |
| | 28 | −41.62964 | 12.708 | | | | |
| | 29 | 95.89155 | 2.708 | 1.80519 | 25.48 | 0.61354 | Vibration-proof |
| | 30 | −45.68013 | 0.840 | 1.72915 | 54.64 | 0.54488 | group |
| | 31 | 43.74133 | 1.305 | | | | (Negative) |
| | 32 | −135.44342 | 0.681 | 1.81600 | 46.54 | 0.55532 | |
| | 33 | 49.95355 | 2.042 | | | | |
| | 34 | 31.48672 | 4.371 | 1.67300 | 38.26 | 0.57580 | |
| | 35 | −29.38441 | 0.778 | 2.00069 | 25.46 | 0.61364 | |
| | 36 | 42.59213 | 2.675 | 1.73800 | 32.33 | 0.59005 | |
| | 37 | −76.13235 | 8.117 | | | | |
| | 38 | 52.57374 | 3.140 | 1.58144 | 40.75 | 0.57757 | |
| | 39 | −37.42071 | 4.767 | | | | |
| | 40 | −25.02160 | 0.601 | 1.62041 | 60.29 | 0.54266 | |
| | 41 | 133.97138 | 60.793 | | | | |
| | 42 | ∞ | 2.850 | 1.51680 | 64.20 | 0.53430 | |
| | 43 | ∞ | 1.000 | | | | |

TABLE 14

|  | Wide angle end | Telephoto end | Wide angle end | Telephoto end |
|---|---|---|---|---|
| Imaging distance | Infinity | Infinity | 2.4 m | 5.0 m |
| Zoom magnification | 1.00 | 2.83 | | |
| f | 206.068 | 582.191 | | |
| FNo. | 5.75 | 8.11 | 5.78 | 8.23 |
| 2ω[°] | 7.8 | 2.8 | 7.6 | 2.4 |
| DD[6] | 36.000 | 119.167 | 36.000 | 119.167 |
| DD[11] | 91.106 | 2.230 | 91.106 | 2.230 |
| DD[18] | 10.788 | 4.272 | 14.309 | 15.578 |
| DD[21] | 13.999 | 26.223 | 10.478 | 14.918 |

Example 8

Figure 17:
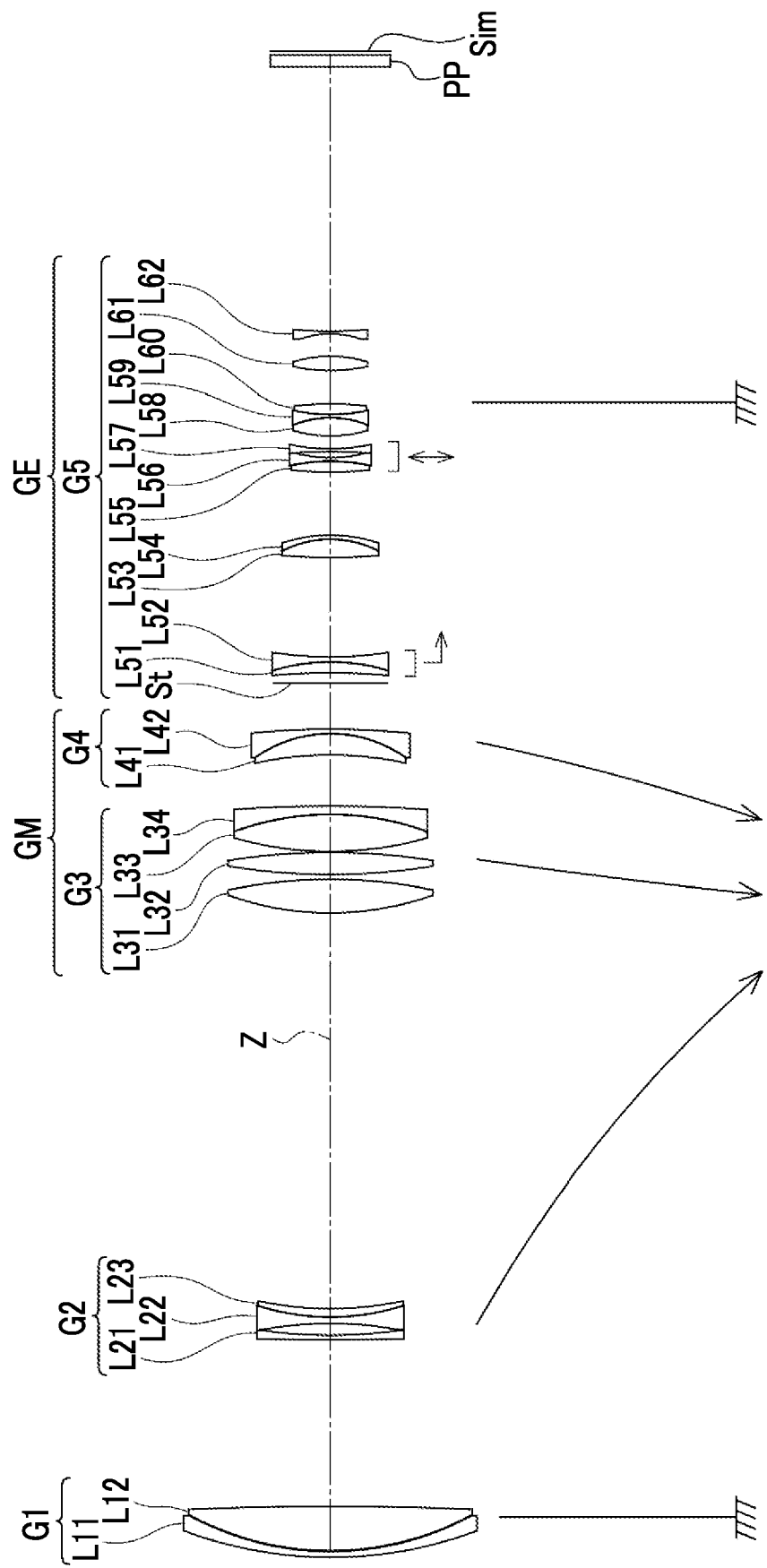
FIG. 17 is a cross-sectional view of a configuration of a zoom lens of Example 8 and a diagram showing movement loci thereof.

FIG. 17 shows a configuration and movement loci of the zoom lens of Example 8. The zoom lens of Example 8 consists of a first lens group G1, a second lens group G2, a third lens group G3, a fourth lens group G4, and a fifth lens group G5, in order from the object side to the image side. The first lens group G1 consists of two lenses L11 and L12, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 18:
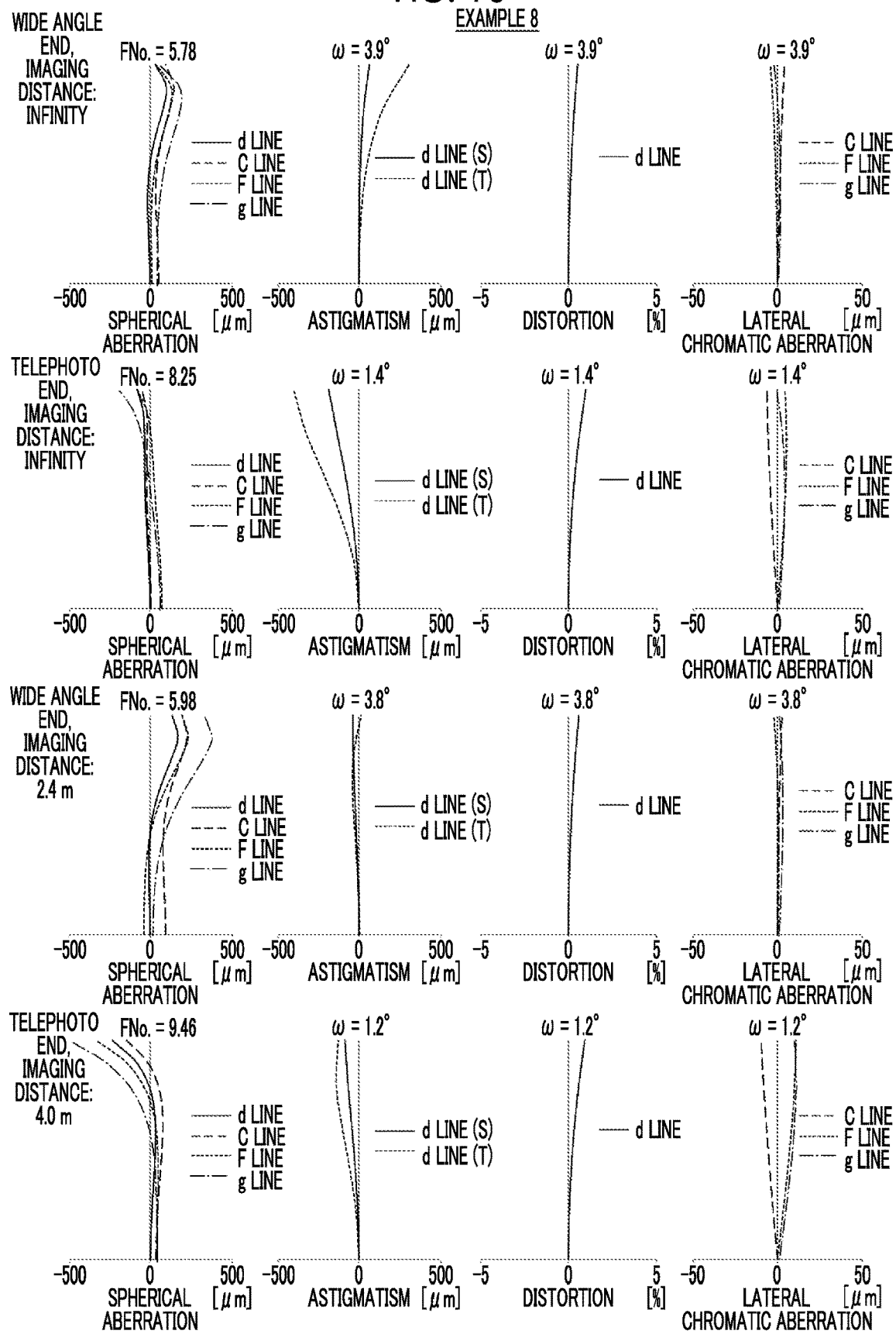
FIG. 18 is a diagram showing aberrations of the zoom lens of Example 8.

Regarding the zoom lens of Example 8, Tables 15A and 15B show basic lens data, and Table 16 shows specifications and variable surface spacings. FIG. 18 shows aberration diagrams. In FIG. 18, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 15A

| Group number | Surface number | Curvature radius | Surface spacing | Nd | vd | θg, F |
|---|---|---|---|---|---|---|
| 1 | 1 | 116.66342 | 1.400 | 1.67300 | 37.94 | 0.58175 |
| (Positive) | 2 | 82.05887 | 0.200 | | | |
| | 3 | 82.40165 | 10.650 | 1.45880 | 89.95 | 0.53677 |
| | 4 | −898.43283 | DD[4] | | | |
| 2 | 5 | 1080.87219 | 1.068 | 1.69680 | 55.53 | 0.54341 |
| (Negative) | 6 | 137.87226 | 2.828 | | | |
| | 7 | −103.95475 | 1.530 | 1.45880 | 89.95 | 0.53677 |
| | 8 | 65.89325 | 2.007 | 1.86074 | 23.08 | 0.62589 |
| | 9 | 97.22465 | DD[9] | | | |
| 3 | 10 | 84.95442 | 8.008 | 1.49700 | 81.54 | 0.53748 |
| (Positive) | 11 | −139.70628 | 1.149 | | | |
| | 12 | 176.44938 | 5.281 | 1.49700 | 81.54 | 0.53748 |
| | 13 | −182.76531 | 0.218 | | | |
| | 14 | 97.57956 | 8.888 | 1.45880 | 89.95 | 0.53677 |
| | 15 | −78.16780 | 2.003 | 1.96040 | 31.95 | 0.59107 |
| | 16 | −389.31495 | DD[16] | | | |
| 4 | 17 | −98.11701 | 5.132 | 1.80582 | 43.52 | 0.56369 |
| (Negative) | 18 | −35.92904 | 1.085 | 1.74538 | 49.95 | 0.55272 |
| | 19 | −208.29894 | DD[19] | | | |

TABLE 15B

| Group number | Surface number | Curvature radius | Surface spacing | Nd | vd | θg, F | |
|---|---|---|---|---|---|---|---|
| 5 | 20(St) | ∞ | DD[20] | | | | |
| (Negative) | 21 | −180.01608 | 2.629 | 1.95807 | 18.38 | 0.63986 | Focusing group |
| | 22 | −54.08723 | 1.211 | 1.87099 | 32.32 | 0.59235 | (Negative) |
| | 23 | 108.34540 | DD[23] | | | | |
| | 24 | 180.78958 | 4.359 | 1.54814 | 45.78 | 0.56859 | |
| | 25 | −28.83635 | 1.001 | 2.00069 | 25.46 | 0.61364 | |
| | 26 | −41.46196 | 15.037 | | | | |
| | 27 | 102.37573 | 2.614 | 1.80519 | 25.48 | 0.61354 | Vibration-proof |
| | 28 | −50.54227 | 0.852 | 1.72915 | 54.64 | 0.54488 | group |
| | 29 | 38.16261 | 1.421 | | | | (Negative) |
| | 30 | −151.07053 | 0.684 | 1.81600 | 46.54 | 0.55532 | |
| | 31 | 51.67096 | 3.119 | | | | |
| | 32 | 36.41580 | 4.345 | 1.67300 | 38.26 | 0.57580 | |
| | 33 | −27.11678 | 0.781 | 2.00069 | 25.46 | 0.61364 | |
| | 34 | 48.12415 | 2.558 | 1.73800 | 32.33 | 0.59005 | |
| | 35 | −79.90875 | 7.676 | | | | |
| | 36 | 46.48580 | 3.492 | 1.58144 | 40.75 | 0.57757 | |
| | 37 | −33.01321 | 5.354 | | | | |
| | 38 | −24.51064 | 0.602 | 1.62041 | 60.29 | 0.54266 | |
| | 39 | 105.40524 | 63.228 | | | | |
| | 40 | ∞ | 2.850 | 1.51680 | 64.20 | 0.53430 | |
| | 41 | ∞ | 1.000 | | | | |

TABLE 16

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 2.83 | | |
| f | 206.176 | 582.499 | | |
| FNo. | 5.78 | 8.25 | 5.98 | 9.46 |
| 2ω[°] | 7.8 | 2.8 | 7.6 | 2.4 |
| DD[4] | 39.833 | 123.640 | 39.833 | 123.640 |
| DD[9] | 94.438 | 2.195 | 94.438 | 2.195 |
| DD[16] | 12.185 | 2.059 | 12.185 | 2.059 |
| DD[19] | 10.909 | 29.471 | 10.909 | 29.471 |
| DD[20] | 2.495 | 2.495 | 5.571 | 17.487 |
| DD[23] | 23.786 | 23.786 | 20.710 | 8.794 |

Example 9

Figure 19:
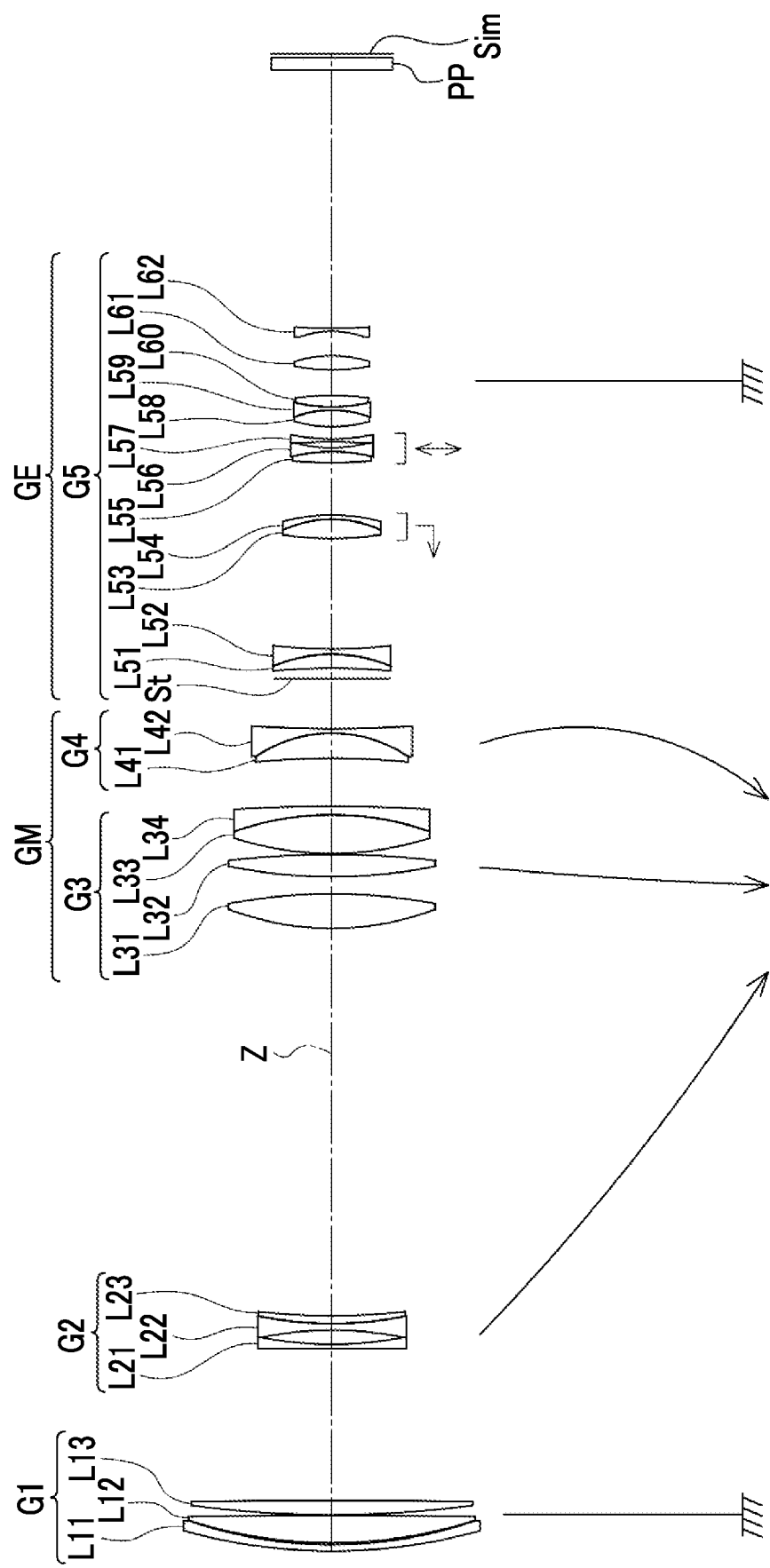
FIG. 19 is a cross-sectional view of a configuration of a zoom lens of Example 9 and a diagram showing movement loci thereof.

FIG. 19 shows a configuration and movement loci of the zoom lens of Example 9. The zoom lens of Example 9 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a positive refractive power and consists of lenses L53 and L54. The vibration-proof group has a negative refractive power and consists of lenses L55 to L57.

Figure 20:
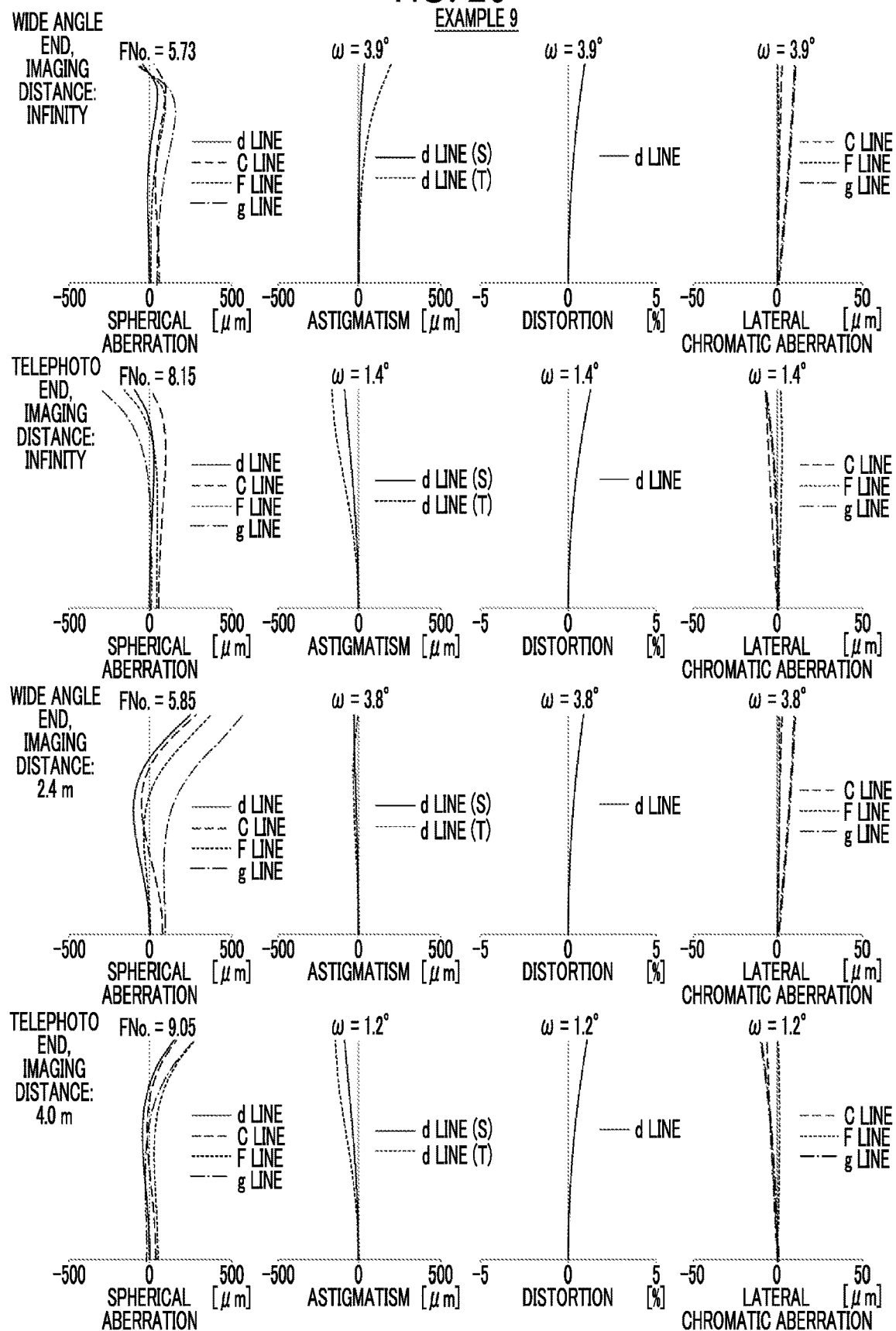
FIG. 20 is a diagram showing aberrations of the zoom lens of Example 9.

Regarding the zoom lens of Example 9, Tables 17A and 17B show basic lens data, and Table 18 shows specifications and variable surface spacings. FIG. 20 shows aberration diagrams. In FIG. 20, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 17A

| Group number | Surface number | Curvature radius | Surface spacing | Nd | vd | θg, F |
|---|---|---|---|---|---|---|
| 1 | 1 | 153.34371 | 1.500 | 1.78947 | 25.82 | 0.61030 |
| (Positive) | 2 | 121.57771 | 0.450 | | | |
| | 3 | 129.68176 | 6.500 | 1.43875 | 94.66 | 0.53402 |
| | 4 | −2129.82199 | 0.100 | | | |
| | 5 | 288.97963 | 3.400 | 1.43875 | 94.66 | 0.53402 |
| | 6 | −2530.60553 | DD[6] | | | |
| 2 | 7 | −32736.73269 | 1.068 | 1.69680 | 55.53 | 0.54341 |
| (Negative) | 8 | 102.99601 | 3.393 | | | |
| | 9 | −95.33232 | 1.529 | 1.43875 | 94.66 | 0.53402 |
| | 10 | 102.86919 | 1.835 | 1.92286 | 18.90 | 0.64960 |
| | 11 | 176.94568 | DD[11] | | | |
| 3 | 12 | 79.84857 | 8.130 | 1.49700 | 81.61 | 0.53887 |
| (Positive) | 13 | −154.09312 | 4.076 | | | |
| | 14 | 143.60850 | 5.257 | 1.49700 | 81.61 | 0.53887 |
| | 15 | −245.02662 | 0.250 | | | |
| | 16 | 87.70608 | 9.136 | 1.43875 | 94.66 | 0.53402 |
| | 17 | −80.71773 | 2.002 | 1.98872 | 28.68 | 0.60249 |
| | 18 | −437.61247 | DD[18] | | | |
| 4 | 19 | −211.22116 | 5.915 | 1.76390 | 47.15 | 0.55777 |
| (Negative) | 20 | −37.44131 | 1.083 | 1.72212 | 53.86 | 0.54611 |
| | 21 | 340.71684 | DD[21] | | | |

TABLE 17B

| Group number | Surface number | Curvature radius | Surface spacing | Nd | vd | θg, F | |
|---|---|---|---|---|---|---|---|
| 5 | 22(St) | ∞ | 2.547 | | | | |
| (Negative) | 23 | −170.04900 | 3.262 | 1.89423 | 21.79 | 0.62533 | |
| | 24 | −40.91849 | 1.212 | 1.78732 | 37.46 | 0.58051 | |
| | 25 | 132.38822 | DD[25] | | | | |
| | 26 | 89.07850 | 4.541 | 1.53105 | 49.41 | 0.56018 | Focusing group |
| | 27 | −31.89519 | 1.008 | 1.99999 | 24.94 | 0.61677 | (Positive) |
| | 28 | −50.96936 | DD[28] | | | | |
| | 29 | 118.42405 | 2.644 | 1.80519 | 25.48 | 0.61354 | Vibration-proof |
| | 30 | −43.92274 | 0.850 | 1.72915 | 54.64 | 0.54488 | group |
| | 31 | 37.69999 | 1.432 | | | | (Negative) |
| | 32 | −153.00485 | 0.686 | 1.81600 | 46.54 | 0.55532 | |
| | 33 | 55.74053 | 2.882 | | | | |
| | 34 | 36.79352 | 3.912 | 1.67300 | 38.26 | 0.57580 | |
| | 35 | −29.45996 | 0.782 | 2.00069 | 25.46 | 0.61364 | |
| | 36 | 42.55495 | 2.710 | 1.73800 | 32.33 | 0.59005 | |
| | 37 | −75.50003 | 6.068 | | | | |
| | 38 | 54.16685 | 3.340 | 1.58144 | 40.75 | 0.57757 | |
| | 39 | −32.79644 | 5.803 | | | | |
| | 40 | −24.52938 | 0.602 | 1.62041 | 60.29 | 0.54266 | |

TABLE 17B-continued

| Group number | Surface number | Curvature radius | Surface spacing | Nd | vd | θg, F |
|---|---|---|---|---|---|---|
| | 41 | 118.16051 | 61.201 | | | |
| | 42 | ∞ | 2.850 | 1.51680 | 64.20 | 0.53430 |
| | 43 | ∞ | 1.000 | | | |

TABLE 18

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 2.83 | | |
| f | 206.159 | 582.448 | | |
| FNo. | 5.73 | 8.15 | 5.85 | 9.05 |
| 2ω[°] | 7.8 | 2.8 | 7.6 | 2.4 |
| DD[6] | 35.881 | 121.093 | 35.881 | 121.093 |
| DD[11] | 91.656 | 2.241 | 91.656 | 2.241 |
| DD[18] | 11.166 | 2.425 | 11.166 | 2.425 |
| DD[21] | 11.812 | 24.756 | 11.812 | 24.756 |
| DD[25] | 26.158 | 26.158 | 22.094 | 8.975 |
| DD[28] | 12.392 | 12.392 | 16.456 | 29.575 |

Example 10

Figure 21:
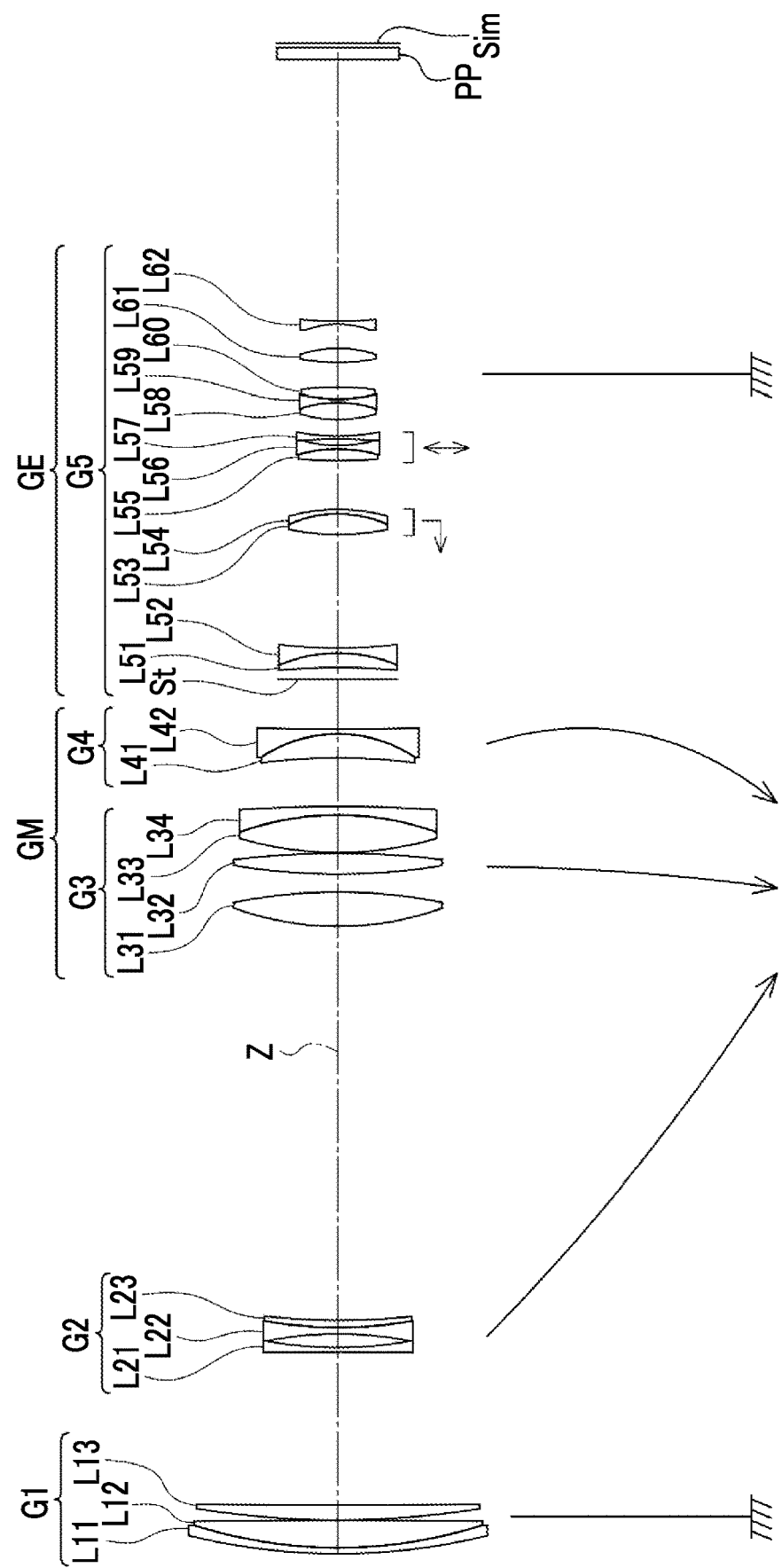
FIG. 21 is a cross-sectional view of a configuration of a zoom lens of Example 10 and a diagram showing movement loci thereof.

FIG. 21 shows a configuration and movement loci of the zoom lens of Example 10. The zoom lens of Example 10 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a positive refractive power and consists of lenses L53 and L54. The vibration-proof group has a negative refractive power and consists of lenses L55 to L57.

Figure 22:
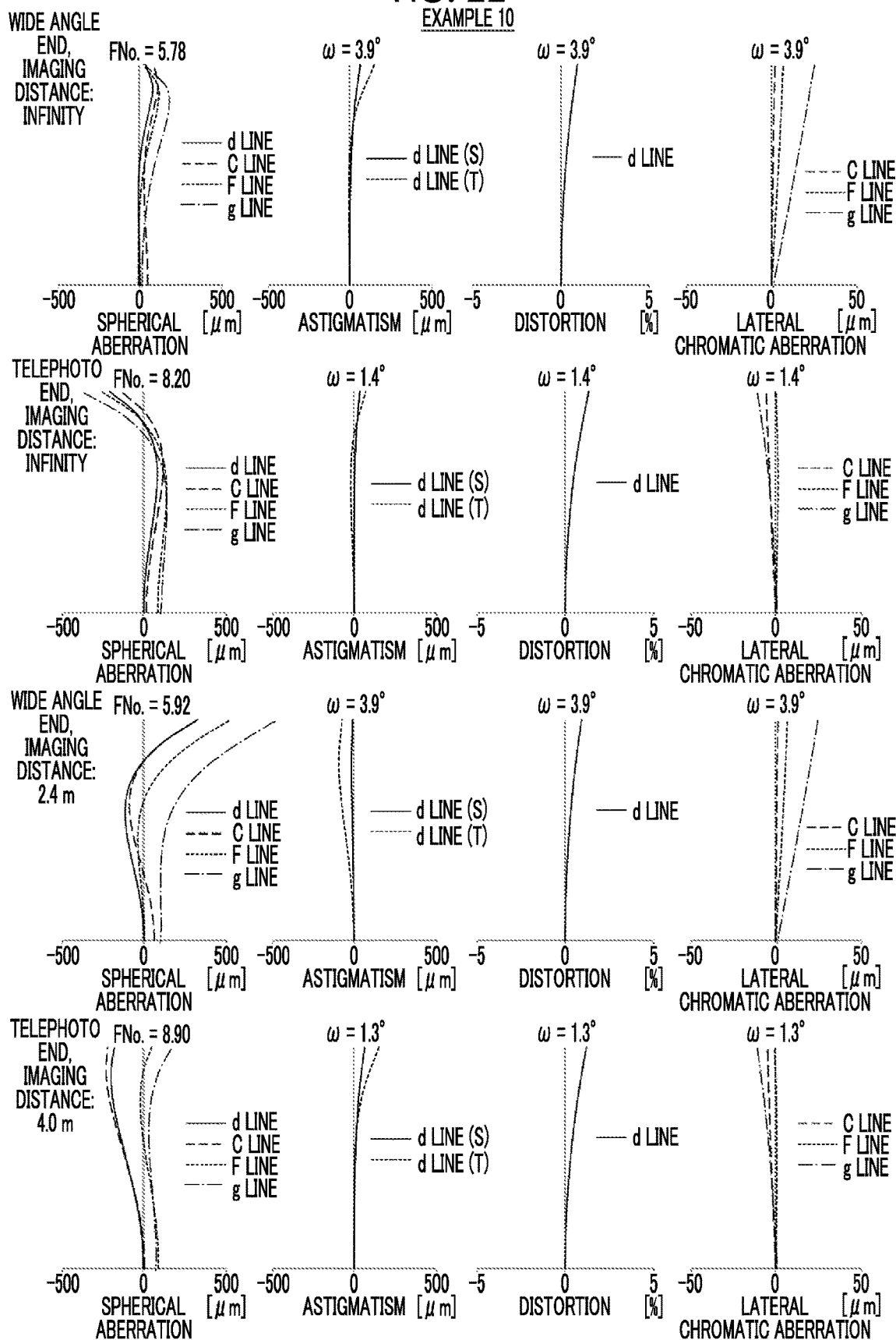
FIG. 22 is a diagram showing aberrations of the zoom lens of Example 10.

Regarding the zoom lens of Example 10, Tables 19A and 19B show basic lens data, and Table 20 shows specifications and variable surface spacings. FIG. 22 shows aberration diagrams. In FIG. 22, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 19A

| Group number | Surface number | Curvature radius | Surface spacing | Nd | vd | θg, F |
|---|---|---|---|---|---|---|
| 1 | 1 | 172.67111 | 1.400 | 1.78472 | 25.68 | 0.61621 |
| (Positive) | 2 | 130.09012 | 6.420 | 1.45860 | 90.19 | 0.53516 |
| | 3 | −3062.95982 | 0.100 | | | |
| | 4 | 247.14406 | 3.500 | 1.45860 | 90.19 | 0.53516 |
| | 5 | 3890.97484 | DD[5] | | | |
| 2 | 6 | −1309.30391 | 1.068 | 1.69680 | 55.53 | 0.54341 |
| (Negative) | 7 | 109.22953 | 3.188 | | | |
| | 8 | −101.57143 | 1.528 | 1.45860 | 90.19 | 0.53516 |
| | 9 | 116.34536 | 1.681 | 2.10420 | 17.02 | 0.66311 |
| | 10 | 185.20016 | DD[10] | | | |
| 3 | 11 | 83.20913 | 8.119 | 1.48563 | 85.19 | 0.53858 |
| (Positive) | 12 | −143.42355 | 4.210 | | | |
| | 13 | 174.66912 | 4.868 | 1.56908 | 71.34 | 0.54530 |
| | 14 | −236.01946 | 0.179 | | | |
| | 15 | 96.61313 | 8.793 | 1.45860 | 90.19 | 0.53516 |
| | 16 | −79.76037 | 2.002 | 1.98264 | 28.02 | 0.60503 |
| | 17 | −441.34431 | DD[17] | | | |
| 4 | 18 | −163.72381 | 5.610 | 1.77738 | 45.38 | 0.56106 |
| (Negative) | 19 | −37.70235 | 1.085 | 1.73171 | 53.18 | 0.54663 |
| | 20 | 694.68540 | DD[20] | | | |

TABLE 19B

| Group number | Surface number | Curvature radius | Surface spacing | Nd | vd | θg, F | |
|---|---|---|---|---|---|---|---|
| 5 | 21 (St) | ∞ | 2.734 | | | | |
| (Negative) | 22 | −198.98488 | 3.389 | 1.88399 | 21.19 | 0.62679 | |
| | 23 | −41.28436 | 1.213 | 1.79136 | 36.11 | 0.58385 | |
| | 24 | 133.52146 | DD[24] | | | | |
| | 25 | 66.34685 | 4.846 | 1.51729 | 51.76 | 0.55600 | Focusing group |
| | 26 | −31.94330 | 1.003 | 1.99098 | 22.98 | 0.62412 | (Positive) |
| | 27 | −50.61957 | DD[27] | | | | |
| | 28 | 125.11136 | 2.698 | 1.80519 | 25.48 | 0.61354 | Vibration-proof |
| | 29 | −41.36331 | 0.850 | 1.72915 | 54.64 | 0.54488 | group |
| | 30 | 36.45935 | 1.528 | | | | (Negative) |
| | 31 | −128.00086 | 0.685 | 1.81600 | 46.54 | 0.55532 | |
| | 32 | 57.87498 | 3.906 | | | | |
| | 33 | 36.87989 | 3.975 | 1.67300 | 38.26 | 0.57580 | |
| | 34 | −30.60537 | 0.781 | 2.00069 | 25.46 | 0.61364 | |

TABLE 19B-continued

| Group number | Surface number | Curvature radius | Surface spacing | Nd | vd | θg, F |
|---|---|---|---|---|---|---|
| | 35 | 43.88919 | 2.659 | 1.73800 | 32.33 | 0.59005 |
| | 36 | −77.04349 | 5.794 | | | |
| | 37 | 56.84781 | 3.301 | 1.58144 | 40.75 | 0.57757 |
| | 38 | −32.22753 | 5.687 | | | |
| | 39 | −23.67632 | 0.600 | 1.62041 | 60.29 | 0.54266 |
| | 40 | 100.88545 | 61.544 | | | |
| | 41 | ∞ | 2.850 | 1.51680 | 64.20 | 0.53430 |
| | 42 | ∞ | 1.000 | | | |

TABLE 20

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 2.83 | | |
| f | 206.136 | 582.384 | | |
| FNo. | 5.78 | 8.20 | 5.92 | 8.90 |
| 2ω[°] | 7.8 | 2.8 | 7.8 | 2.6 |
| DD[5] | 35.979 | 122.785 | 35.979 | 122.785 |
| DD[10] | 92.304 | 2.261 | 92.304 | 2.261 |
| DD[17] | 11.413 | 2.509 | 11.413 | 2.509 |
| DD[20] | 11.766 | 23.907 | 11.766 | 23.907 |
| DD[24] | 26.723 | 26.723 | 23.549 | 13.328 |
| DD[27] | 11.476 | 11.476 | 14.650 | 24.871 |

Example 11

Figure 23:
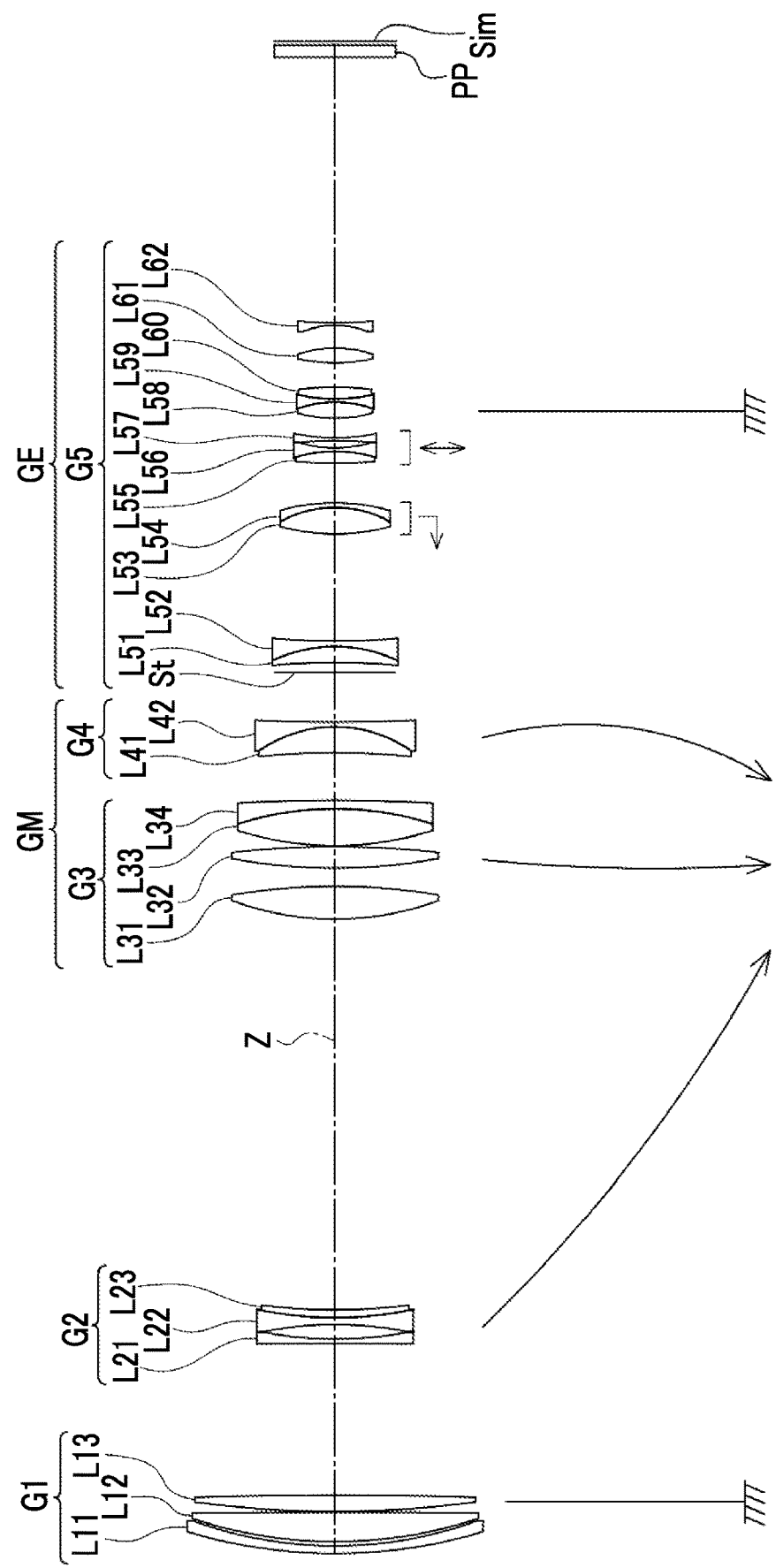
FIG. 23 is a cross-sectional view of a configuration of a zoom lens of Example 11 and a diagram showing movement loci thereof.

FIG. 23 shows a configuration and movement loci of the zoom lens of Example 11. The zoom lens of Example 11 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a positive refractive power and consists of lenses L53 and L54. The vibration-proof group has a negative refractive power and consists of lenses L55 to L57.

Figure 24:
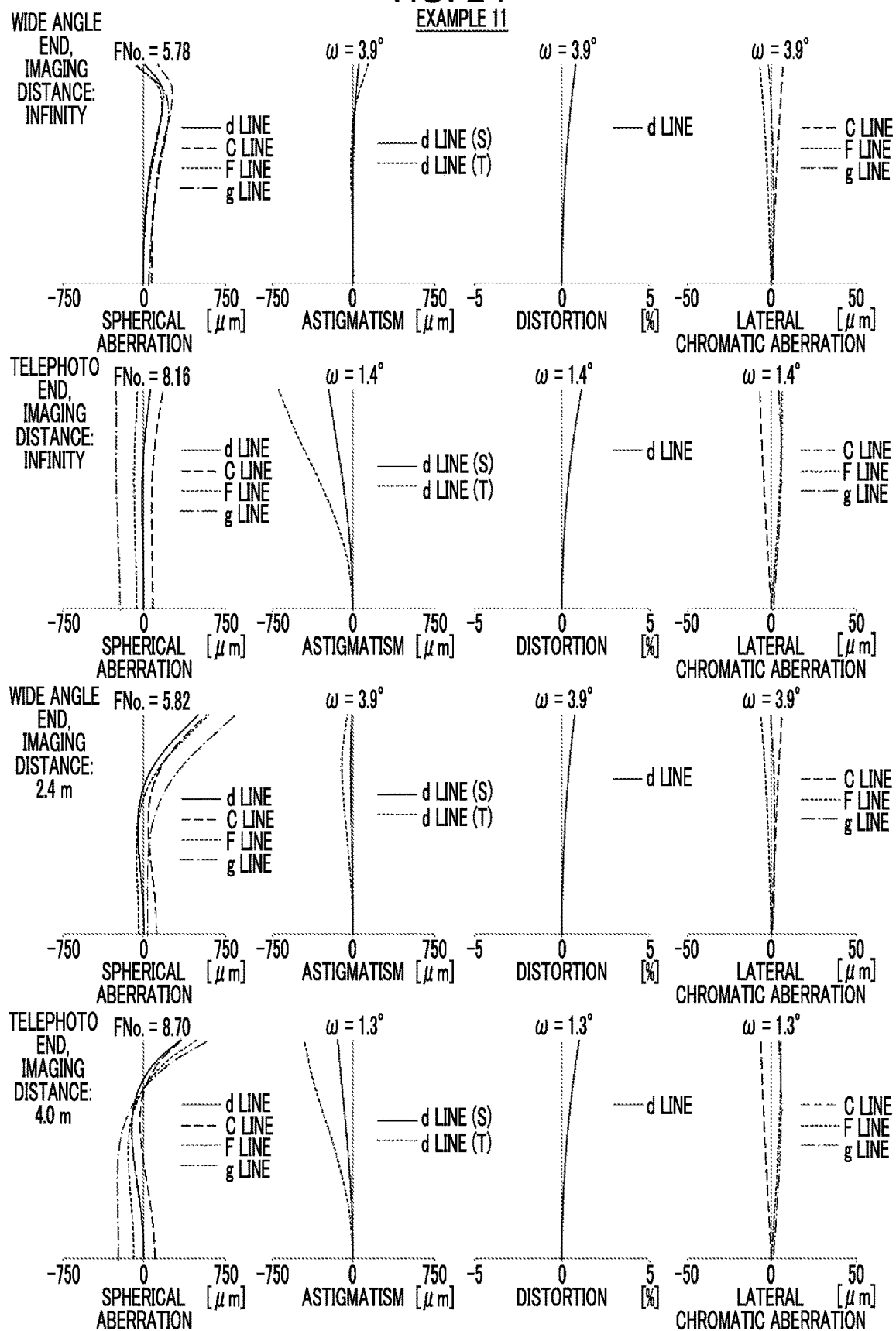
FIG. 24 is a diagram showing aberrations of the zoom lens of Example 11.

Regarding the zoom lens of Example 11, Tables 21A and 21B show basic lens data, and Table 22 shows specifications and variable surface spacings. FIG. 24 shows aberration diagrams. In FIG. 24, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 21A

| Group number | Surface number | Curvature radius | Surface spacing | Nd | vd | θg, F |
|---|---|---|---|---|---|---|
| 1 | 1 | 140.85563 | 1.808 | 1.75623 | 27.43 | 0.60543 |
| (Positive) | 2 | 114.23071 | 1.000 | | | |
| | 3 | 124.41202 | 6.970 | 1.41390 | 100.82 | 0.53373 |
| | 4 | −3620.85973 | 0.100 | | | |
| | 5 | 294.78468 | 3.804 | 1.41390 | 100.82 | 0.53373 |
| | 6 | −1419.52888 | DD[6] | | | |
| 2 | 7 | −18500.63696 | 1.127 | 1.69680 | 55.53 | 0.54341 |
| (Negative) | 8 | 105.58190 | 3.459 | | | |
| | 9 | −99.56899 | 1.612 | 1.43700 | 95.10 | 0.53364 |
| | 10 | 102.57226 | 1.830 | 1.92286 | 18.90 | 0.64960 |
| | 11 | 166.53476 | DD[11] | | | |
| 3 | 12 | 82.05906 | 7.814 | 1.49700 | 81.54 | 0.53748 |
| (Positive) | 13 | −168.77252 | 4.340 | | | |
| | 14 | 155.64644 | 5.057 | 1.49700 | 81.54 | 0.53748 |
| | 15 | −248.07385 | 0.244 | | | |
| | 16 | 89.21856 | 8.783 | 1.43700 | 95.10 | 0.53364 |
| | 17 | −87.02736 | 2.003 | 1.97214 | 29.58 | 0.59938 |
| | 18 | −482.54046 | DD[18] | | | |
| 4 | 19 | −209.76505 | 6.176 | 1.76759 | 42.70 | 0.56836 |
| (Negative) | 20 | −36.01349 | 1.077 | 1.73034 | 46.64 | 0.56149 |
| | 21 | 493.25914 | DD[21] | | | |

TABLE 21B

| Group number | Surface number | Curvature radius | Surface spacing | Nd | vd | θg, F | |
|---|---|---|---|---|---|---|---|
| 5 | 22(St) | ∞ | 2.356 | | | | |
| (Negative) | 23 | −201.17310 | 3.760 | 1.89267 | 20.63 | 0.62896 | |
| | 24 | −40.31388 | 1.287 | 1.84217 | 32.31 | 0.59296 | |
| | 25 | 199.71116 | DD[25] | | | | |
| | 26 | 58.34539 | 6.054 | 1.57012 | 45.88 | 0.56701 | Focusing group |
| | 27 | −31.39240 | 1.128 | 1.99750 | 22.62 | 0.62566 | (Positive) |
| | 28 | −55.27751 | DD[28] | | | | |
| | 29 | 151.71250 | 2.767 | 1.80519 | 25.48 | 0.61354 | Vibration-proof |
| | 30 | −36.82537 | 0.845 | 1.72915 | 54.64 | 0.54488 | group |

TABLE 21B-continued

| Group number | Surface number | Curvature radius | Surface spacing | Nd | νd | θg, F | |
|---|---|---|---|---|---|---|---|
| | 31 | 34.46756 | 1.678 | | | | (Negative) |
| | 32 | −103.62388 | 0.687 | 1.81600 | 46.54 | 0.55532 | |
| | 33 | 51.51340 | 4.695 | | | | |
| | 34 | 36.70574 | 3.791 | 1.67300 | 38.26 | 0.57580 | |
| | 35 | −30.52373 | 0.785 | 2.00069 | 25.46 | 0.61364 | |
| | 36 | 45.03537 | 2.581 | 1.73800 | 32.33 | 0.59005 | |
| | 37 | −76.30584 | 5.800 | | | | |
| | 38 | 50.31640 | 3.482 | 1.58144 | 40.75 | 0.57757 | |
| | 39 | −31.56544 | 5.409 | | | | |
| | 40 | −22.96588 | 0.600 | 1.62041 | 60.29 | 0.54266 | |
| | 41 | 113.33710 | 62.884 | | | | |
| | 42 | ∞ | 2.850 | 1.54763 | 54.98 | 0.55247 | |
| | 43 | ∞ | 1.000 | | | | |

TABLE 22

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 2.83 | | |
| f | 206.240 | 582.677 | | |
| FNo. | 5.78 | 8.16 | 5.82 | 8.70 |
| 2ω[°] | 7.8 | 2.8 | 7.8 | 2.6 |
| DD[6] | 36.000 | 124.908 | 36.000 | 124.908 |
| DD[11] | 92.295 | 2.274 | 92.295 | 2.274 |
| DD[18] | 11.151 | 2.245 | 11.151 | 2.245 |
| DD[21] | 11.828 | 21.846 | 11.828 | 21.846 |
| DD[25] | 25.500 | 25.500 | 22.978 | 14.953 |
| DD[28] | 9.463 | 9.463 | 11.985 | 20.010 |

Example 12

Figure 25:
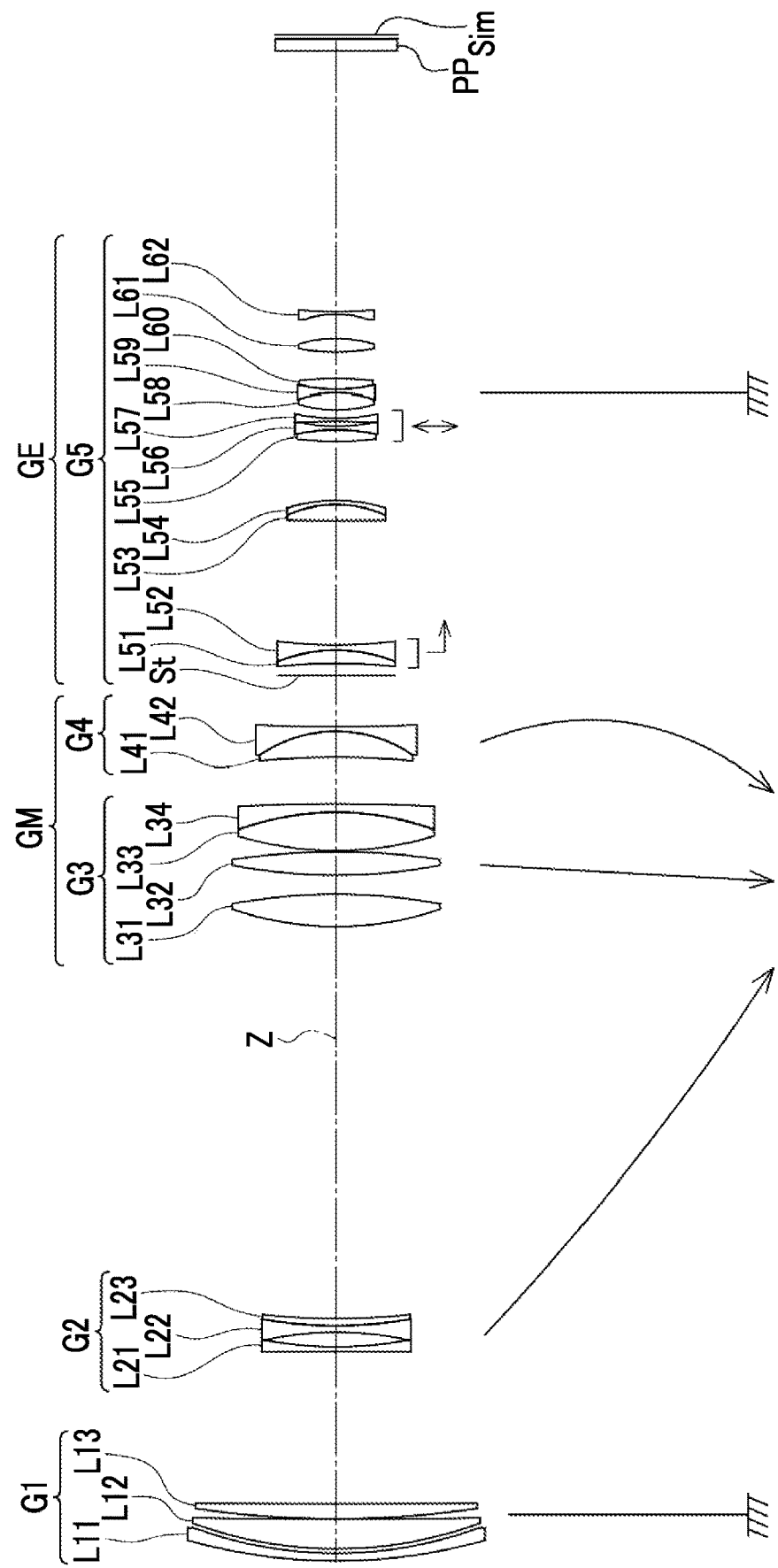
FIG. 25 is a cross-sectional view of a configuration of a zoom lens of Example 12 and a diagram showing movement loci thereof.

FIG. 25 shows a configuration and movement loci of the zoom lens of Example 12. The zoom lens of Example 12 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 26:
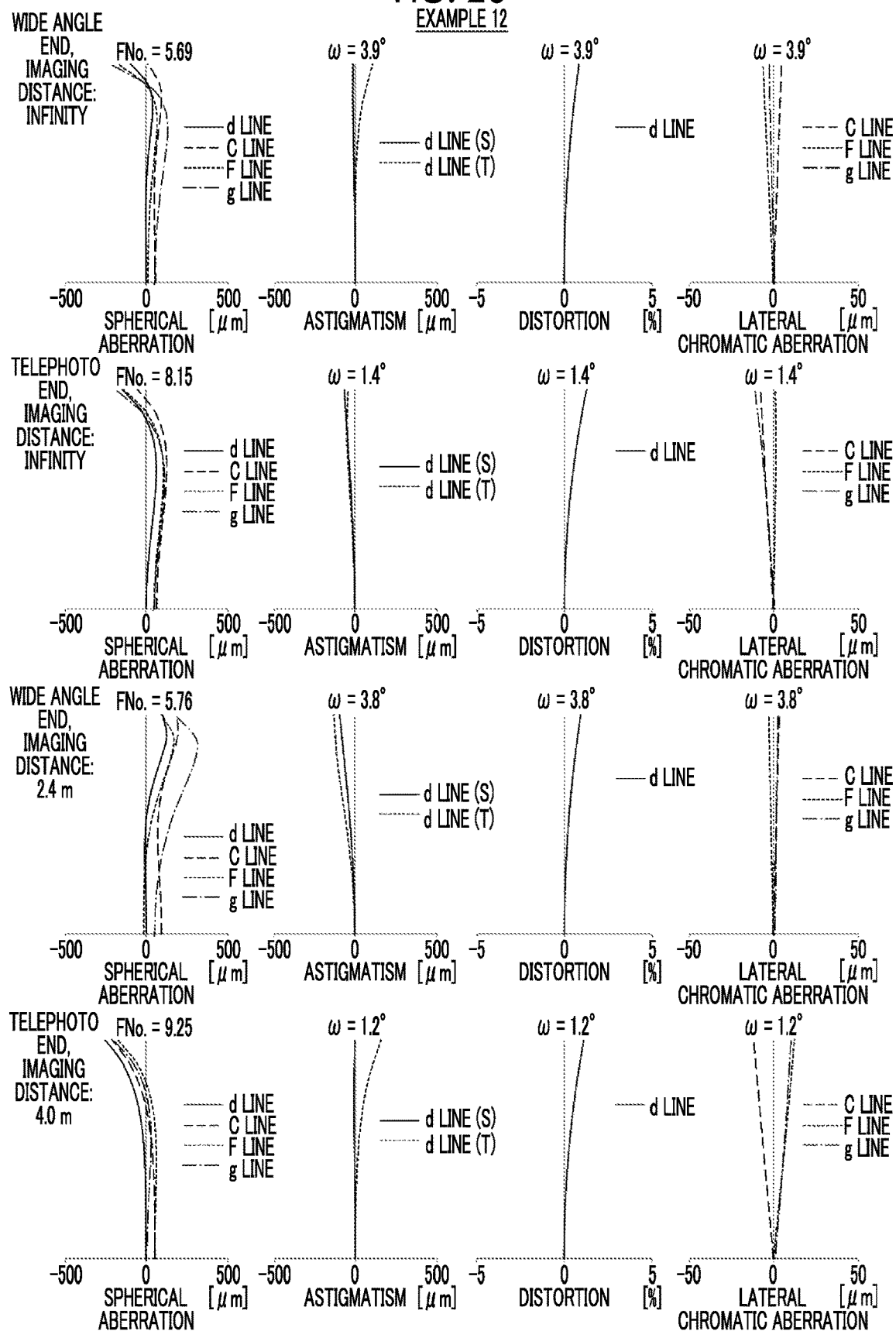
FIG. 26 is a diagram showing aberrations of the zoom lens of Example 12.

Regarding the zoom lens of Example 12, Tables 23A and 23B show basic lens data, and Table 24 shows specifications and variable surface spacings. FIG. 26 shows aberration diagrams. In FIG. 26, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 23A

| Group number | Surface number | Curvature radius | Surface spacing | Nd | νd | θg, F |
|---|---|---|---|---|---|---|
| 1 | 1 | 151.21679 | 1.800 | 1.76625 | 27.37 | 0.60581 |
| (Positive) | 2 | 113.86443 | 1.037 | | | |
| | 3 | 113.71135 | 7.052 | 1.43700 | 95.10 | 0.53364 |
| | 4 | 2250.04343 | 0.100 | | | |
| | 5 | 283.68153 | 3.407 | 1.55332 | 71.68 | 0.54029 |
| | 6 | 7788.89147 | DD[6] | | | |
| 2 | 7 | −2642.01140 | 1.068 | 1.69680 | 55.53 | 0.54341 |
| (Negative) | 8 | 104.67559 | 3.453 | | | |
| | 9 | −90.96108 | 1.520 | 1.41390 | 100.82 | 0.53373 |
| | 10 | 116.95319 | 1.704 | 1.95906 | 17.47 | 0.65993 |
| | 11 | 191.62397 | DD[11] | | | |
| 3 | 12 | 87.67710 | 7.601 | 1.55032 | 75.50 | 0.54001 |
| (Positive) | 13 | −157.04082 | 4.500 | | | |
| | 14 | 151.63674 | 5.546 | 1.49700 | 81.54 | 0.53748 |
| | 15 | −189.28233 | 0.286 | | | |
| | 16 | 93.08292 | 9.069 | 1.43875 | 94.66 | 0.53402 |
| | 17 | −77.69216 | 2.004 | 1.96405 | 31.45 | 0.59275 |
| | 18 | −519.14600 | DD[18] | | | |
| 4 | 19 | −233.04295 | 6.142 | 1.75939 | 47.47 | 0.55738 |
| (Negative) | 20 | −36.62799 | 1.085 | 1.73496 | 54.50 | 0.54330 |
| | 21 | 445.13415 | DD[21] | | | |

TABLE 23B

| Group number | Surface number | Curvature radius | Surface spacing | Nd | νd | θg, F | |
|---|---|---|---|---|---|---|---|
| 5 | 22(St) | ∞ | DD[22] | | | | |
| (Negative) | 23 | −161.51676 | 3.133 | 1.88086 | 22.89 | 0.62140 | Focusing group |
| | 24 | −43.04594 | 1.212 | 1.83166 | 34.62 | 0.58667 | (Negative) |
| | 25 | 126.02149 | DD[25] | | | | |

TABLE 23B-continued

| Group number | Surface number | Curvature radius | Surface spacing | Nd | vd | θg, F | |
|---|---|---|---|---|---|---|---|
| | 26 | 941.07955 | 3.776 | 1.54814 | 45.78 | 0.56859 | |
| | 27 | −31.43802 | 1.003 | 2.00069 | 25.46 | 0.61364 | |
| | 28 | −43.18154 | 13.910 | | | | |
| | 29 | 82.94493 | 2.716 | 1.80519 | 25.48 | 0.61354 | Vibration-proof |
| | 30 | −51.43725 | 0.847 | 1.72915 | 54.64 | 0.54488 | group |
| | 31 | 46.63835 | 1.166 | | | | (Negative) |
| | 32 | −178.44717 | 0.681 | 1.81600 | 46.54 | 0.55532 | |
| | 33 | 51.16219 | 2.000 | | | | |
| | 34 | 35.36830 | 4.000 | 1.67300 | 38.26 | 0.57580 | |
| | 35 | −29.08249 | 0.776 | 2.00069 | 25.46 | 0.61364 | |
| | 36 | 43.97499 | 2.539 | 1.73800 | 32.33 | 0.59005 | |
| | 37 | −85.72633 | 6.230 | | | | |
| | 38 | 58.03141 | 3.145 | 1.58144 | 40.75 | 0.57757 | |
| | 39 | −34.93637 | 5.737 | | | | |
| | 40 | −26.07293 | 0.598 | 1.62041 | 60.29 | 0.54266 | |
| | 41 | 106.60164 | 61.574 | | | | |
| | 42 | ∞ | 2.850 | 1.51680 | 64.20 | 0.53430 | |
| | 43 | ∞ | 1.000 | | | | |

TABLE 24

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 2.83 | | |
| f | 206.210 | 582.592 | | |
| FNo. | 5.69 | 8.15 | 5.76 | 9.25 |
| 2ω[°] | 7.8 | 2.8 | 7.6 | 2.4 |
| DD[6] | 36.000 | 122.213 | 36.000 | 122.213 |
| DD[11] | 92.213 | 2.201 | 92.213 | 2.201 |
| DD[18] | 10.837 | 2.844 | 10.837 | 2.844 |
| DD[21] | 12.129 | 23.921 | 12.129 | 23.921 |
| DD[22] | 2.814 | 2.814 | 6.552 | 21.273 |
| DD[25] | 29.326 | 29.326 | 25.588 | 10.867 |

Example 13

Figure 27:
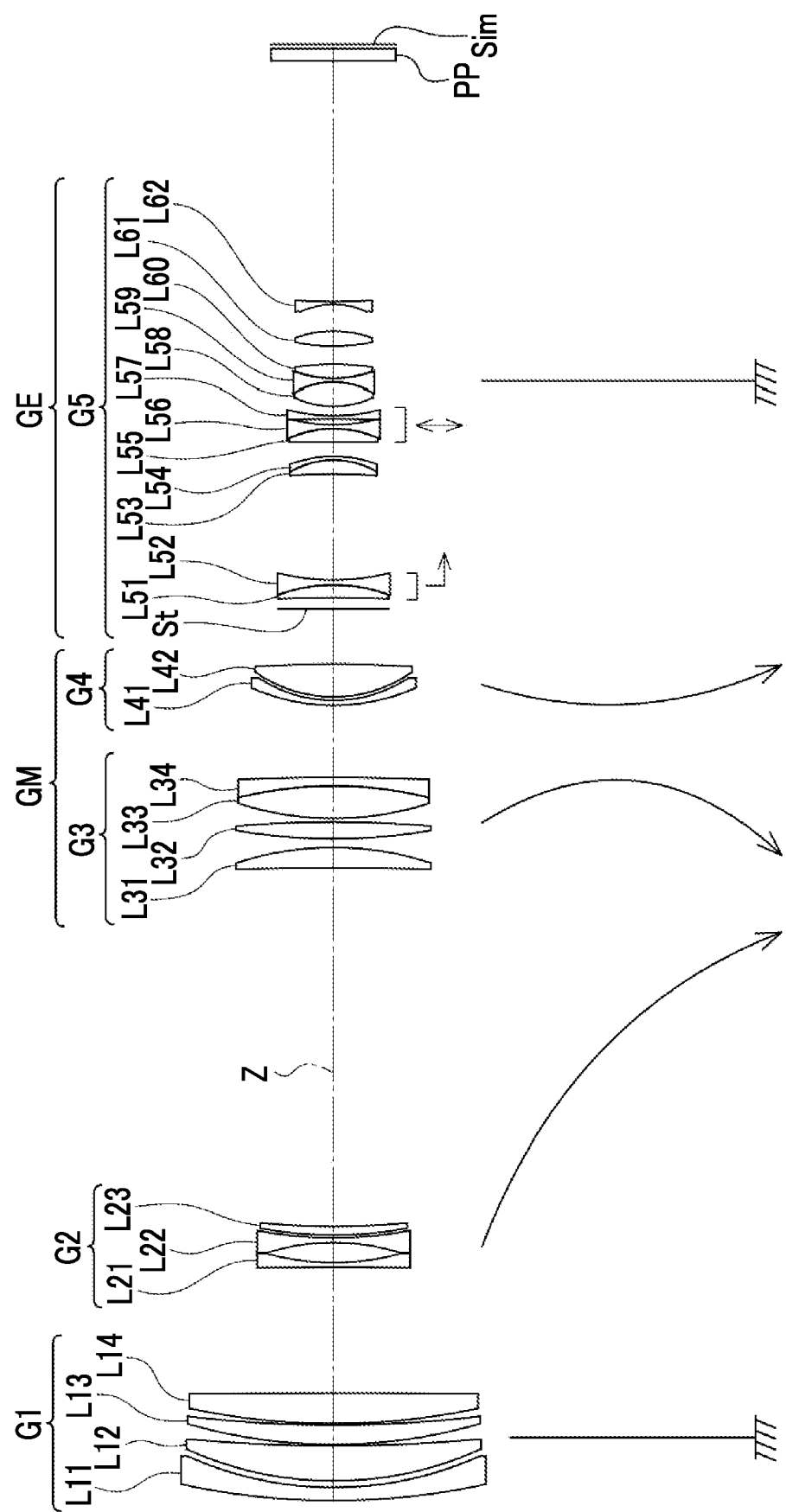
FIG. 27 is a cross-sectional view of a configuration of a zoom lens of Example 13 and a diagram showing movement loci thereof.

FIG. 27 shows a configuration and movement loci of the zoom lens of Example 13. The zoom lens of Example 13 consists of a first lens group G1, a second lens group G2, a third lens group G3, a fourth lens group G4, and a fifth lens group G5, in order from the object side to the image side. The first lens group G1 consists of four lenses L11 to L14, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 28:
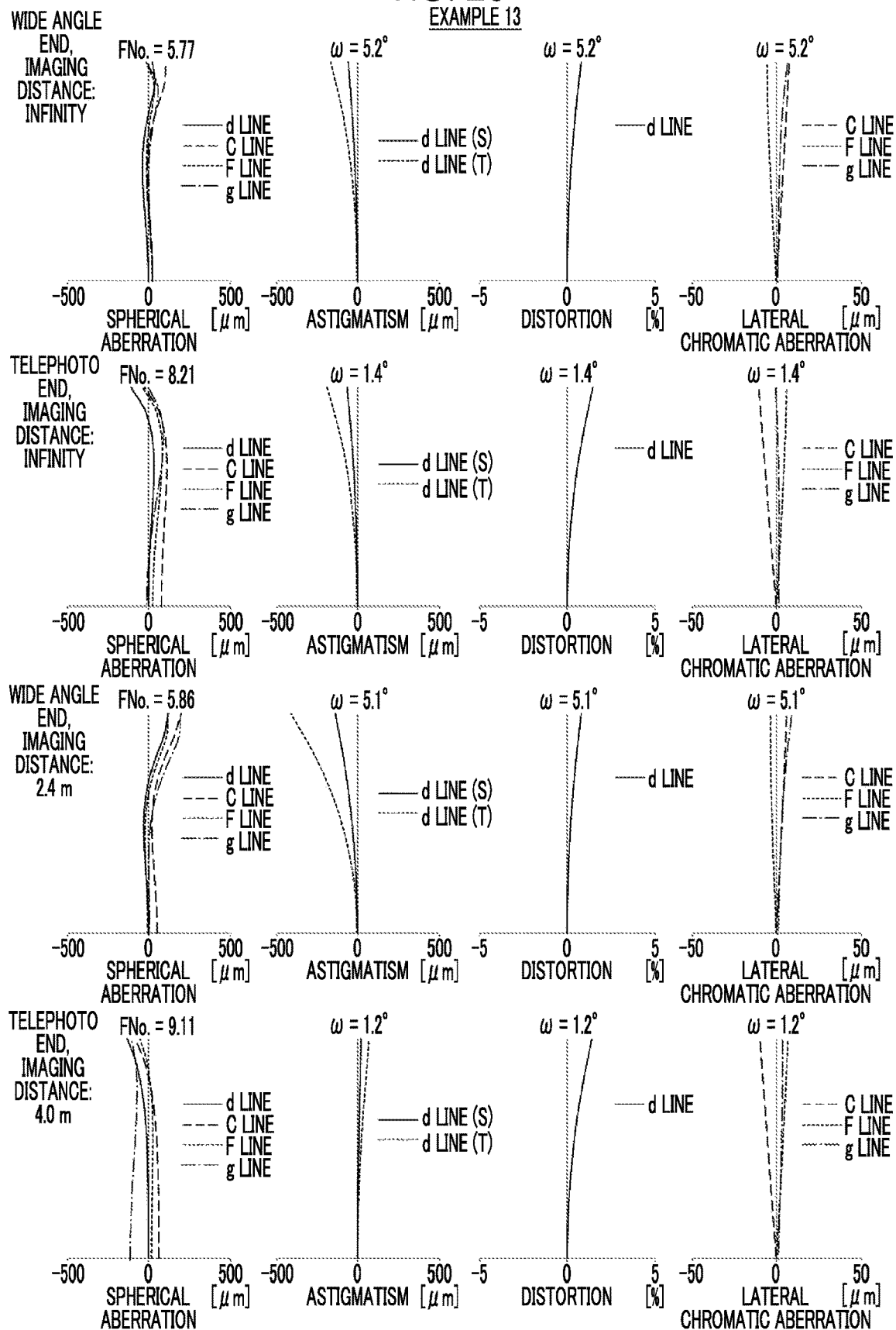
FIG. 28 is a diagram showing aberrations of the zoom lens of Example 13.

Regarding the zoom lens of Example 13, Tables 25A and 25B show basic lens data, and Table 26 shows specifications and variable surface spacings. FIG. 28 shows aberration diagrams. In FIG. 28, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 25A

| Group number | Surface number | Curvature radius | Surface spacing | Nd | vd | θg, F |
|---|---|---|---|---|---|---|
| | 1 | 193.84095 | 3.040 | 1.59270 | 35.31 | 0.59336 |
| | 2 | 95.71335 | 1.500 | | | |
| | 3 | 95.61381 | 8.100 | 1.43875 | 94.66 | 0.53402 |
| 1 (Positive) | 4 | 432.38613 | 0.300 | | | |
| | 5 | 142.30924 | 4.500 | 1.49700 | 81.54 | 0.53748 |
| | 6 | 334.55265 | 0.300 | | | |
| | 7 | 186.45243 | 7.000 | 1.49700 | 81.54 | 0.53748 |
| | 8 | −6096.41990 | DD[8] | | | |
| | 9 | −1727.49974 | 1.067 | 1.72916 | 54.09 | 0.54490 |
| | 10 | 67.80279 | 4.642 | | | |
| 2 (Negative) | 11 | −59.58705 | 1.067 | 1.42537 | 97.75 | 0.53434 |
| | 12 | 106.94789 | 0.649 | | | |
| | 13 | 106.01916 | 2.004 | 1.98613 | 16.48 | 0.66558 |
| | 14 | 206.16928 | DD[14] | | | |
| | 15 | −1314.65378 | 4.752 | 1.43700 | 95.10 | 0.53364 |
| | 16 | −83.22796 | 2.012 | | | |
| 3 (Positive) | 17 | 155.80740 | 3.859 | 1.43700 | 95.10 | 0.53364 |
| | 18 | −307.65673 | 0.837 | | | |
| | 19 | 83.33397 | 7.477 | 1.43700 | 95.10 | 0.53364 |
| | 20 | −104.78762 | 1.901 | 1.89190 | 37.13 | 0.57813 |
| | 21 | −691.24254 | DD[21] | | | |
| | 22 | 54.04923 | 1.129 | 1.83481 | 42.74 | 0.56490 |
| 4 (Positive) | 23 | 36.12282 | 0.800 | | | |
| | 24 | 36.11877 | 7.585 | 1.49700 | 81.54 | 0.53748 |
| | 25 | −321.66498 | DD[25] | | | |

TABLE 25B

| Group number | Surface number | Curvature radius | Surface spacing | Nd | vd | θg, F | |
|---|---|---|---|---|---|---|---|
| 5 (Negative) | 26(St) | ∞ | DD[26] | | | | |
| | 27 | −416.69562 | 2.977 | 1.73800 | 32.33 | 0.59005 | Focusing group |
| | 28 | −42.77052 | 1.130 | 1.69680 | 55.53 | 0.54404 | (Negative) |
| | 29 | 63.00870 | DD[29] | | | | |
| | 30 | −151.49581 | 3.190 | 1.54072 | 46.97 | 0.56555 | |
| | 31 | −22.72774 | 0.860 | 2.00069 | 25.46 | 0.61364 | |
| | 32 | −32.48959 | 3.292 | | | | |
| | 33 | 1410.24102 | 3.094 | 1.80519 | 25.48 | 0.61354 | Vibration-proof |
| | 34 | −28.72521 | 0.930 | 1.72915 | 54.64 | 0.54488 | group |
| | 35 | 47.85221 | 1.299 | | | | (Negative) |
| | 36 | −415.80748 | 0.750 | 1.81600 | 46.54 | 0.55532 | |
| | 37 | 49.03771 | 2.111 | | | | |
| | 38 | 24.28681 | 5.525 | 1.67300 | 38.26 | 0.57580 | |
| | 39 | −20.55175 | 0.801 | 2.00069 | 25.46 | 0.61364 | |
| | 40 | 29.93922 | 3.263 | 1.73800 | 32.33 | 0.59005 | |
| | 41 | −64.53598 | 4.138 | | | | |
| | 42 | 52.81300 | 3.480 | 1.64769 | 33.84 | 0.59227 | |
| | 43 | −29.48670 | 6.158 | | | | |
| | 44 | −19.88657 | 0.601 | 1.75500 | 52.32 | 0.54757 | |
| | 45 | 136.04740 | 55.452 | | | | |
| | 46 | ∞ | 2.850 | 1.51680 | 64.20 | 0.53430 | |
| | 47 | ∞ | 1.000 | | | | |

TABLE 26

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 3.77 | | |
| f | 154.634 | 583.029 | | |
| FNo. | 5.77 | 8.21 | 5.86 | 9.11 |
| 2ω[°] | 10.4 | 2.8 | 10.2 | 2.4 |
| DD[8] | 29.026 | 101.339 | 29.026 | 101.339 |
| DD[14] | 82.373 | 2.627 | 82.373 | 2.627 |
| DD[21] | 16.667 | 28.672 | 16.667 | 28.672 |
| DD[25] | 12.701 | 8.130 | 12.701 | 8.130 |
| DD[26] | 2.567 | 2.567 | 4.019 | 14.811 |
| DD[29] | 24.428 | 24.428 | 22.976 | 12.184 |

Example 14

Figure 29:
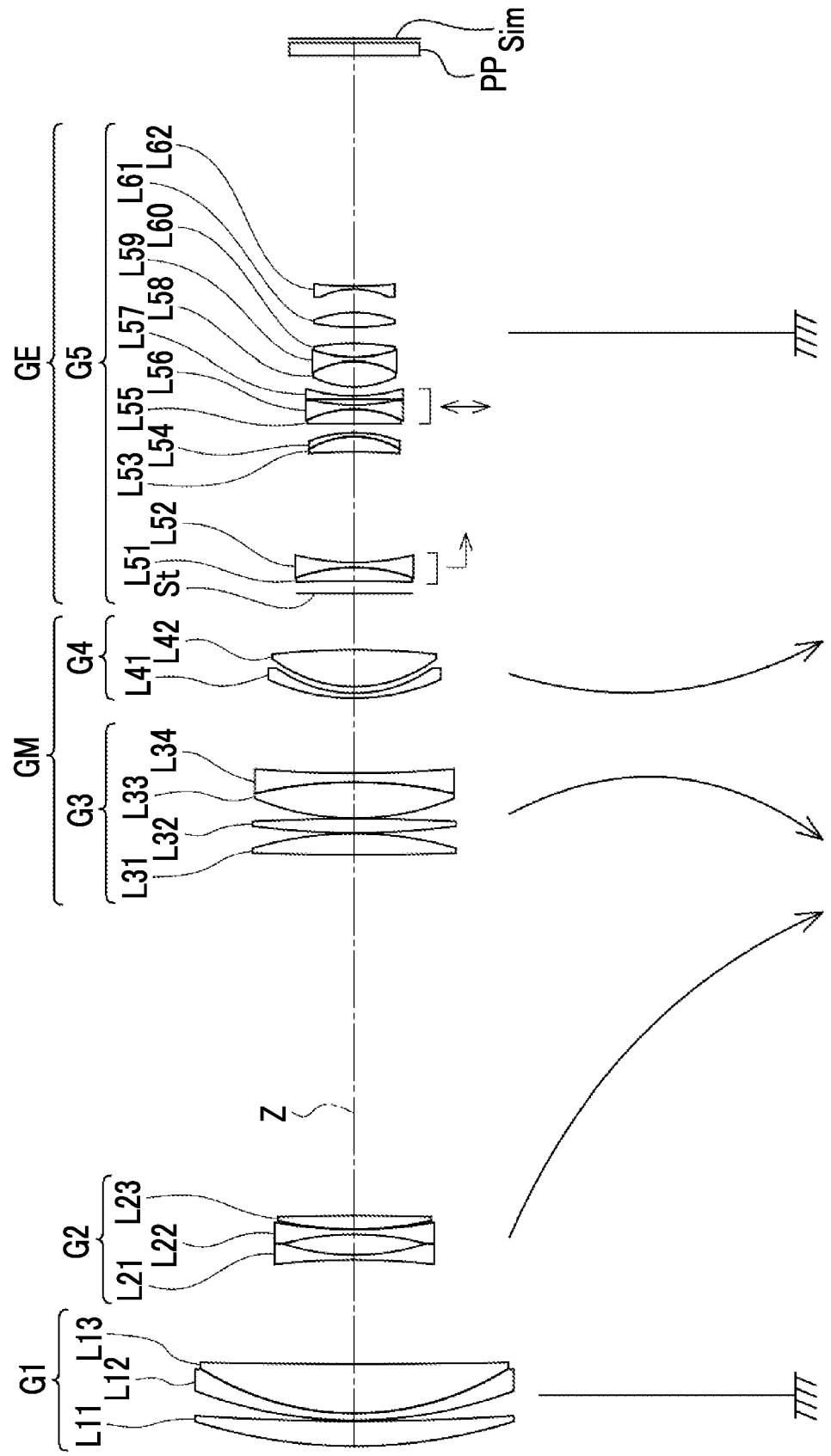
FIG. 29 is a cross-sectional view of a configuration of a zoom lens of Example 14 and a diagram showing movement loci thereof.

FIG. 29 shows a configuration and movement loci of the zoom lens of Example 14. The zoom lens of Example 14 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 30:
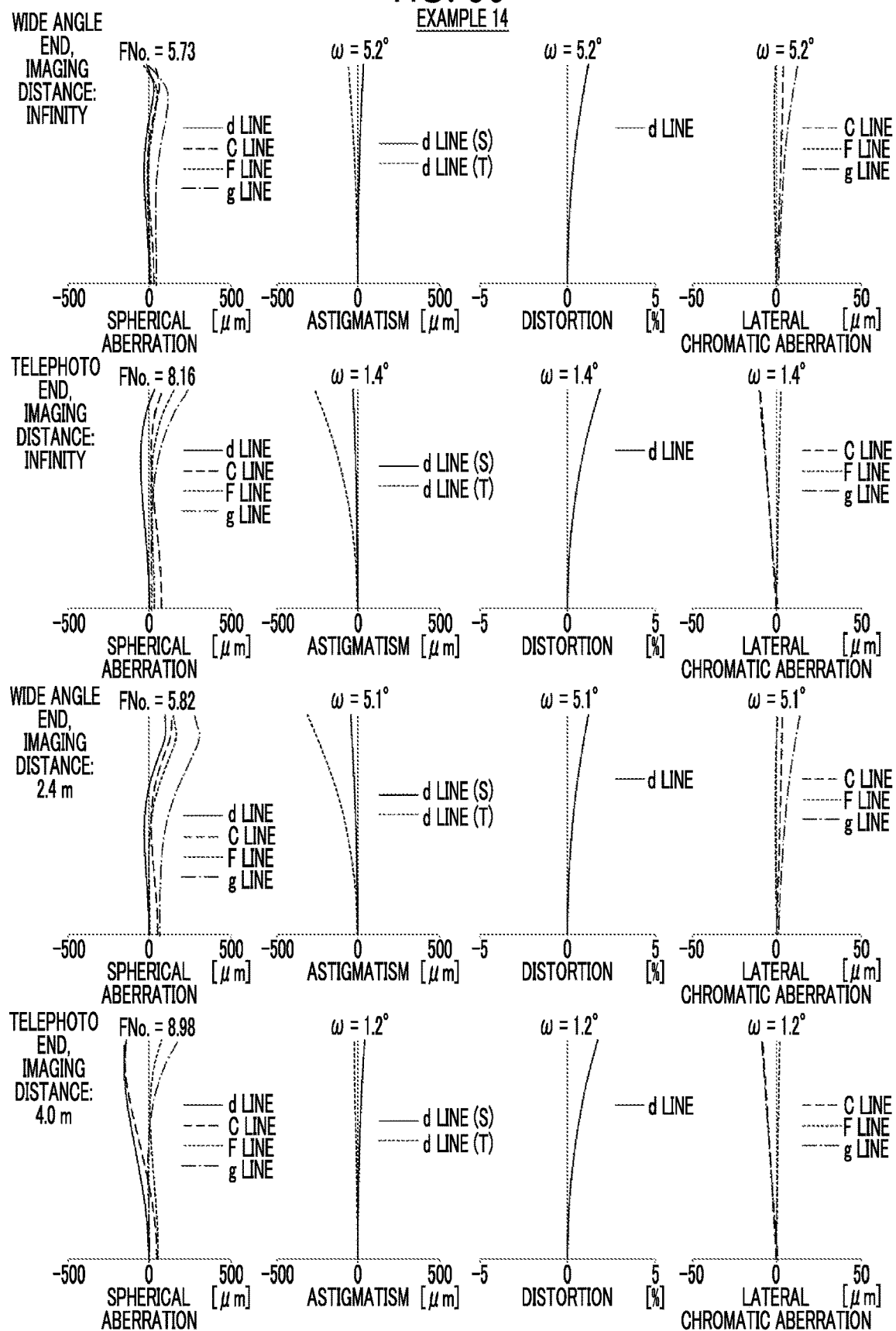
FIG. 30 is a diagram showing aberrations of the zoom lens of Example 14.

Regarding the zoom lens of Example 14, Tables 27A and 27B show basic lens data, and Table 28 shows specifications and variable surface spacings. FIG. 30 shows aberration diagrams. In FIG. 30, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 27A

| Group number | Surface number | Curvature radius | Surface spacing | Nd | vd | θg, F |
|---|---|---|---|---|---|---|
| 1 (Positive) | 1 | 136.26658 | 5.524 | 1.49700 | 81.54 | 0.53748 |
| | 2 | 634.96822 | 0.200 | | | |
| | 3 | 115.49249 | 1.500 | 1.63980 | 34.47 | 0.59233 |
| | 4 | 73.34194 | 10.889 | 1.43875 | 94.66 | 0.53402 |
| | 5 | 2123.61918 | DD[5] | | | |
| 2 (Negative) | 6 | −179.07013 | 1.065 | 1.81600 | 46.54 | 0.55532 |
| | 7 | 59.81604 | 4.537 | | | |
| | 8 | −70.83730 | 1.065 | 1.48563 | 85.19 | 0.53858 |
| | 9 | 116.71402 | 0.100 | | | |
| | 10 | 91.49144 | 2.981 | 1.86074 | 23.08 | 0.62589 |
| | 11 | −714.08169 | DD[11] | | | |
| 3 (Positive) | 12 | 879.46240 | 4.688 | 1.59282 | 68.62 | 0.54414 |
| | 13 | −90.60095 | 0.100 | | | |
| | 14 | 191.65258 | 3.134 | 1.48563 | 85.19 | 0.53858 |
| | 15 | −495.13112 | 0.100 | | | |
| | 16 | 66.26914 | 8.012 | 1.43875 | 94.66 | 0.53402 |
| | 17 | −112.15105 | 1.900 | 1.83400 | 37.21 | 0.58082 |
| | 18 | 287.53427 | DD[18] | | | |
| 4 (Positive) | 19 | 53.23191 | 1.127 | 1.83481 | 42.74 | 0.56490 |
| | 20 | 33.98948 | 1.414 | | | |
| | 21 | 34.18732 | 8.140 | 1.49700 | 81.54 | 0.53748 |
| | 22 | −195.90745 | DD[22] | | | |

TABLE 27B

| Group number | Surface number | Curvature radius | Surface spacing | Nd | vd | θg, F | |
|---|---|---|---|---|---|---|---|
| 5 (Negative) | 23(St) | ∞ | DD[23] | | | | |
| | 24 | −549.37302 | 2.976 | 1.73800 | 32.33 | 0.59005 | Focusing group (Negative) |
| | 25 | −42.97473 | 1.130 | 1.69680 | 55.53 | 0.54404 | |
| | 26 | 63.39061 | DD[26] | | | | |
| | 27 | −196.82276 | 3.374 | 1.54072 | 46.97 | 0.56555 | |
| | 28 | −22.03302 | 0.859 | 2.00069 | 25.46 | 0.61364 | |
| | 29 | −31.85052 | 2.026 | | | | |
| | 30 | −1559.09553 | 3.166 | 1.80519 | 25.48 | 0.61354 | Vibration-proof group (Negative) |
| | 31 | −26.94876 | 0.930 | 1.72915 | 54.64 | 0.54488 | |
| | 32 | 48.14068 | 1.250 | | | | |
| | 33 | −602.84512 | 0.749 | 1.81600 | 46.54 | 0.55532 | |
| | 34 | 43.78683 | 2.000 | | | | |
| | 35 | 23.29200 | 5.543 | 1.67300 | 38.26 | 0.57580 | |
| | 36 | −21.14392 | 0.800 | 2.00069 | 25.46 | 0.61364 | |
| | 37 | 31.66758 | 3.019 | 1.73800 | 32.33 | 0.59005 | |
| | 38 | −63.94011 | 3.537 | | | | |
| | 39 | 53.65762 | 3.285 | 1.64769 | 33.84 | 0.59227 | |
| | 40 | −28.63100 | 5.156 | | | | |
| | 41 | −19.07298 | 0.600 | 1.75500 | 52.32 | 0.54757 | |
| | 42 | 91.87104 | 50.866 | | | | |
| | 43 | ∞ | 2.850 | 1.51680 | 64.20 | 0.53430 | |
| | 44 | ∞ | 1.000 | | | | |

TABLE 28

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 3.77 | | |
| f | 154.645 | 583.070 | | |
| FNo. | 5.73 | 8.16 | 5.82 | 8.98 |
| 2ω[°] | 10.4 | 2.8 | 10.2 | 2.4 |
| DD[5] | 22.976 | 94.528 | 22.976 | 94.528 |
| DD[11] | 79.364 | 2.224 | 79.364 | 2.224 |
| DD[18] | 16.580 | 29.355 | 16.580 | 29.355 |
| DD[22] | 12.427 | 5.240 | 12.427 | 5.240 |
| DD[23] | 2.761 | 2.761 | 4.217 | 15.097 |
| DD[26] | 24.344 | 24.344 | 22.888 | 12.008 |

Example 15

Figure 31:
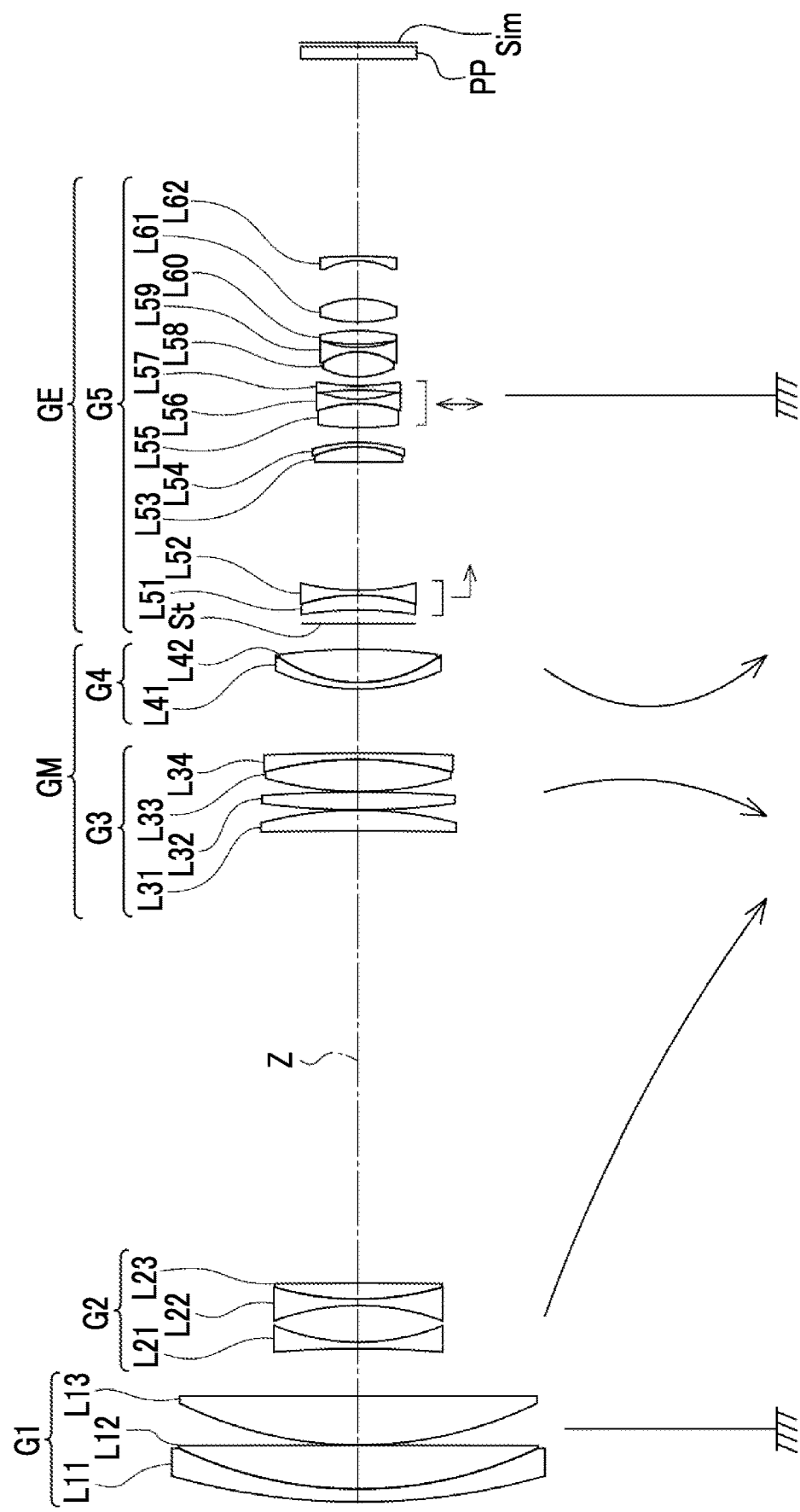
FIG. 31 is a cross-sectional view of a configuration of a zoom lens of Example 15 and a diagram showing movement loci thereof.

FIG. 31 shows a configuration and movement loci of the zoom lens of Example 15. The zoom lens of Example 15 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 32:
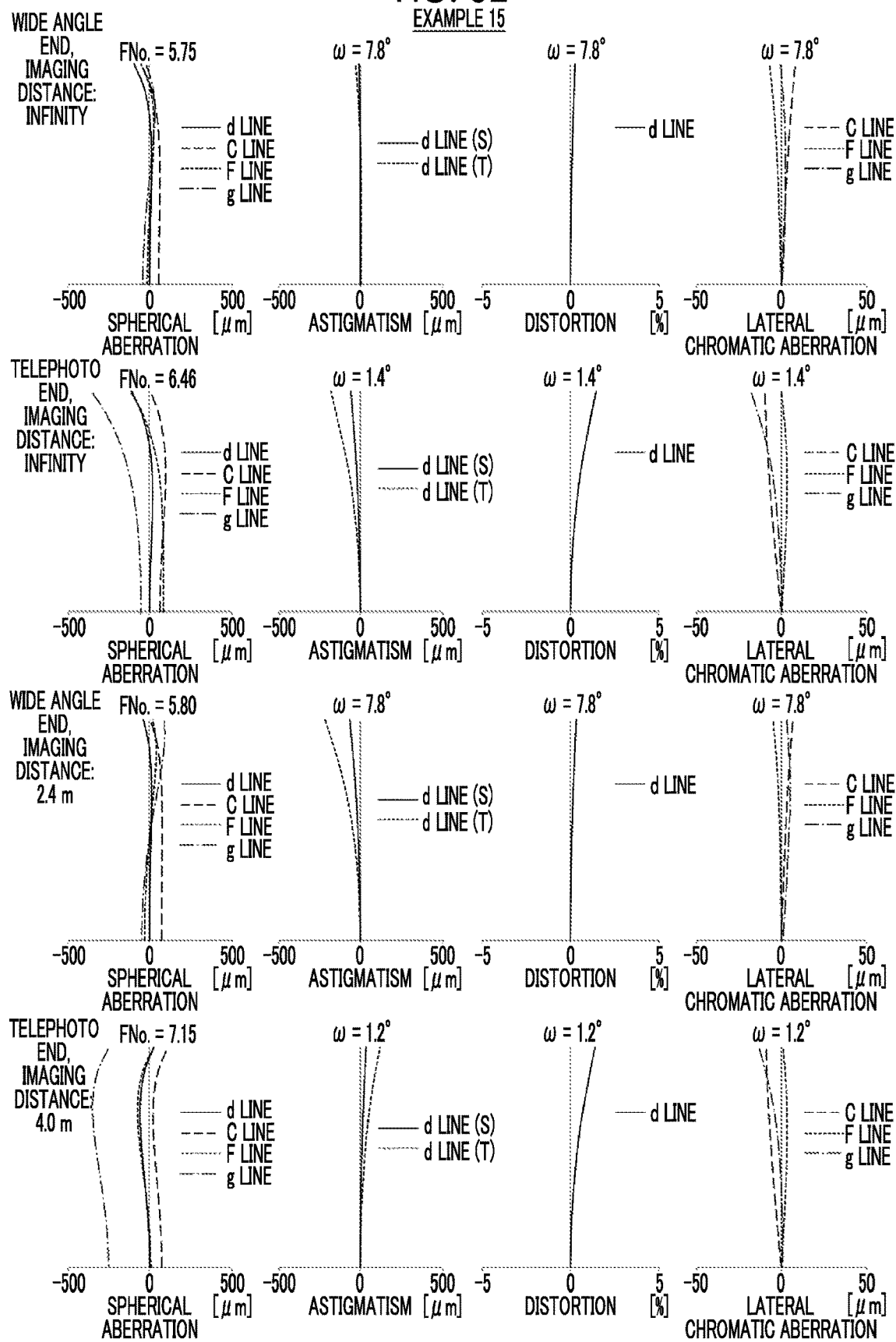
FIG. 32 is a diagram showing aberrations of the zoom lens of Example 15.

Regarding the zoom lens of Example 15, Tables 29A and 29B show basic lens data, and Table 30 shows specifications and variable surface spacings. FIG. 32 shows aberration diagrams. In FIG. 32, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 29A

| Group number | Surface number | Curvature radius | Surface spacing | Nd | vd | θg, F |
|---|---|---|---|---|---|---|
| 1 (Positive) | 1 | 186.14109 | 3.000 | 1.90994 | 36.35 | 0.57986 |
| | 2 | 112.42137 | 10.170 | 1.49700 | 81.61 | 0.53887 |
| | 3 | −21529.51252 | 0.100 | | | |
| | 4 | 109.61204 | 11.358 | 1.43875 | 94.66 | 0.53402 |
| | 5 | 28626.57363 | DD[5] | | | |
| 2 (Negative) | 6 | −290.53700 | 1.500 | 1.88005 | 40.00 | 0.57053 |
| | 7 | 59.92096 | 8.494 | | | |
| | 8 | −65.07354 | 1.510 | 1.43875 | 94.66 | 0.53402 |
| | 9 | 81.10267 | 3.703 | 1.84999 | 22.50 | 0.62921 |
| | 10 | −2917.91799 | DD[10] | | | |
| 3 (Positive) | 11 | −1682.60184 | 4.804 | 1.49700 | 81.61 | 0.53887 |
| | 12 | −105.01259 | 0.100 | | | |
| | 13 | 196.29627 | 4.166 | 1.59282 | 68.62 | 0.54414 |
| | 14 | −352.09713 | 0.100 | | | |
| | 15 | 89.42457 | 7.470 | 1.49700 | 81.61 | 0.53887 |
| | 16 | −95.88852 | 1.500 | 1.95000 | 32.98 | 0.58835 |
| | 17 | −565.63038 | DD[17] | | | |
| 4 (Positive) | 18 | 53.00965 | 1.500 | 1.84232 | 43.77 | 0.56261 |
| | 19 | 36.85885 | 7.736 | 1.43875 | 94.66 | 0.53402 |
| | 20 | −159.48975 | DD[20] | | | |

TABLE 29B

| Group number | Surface number | Curvature radius | Surface spacing | Nd | vd | θg, F | |
|---|---|---|---|---|---|---|---|
| 5 (Negative) | 21(St) | ∞ | DD[21] | | | | |
| | 22 | −102.98265 | 3.494 | 1.82939 | 27.23 | 0.60965 | Focusing group |
| | 23 | −49.42425 | 1.110 | 1.53179 | 63.78 | 0.53722 | (Negative) |
| | 24 | 62.16193 | DD[24] | | | | |
| | 25 | −1372.17007 | 3.510 | 1.50137 | 54.78 | 0.55282 | |
| | 26 | −29.99893 | 1.000 | 1.94982 | 22.16 | 0.63328 | |
| | 27 | −44.00267 | 3.453 | | | | |
| | 28 | 74.28517 | 5.630 | 1.79380 | 25.31 | 0.61668 | Vibration-proof |
| | 29 | −31.56623 | 1.012 | 1.75089 | 52.91 | 0.54691 | group |
| | 30 | 30.73011 | 2.107 | | | | (Negative) |
| | 31 | −79.23467 | 0.850 | 1.89971 | 38.03 | 0.57540 | |
| | 32 | 61.28117 | 2.005 | | | | |
| | 33 | 20.32578 | 5.829 | 1.61340 | 44.27 | 0.56340 | |
| | 34 | −17.00002 | 1.000 | 1.94991 | 29.07 | 0.60089 | |
| | 35 | 28.55968 | 0.805 | | | | |
| | 36 | 55.75314 | 3.114 | 1.68997 | 30.72 | 0.60225 | |
| | 37 | −48.52530 | 2.000 | | | | |
| | 38 | 35.63283 | 5.483 | 1.57699 | 40.56 | 0.57831 | |
| | 39 | −23.42745 | 8.869 | | | | |
| | 40 | −18.10947 | 1.000 | 1.80795 | 47.21 | 0.55625 | |
| | 41 | −116.30816 | 45.865 | | | | |
| | 42 | ∞ | 2.850 | 1.51680 | 64.20 | 0.53430 | |
| | 43 | ∞ | 1.000 | | | | |

TABLE 30

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 5.66 | | |
| f | 103.077 | 582.958 | | |
| FNo. | 5.75 | 6.46 | 5.80 | 7.15 |
| 2ω[°] | 15.6 | 2.8 | 15.6 | 2.4 |
| DD[5] | 11.016 | 107.809 | 11.016 | 107.809 |
| DD[10] | 104.998 | 2.701 | 104.998 | 2.701 |
| DD[17] | 14.854 | 23.491 | 14.854 | 23.491 |
| DD[20] | 6.007 | 2.874 | 6.007 | 2.874 |
| DD[21] | 3.090 | 3.090 | 3.773 | 15.799 |
| DD[24] | 29.879 | 29.879 | 29.196 | 17.170 |

Example 16

Figure 33:
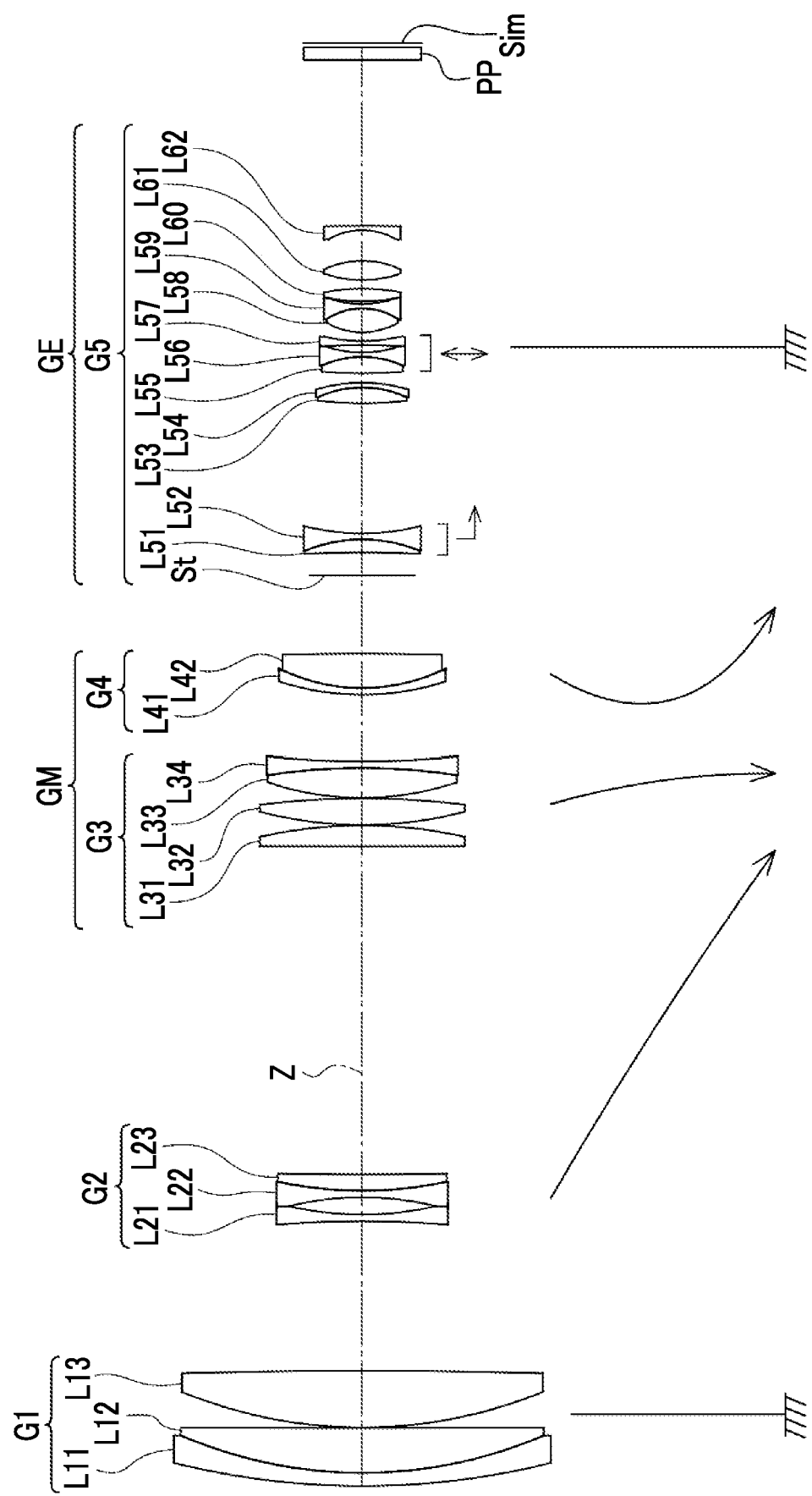
FIG. 33 is a cross-sectional view of a configuration of a zoom lens of Example 16 and a diagram showing movement loci thereof.

FIG. 33 shows a configuration and movement loci of the zoom lens of Example 16. The zoom lens of Example 16 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 34:
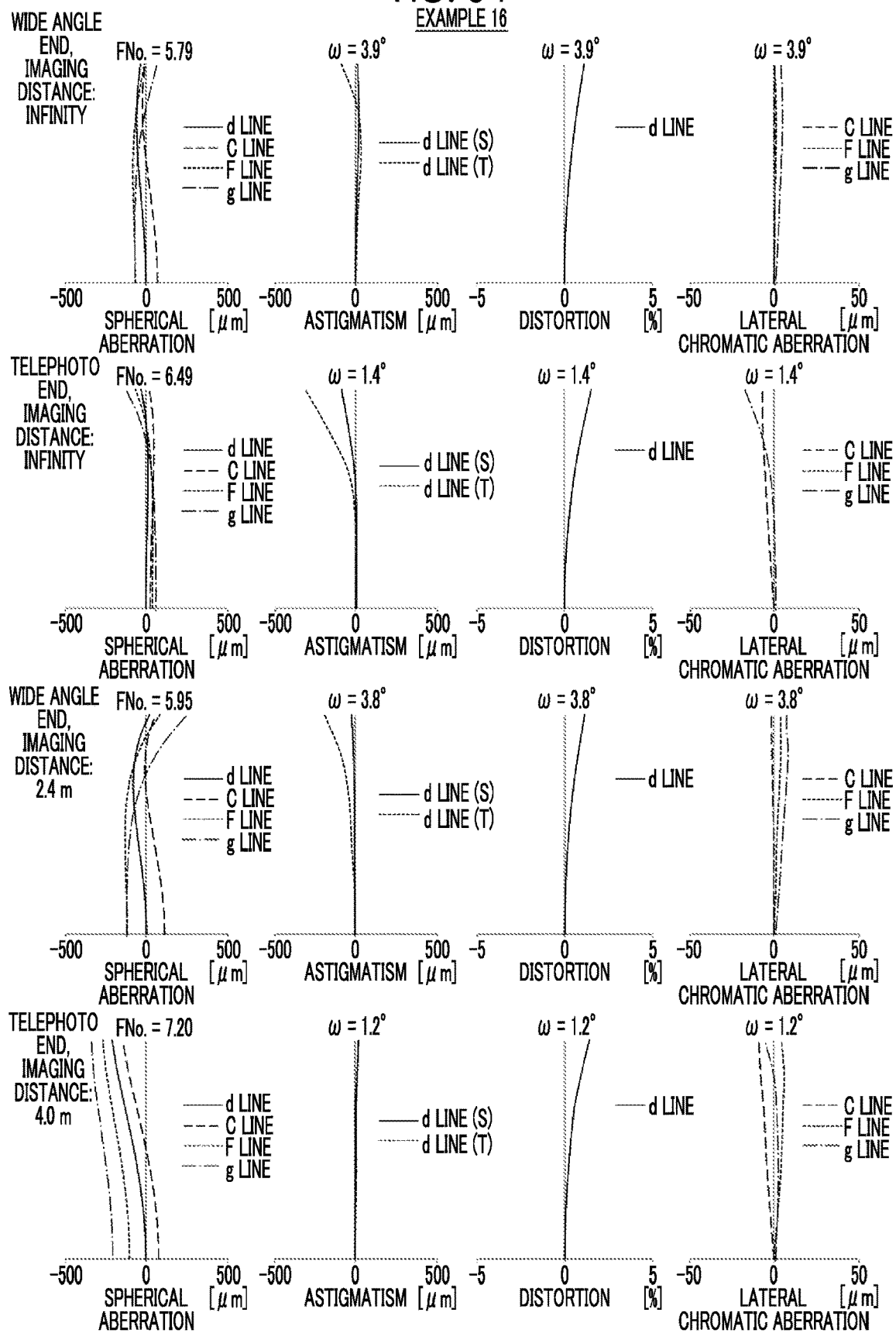
FIG. 34 is a diagram showing aberrations of the zoom lens of Example 16.

Regarding the zoom lens of Example 16, Tables 31A and 31B show basic lens data, and Table 32 shows specifications and variable surface spacings. FIG. 34 shows aberration diagrams. In FIG. 34, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 31A

| Group number | Surface number | Curvature radius | Surface spacing | Nd | vd | θg, F |
|---|---|---|---|---|---|---|
| 1 (Positive) | 1 | 211.43590 | 3.001 | 1.90996 | 36.98 | 0.57605 |
| | 2 | 123.47916 | 10.330 | 1.49700 | 81.61 | 0.53887 |
| | 3 | 11596.30457 | 0.101 | | | |
| | 4 | 128.14874 | 13.000 | 1.43875 | 94.66 | 0.53402 |
| | 5 | −1779.92702 | DD[5] | | | |
| 2 (Negative) | 6 | −289.09458 | 1.501 | 1.79002 | 49.00 | 0.55077 |
| | 7 | 85.78904 | 4.022 | | | |
| | 8 | −82.32361 | 1.510 | 1.43875 | 94.66 | 0.53402 |
| | 9 | 108.76860 | 3.700 | 1.84947 | 22.53 | 0.62133 |
| | 10 | 973.29497 | DD[10] | | | |
| 3 (Positive) | 11 | 13159.24577 | 4.841 | 1.49700 | 81.61 | 0.53887 |
| | 12 | −124.90797 | 0.101 | | | |
| | 13 | 108.65019 | 6.079 | 1.59282 | 68.62 | 0.54414 |
| | 14 | −223.66161 | 0.103 | | | |
| | 15 | 78.18121 | 6.872 | 1.49700 | 81.61 | 0.53887 |
| | 16 | −169.31272 | 1.501 | 1.94968 | 33.03 | 0.58758 |
| | 17 | 254.39897 | DD[17] | | | |
| 4 (Positive) | 18 | 72.56524 | 1.501 | 1.78937 | 49.06 | 0.55066 |
| | 19 | 49.90776 | 7.856 | 1.43875 | 94.66 | 0.53402 |
| | 20 | −1054.68925 | DD[20] | | | |

TABLE 31B

| Group number | Surface number | Curvature radius | Surface spacing | Nd | νd | θg, F | |
|---|---|---|---|---|---|---|---|
| 5 (Negative) | 21(St) | ∞ | DD[21] | | | | |
| | 22 | −261.40240 | 2.962 | 1.89403 | 31.14 | 0.59555 | Focusing group (Negative) |
| | 23 | −40.43158 | 1.377 | 1.79313 | 48.69 | 0.55125 | |
| | 24 | 63.37450 | DD[24] | | | | |
| | 25 | 99.04396 | 3.630 | 1.50002 | 55.00 | 0.55022 | |
| | 26 | −27.90787 | 1.073 | 1.94998 | 22.15 | 0.62606 | |
| | 27 | −42.98410 | 2.191 | | | | |
| | 28 | 118.22054 | 3.760 | 1.77313 | 26.34 | 0.60852 | Vibration-proof group (Negative) |
| | 29 | −26.23359 | 1.010 | 1.74129 | 53.87 | 0.54406 | |
| | 30 | 29.75059 | 1.774 | | | | |
| | 31 | −114.40070 | 0.851 | 1.82415 | 45.54 | 0.55668 | |
| | 32 | 43.19509 | 2.000 | | | | |
| | 33 | 18.43760 | 5.512 | 1.61340 | 44.27 | 0.56340 | |
| | 34 | −17.00068 | 1.001 | 1.94991 | 29.15 | 0.60130 | |
| | 35 | 26.69834 | 0.626 | | | | |
| | 36 | 46.43260 | 2.900 | 1.69636 | 30.26 | 0.59756 | |
| | 37 | −51.30538 | 2.000 | | | | |
| | 38 | 30.68093 | 4.418 | 1.58228 | 39.77 | 0.57704 | |
| | 39 | −23.48534 | 7.038 | | | | |
| | 40 | −17.14975 | 1.000 | 1.75959 | 52.04 | 0.54638 | |
| | 41 | −471.17200 | 38.111 | | | | |
| | 42 | ∞ | 2.850 | 1.51680 | 64.20 | 0.53430 | |
| | 43 | ∞ | 1.000 | | | | |

TABLE 32

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 2.83 | | |
| f | 206.209 | 583.825 | | |
| FNo. | 5.79 | 6.49 | 5.95 | 7.20 |
| 2ω[°] | 7.8 | 2.8 | 7.6 | 2.4 |
| DD[5] | 34.341 | 114.099 | 34.341 | 114.099 |
| DD[10] | 75.353 | 2.622 | 75.353 | 2.622 |
| DD[17] | 15.177 | 23.424 | 15.177 | 23.424 |
| DD[20] | 17.987 | 2.714 | 17.987 | 2.714 |
| DD[21] | 5.330 | 5.330 | 7.902 | 17.729 |
| DD[24] | 29.875 | 29.875 | 27.303 | 17.476 |

Example 17

Figure 35:
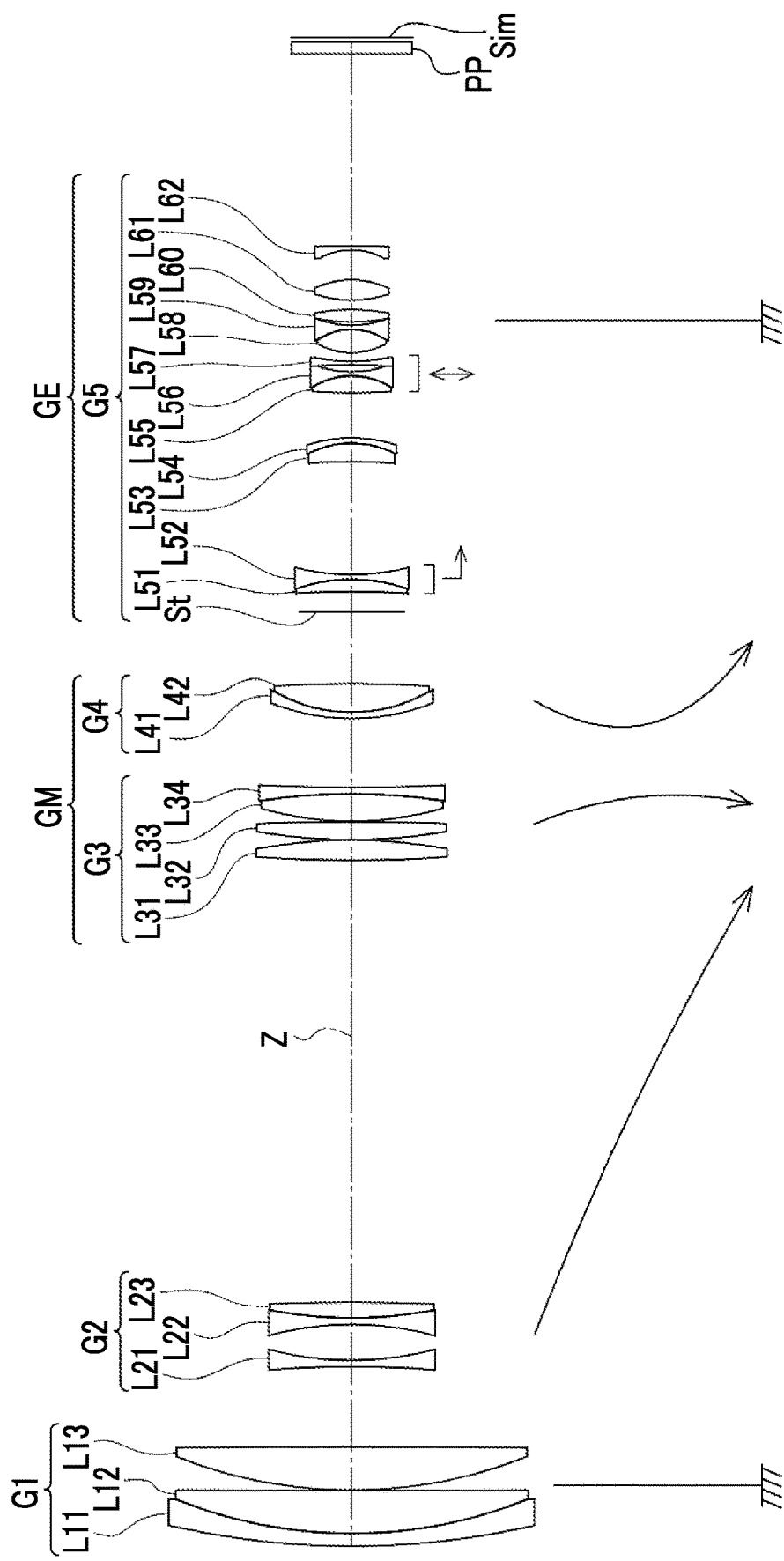
FIG. 35 is a cross-sectional view of a configuration of a zoom lens of Example 17 and a diagram showing movement loci thereof.

FIG. 35 shows a configuration and movement loci of the zoom lens of Example 17. The zoom lens of Example 17 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 36:
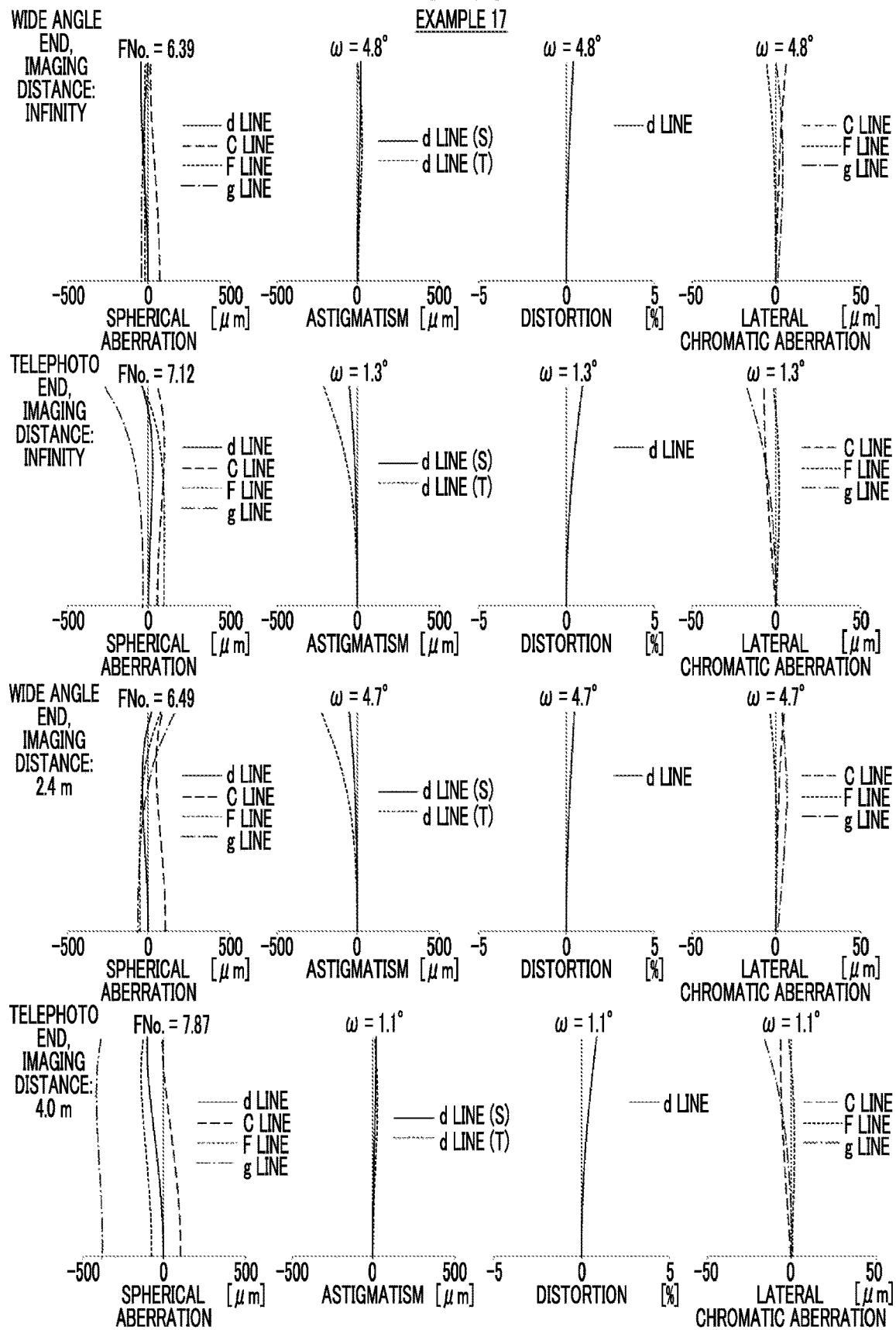
FIG. 36 is a diagram showing aberrations of the zoom lens of Example 17.

Regarding the zoom lens of Example 17, Tables 33A and 33B show basic lens data, and Table 34 shows specifications and variable surface spacings. FIG. 36 shows aberration diagrams. In FIG. 36, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 33A

| Group number | Surface number | Curvature radius | Surface spacing | Nd | νd | θg, F |
|---|---|---|---|---|---|---|
| 1 (Positive) | 1 | 226.14252 | 3.000 | 1.88096 | 37.74 | 0.57670 |
| | 2 | 130.01359 | 10.170 | 1.49700 | 81.61 | 0.53887 |
| | 3 | 15228.54893 | 0.100 | | | |
| | 4 | 130.67904 | 10.300 | 1.43875 | 94.66 | 0.53402 |
| | 5 | −4483.75721 | DD[5] | | | |
| 2 (Negative) | 6 | −305.71992 | 1.500 | 1.89119 | 38.88 | 0.57329 |
| | 7 | 87.45453 | 8.500 | | | |
| | 8 | −85.48480 | 1.510 | 1.43875 | 94.66 | 0.53402 |
| | 9 | 117.96782 | 3.700 | 1.84725 | 22.64 | 0.62858 |
| 3 (Positive) | 10 | −640.73159 | DD[10] | | | |
| | 11 | 377.99496 | 4.800 | 1.49700 | 81.61 | 0.53887 |
| | 12 | −142.00030 | 0.100 | | | |
| | 13 | 156.60361 | 4.216 | 1.59282 | 68.62 | 0.54414 |
| | 14 | −659.39313 | 0.100 | | | |
| | 15 | 89.74515 | 6.502 | 1.49700 | 81.61 | 0.53887 |
| | 16 | −168.96306 | 1.500 | 1.94233 | 33.77 | 0.58632 |
| | 17 | 475.41730 | DD[17] | | | |
| 4 (Positive) | 18 | 59.57361 | 1.501 | 1.82625 | 45.37 | 0.55966 |
| | 19 | 41.95960 | 6.776 | 1.43875 | 94.66 | 0.53402 |
| | 20 | −340.05492 | DD[20] | | | |

TABLE 33B

| number | Surface number | Curvature radius | Surface spacing | Nd | νd | θg, F | |
|---|---|---|---|---|---|---|---|
| 5 (Negative) | 21(St) | ∞ | DD[21] | | | | |
| | 22 | −283.73848 | 2.935 | 1.82761 | 30.63 | 0.59898 | Focusing group |
| | 23 | −45.79809 | 1.110 | 1.72979 | 55.01 | 0.54409 | (Negative) |
| | 24 | 62.89250 | DD[24] | | | | |
| | 25 | −148.03604 | 4.389 | 1.50003 | 54.99 | 0.55247 | |
| | 26 | −26.44052 | 1.297 | 1.95000 | 22.24 | 0.63287 | |
| | 27 | −37.45235 | 10.372 | | | | |
| | 28 | 153.77355 | 4.043 | 1.72778 | 28.61 | 0.60755 | Vibration-proof |
| | 29 | −19.93925 | 1.010 | 1.70732 | 56.13 | 0.54358 | group |
| | 30 | 31.36420 | 1.605 | | | | (Negative) |
| | 31 | −154.89074 | 0.850 | 1.90000 | 38.00 | 0.57547 | |
| | 32 | 52.41717 | 2.000 | | | | |
| | 33 | 18.97450 | 5.496 | 1.61340 | 44.27 | 0.56340 | |
| | 34 | −17.00000 | 1.000 | 1.95000 | 27.45 | 0.60602 | |
| | 35 | 26.30499 | 0.801 | | | | |
| | 36 | 51.00103 | 2.965 | 1.76781 | 26.61 | 0.61319 | |
| | 37 | −52.72804 | 2.202 | | | | |
| | 38 | 31.15660 | 4.836 | 1.57924 | 40.14 | 0.57909 | |
| | 39 | −23.27607 | 7.106 | | | | |
| | 40 | −17.97089 | 1.000 | 1.76158 | 51.84 | 0.54845 | |
| | 41 | −274.09801 | 45.479 | | | | |
| | 42 | ∞ | 2.850 | 1.51680 | 64.20 | 0.53430 | |
| | 43 | ∞ | 1.000 | | | | |

TABLE 34

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 3.77 | | |
| f | 170.109 | 641.376 | | |
| FNo. | 6.39 | 7.12 | 6.49 | 7.87 |
| 2ω[°] | 9.6 | 2.6 | 9.4 | 2.2 |
| DD[5] | 18.967 | 125.440 | 18.967 | 125.440 |
| DD[10] | 104.605 | 2.896 | 104.605 | 2.896 |
| DD[17] | 16.305 | 25.656 | 16.305 | 25.656 |
| DD[20] | 16.972 | 2.856 | 16.972 | 2.856 |
| DD[21] | 4.835 | 4.835 | 6.331 | 17.253 |
| DD[24] | 26.781 | 26.781 | 25.285 | 14.363 |

Example 18

Figure 37:
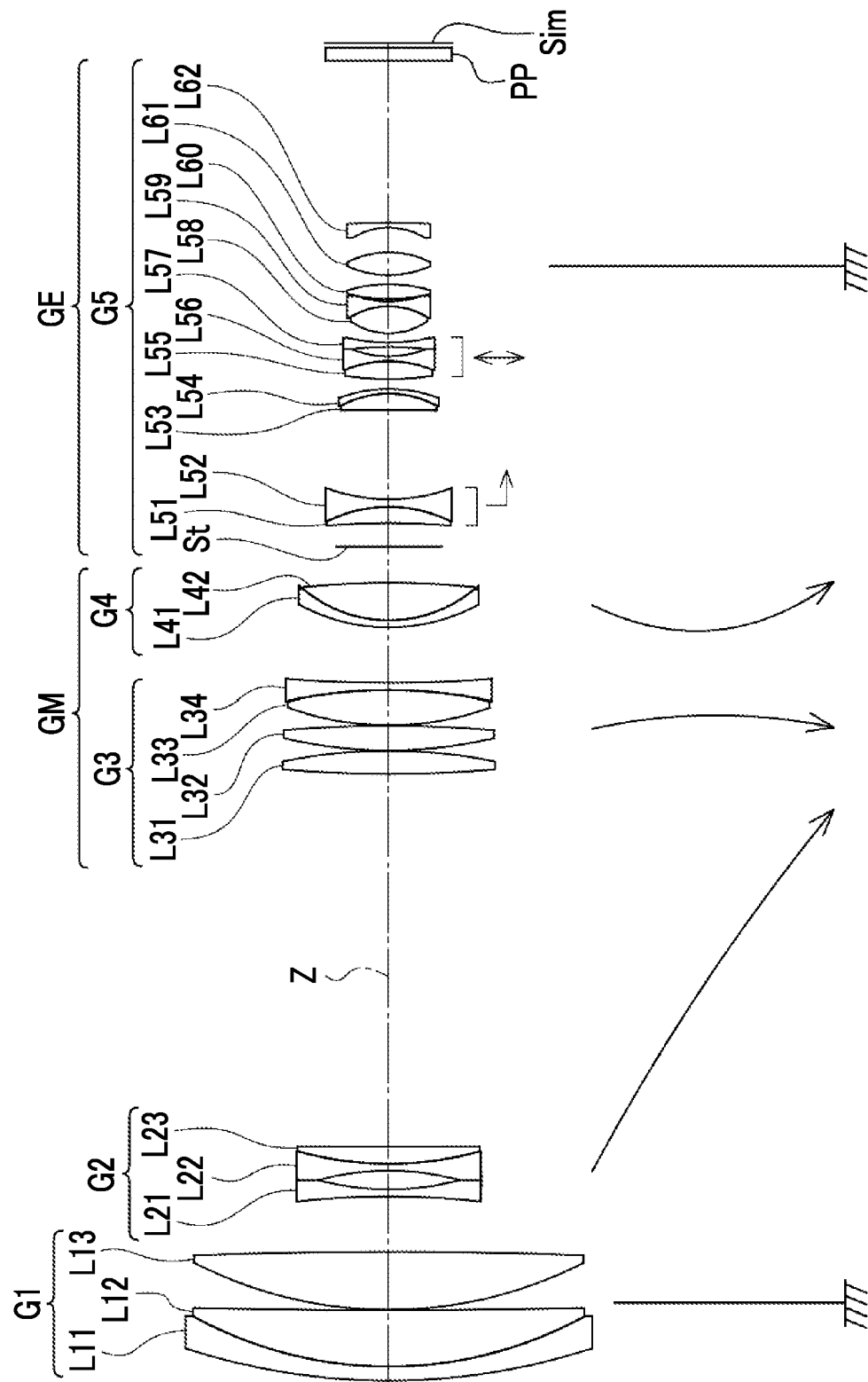
FIG. 37 is a cross-sectional view of a configuration of a zoom lens of Example 18 and a diagram showing movement loci thereof.

FIG. 37 shows a configuration and movement loci of the zoom lens of Example 18. The zoom lens of Example 18 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 38:
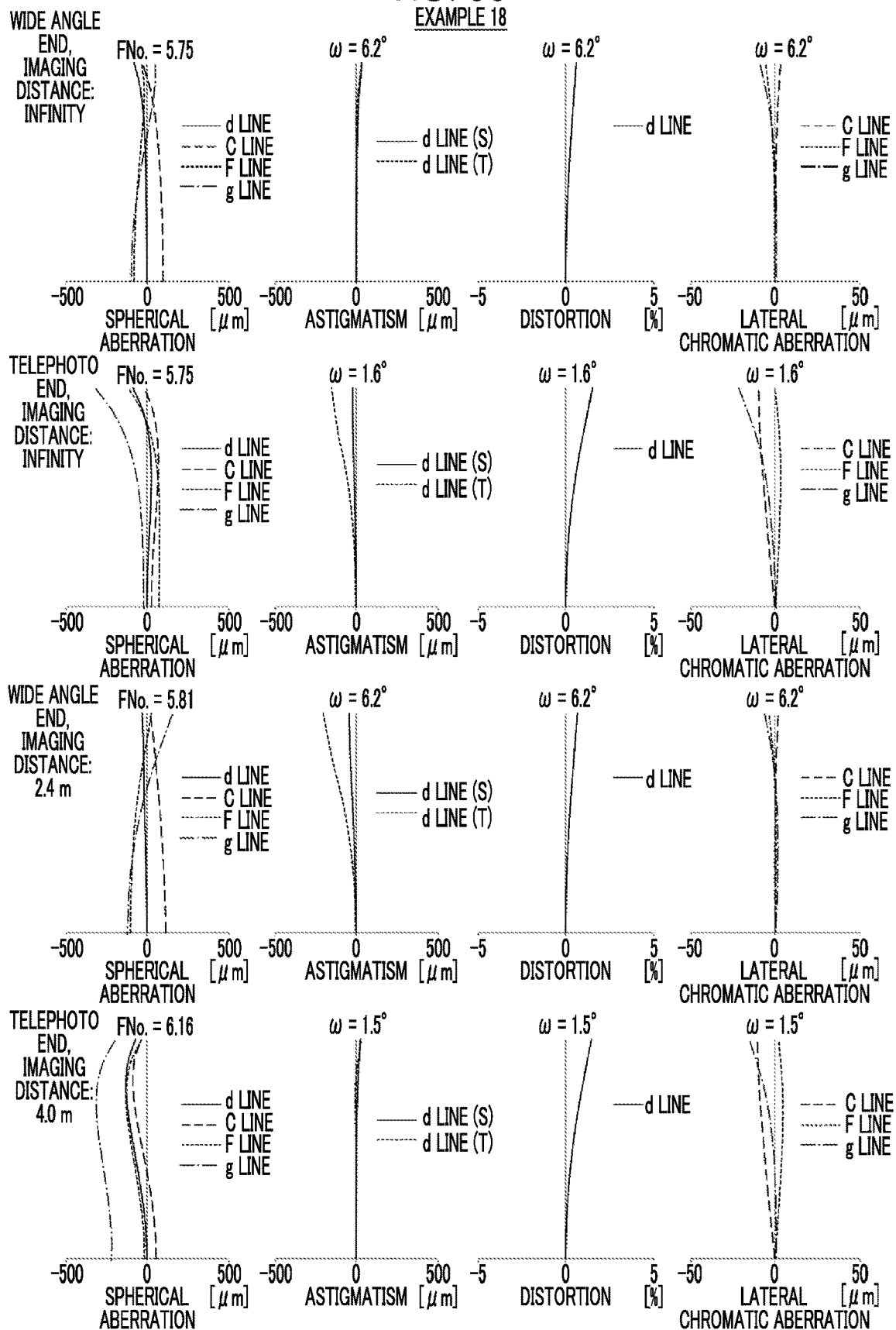
FIG. 38 is a diagram showing aberrations of the zoom lens of Example 18.

Regarding the zoom lens of Example 18, Tables 35A and 35B show basic lens data, and Table 36 shows specifications and variable surface spacings. FIG. 38 shows aberration diagrams. In FIG. 38, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 35A

| Group number | Surface number | Curvature radius | Surface spacing | Nd | νd | θg, F |
|---|---|---|---|---|---|---|
| 1 (Positive) | 1 | 164.02122 | 3.000 | 1.91000 | 35.70 | 0.58170 |
| | 2 | 100.90612 | 12.017 | 1.49700 | 81.61 | 0.53887 |
| | 3 | 2037.08487 | 0.100 | | | |
| | 4 | 106.30309 | 12.365 | 1.43875 | 94.66 | 0.53402 |
| | 5 | −1344.92986 | DD[5] | | | |
| 2 (Negative) | 6 | −209.81698 | 1.500 | 1.84699 | 43.30 | 0.56347 |
| | 7 | 67.71709 | 4.000 | | | |
| | 8 | −67.72814 | 1.500 | 1.43875 | 94.66 | 0.53402 |
| | 9 | 83.93874 | 3.708 | 1.85001 | 22.50 | 0.62922 |
| | 10 | 6618.29968 | DD[10] | | | |
| 3 (Positive) | 11 | 315.63732 | 4.911 | 1.59282 | 68.62 | 0.54414 |
| | 12 | −132.98621 | 0.100 | | | |
| | 13 | 114.89776 | 5.234 | 1.59282 | 68.62 | 0.54414 |
| | 14 | −314.41475 | 0.100 | | | |
| | 15 | 73.56486 | 7.337 | 1.49700 | 81.61 | 0.53887 |
| | 16 | −119.28284 | 1.510 | 1.94636 | 32.81 | 0.58894 |
| | 17 | 327.51360 | DD[17] | | | |
| 4 (Positive) | 18 | 46.51069 | 1.500 | 1.82582 | 45.42 | 0.55959 |
| | 19 | 32.60239 | 8.008 | 1.43875 | 94.66 | 0.53402 |
| | 20 | −211.73745 | DD[20] | | | |

TABLE 35B

| Group number | Surface number | Curvature radius | Surface spacing | Nd | νd | θg, F | |
|---|---|---|---|---|---|---|---|
| 5 (Negative) | 21(St) | ∞ | DD[21] | | | | |
| | 22 | −193.54635 | 3.500 | 1.66048 | 36.08 | 0.58736 | Focusing group (Negative) |
| | 23 | −34.13180 | 1.598 | 1.58235 | 61.67 | 0.54202 | |
| | 24 | 44.39519 | DD[24] | | | | |
| | 25 | −631.07057 | 3.508 | 1.50000 | 55.02 | 0.55243 | |
| | 26 | −24.43229 | 1.000 | 1.95000 | 22.15 | 0.63334 | |
| | 27 | −35.34238 | 2.079 | | | | |
| | 28 | 69.79241 | 3.849 | 1.78981 | 25.51 | 0.61618 | Vibration-proof group (Negative) |
| | 29 | −27.94246 | 1.008 | 1.75896 | 52.10 | 0.54807 | |
| | 30 | 24.30997 | 2.071 | | | | |
| | 31 | −69.18183 | 0.850 | 1.82508 | 45.49 | 0.55945 | |
| | 32 | 43.31089 | 2.000 | | | | |
| | 33 | 16.15294 | 5.787 | 1.57649 | 47.08 | 0.56498 | |
| | 34 | −17.36747 | 1.000 | 1.95000 | 30.42 | 0.59652 | |
| | 35 | 23.20724 | 0.508 | | | | |
| | 36 | 41.02495 | 3.150 | 1.67236 | 31.97 | 0.59927 | |
| | 37 | −37.03764 | 2.000 | | | | |
| | 38 | 24.77898 | 4.826 | 1.58000 | 40.00 | 0.57935 | |
| | 39 | −22.61871 | 5.310 | | | | |
| | 40 | −16.57420 | 1.000 | 1.83453 | 44.55 | 0.56118 | |
| | 41 | −213.95654 | 34.565 | | | | |
| | 42 | ∞ | 2.850 | 1.51680 | 64.20 | 0.53430 | |
| | 43 | ∞ | 1.000 | | | | |

TABLE 36

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 3.77 | | |
| f | 128.944 | 486.169 | | |
| FNo. | 5.75 | 5.15 | 5.81 | 6.16 |
| 2ω[°] | 12.4 | 3.2 | 12.4 | 3.0 |
| DD[5] | 11.790 | 88.822 | 11.790 | 88.822 |
| DD[10] | 79.444 | 2.712 | 79.444 | 2.712 |
| DD[17] | 11.834 | 16.510 | 11.834 | 16.510 |
| DD[20] | 7.749 | 2.773 | 7.749 | 2.773 |
| DD[21] | 4.957 | 4.957 | 5.895 | 12.874 |
| DD[24] | 19.029 | 19.029 | 18.091 | 11.112 |

Example 19

Figure 39:
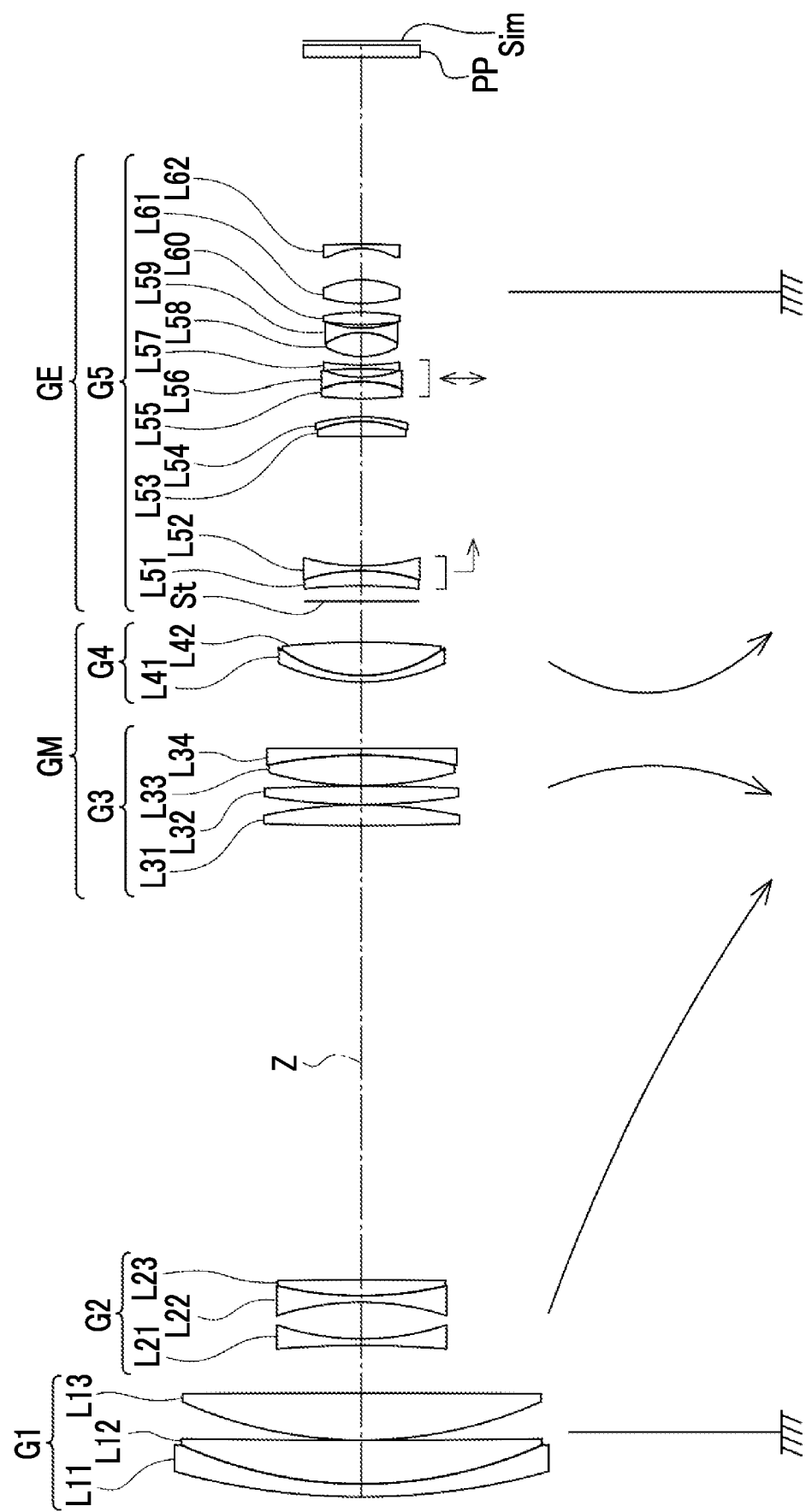
FIG. 39 is a cross-sectional view of a configuration of a zoom lens of Example 19 and a diagram showing movement loci thereof.

FIG. 39 shows a configuration and movement loci of the zoom lens of Example 19. The zoom lens of Example 19 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The focusing group has a negative refractive power and consists of lenses L51 and L52. The vibration-proof group has a negative refractive power and consists of lenses L55 to L57.

Figure 40:
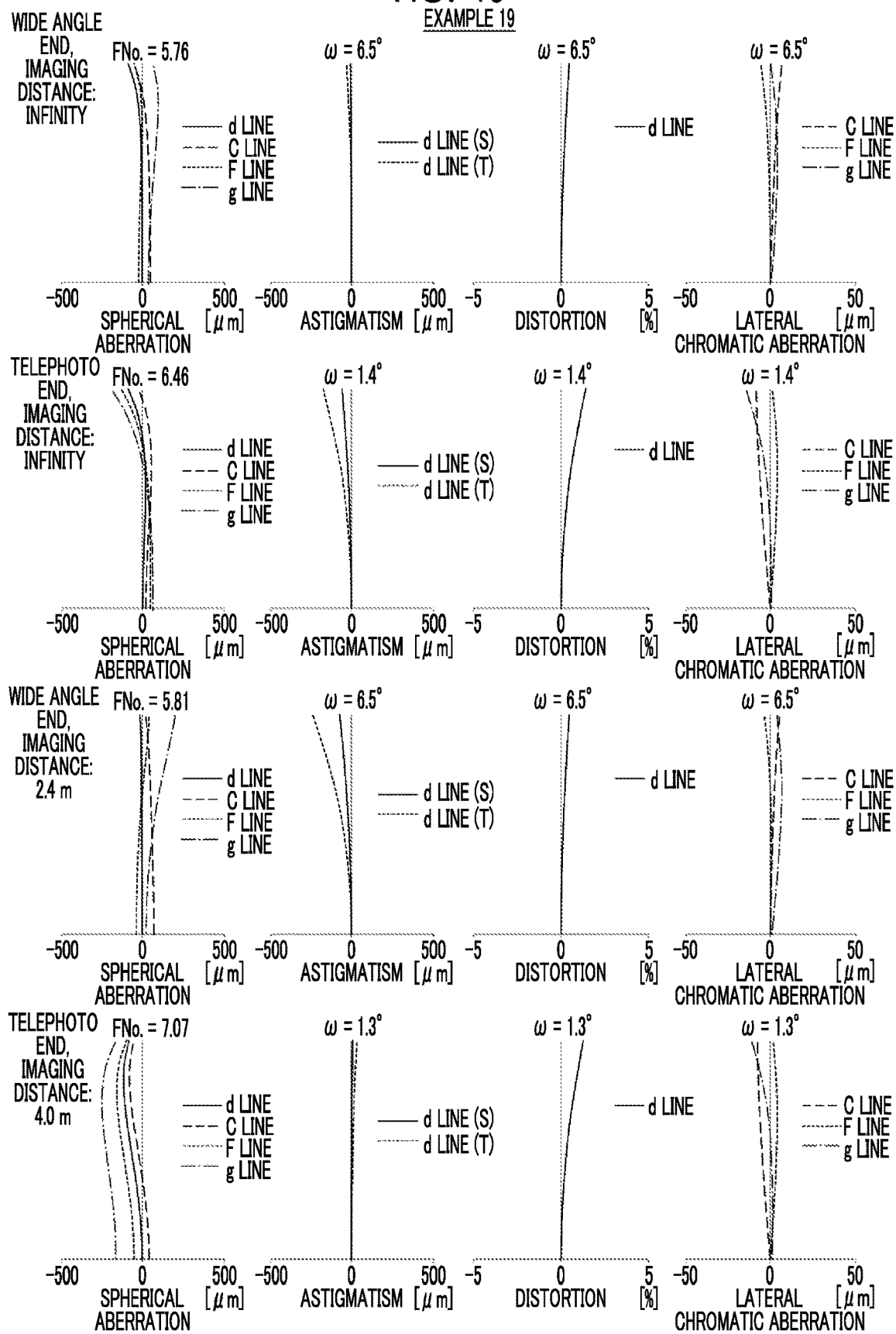
FIG. 40 is a diagram showing aberrations of the zoom lens of Example 19.

Regarding the zoom lens of Example 19, Tables 37A and 37B show basic lens data, and Table 38 shows specifications and variable surface spacings. FIG. 40 shows aberration diagrams. In FIG. 40, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 4.0 m (meters).

TABLE 37A

| Group number | Surface number | Curvature radius | Surface spacing | Nd | νd | θg, F |
|---|---|---|---|---|---|---|
| 1 (Positive) | 1 | 190.57386 | 3.000 | 1.90993 | 35.73 | 0.58015 |
| | 2 | 118.10958 | 10.150 | 1.49700 | 81.61 | 0.53887 |
| | 3 | 3616.72223 | 0.020 | | | |
| | 4 | 118.88631 | 10.850 | 1.43875 | 94.66 | 0.53402 |
| | 5 | −7560.12246 | DD[5] | | | |
| 2 (Negative) | 6 | −286.93836 | 1.500 | 1.87707 | 40.29 | 0.56765 |
| | 7 | 71.08535 | 8.494 | | | |
| | 8 | −73.82001 | 1.510 | 1.43875 | 94.66 | 0.53402 |
| | 9 | 96.75409 | 3.703 | 1.84999 | 22.50 | 0.62144 |
| | 10 | −1240.69298 | DD[10] | | | |
| 3 (Positive) | 11 | 668.40251 | 4.805 | 1.49700 | 81.61 | 0.53887 |
| | 12 | −124.44670 | 0.100 | | | |
| | 13 | 160.64704 | 4.281 | 1.59282 | 68.62 | 0.54414 |
| | 14 | −570.93355 | 0.100 | | | |
| | 15 | 91.25740 | 7.066 | 1.49700 | 81.61 | 0.53887 |
| | 16 | −120.50729 | 1.500 | 1.95000 | 32.98 | 0.58776 |
| | 17 | −8400.90852 | DD[17] | | | |
| 4 (Positive) | 18 | 51.77658 | 1.500 | 1.83538 | 44.46 | 0.55869 |
| | 19 | 36.41979 | 7.720 | 1.43875 | 94.66 | 0.53402 |
| | 20 | −210.79502 | DD[20] | | | |

TABLE 37B

| Group number | Surface number | Curvature radius | Surface spacing | Nd | νd | θg, F | |
|---|---|---|---|---|---|---|---|
| 5 (Negative) | 21(St) | ∞ | DD[21] | | | | |
| | 22 | −147.38924 | 3.492 | 1.73224 | 28.52 | 0.60228 | Focusing group (Negative) |
| | 23 | −50.01792 | 1.110 | 1.54728 | 63.18 | 0.54037 | |
| | 24 | 55.89500 | DD[24] | | | | |
| | 25 | 13647.03576 | 3.510 | 1.50140 | 54.77 | 0.55064 | |
| | 26 | −31.60680 | 1.000 | 1.94982 | 22.16 | 0.62602 | |
| | 27 | −45.77513 | 4.230 | | | | |
| | 28 | 90.96441 | 3.769 | 1.86440 | 21.78 | 0.62416 | Vibration-proof group (Negative) |
| | 29 | −33.30886 | 1.012 | 1.85569 | 42.43 | 0.56284 | |
| | 30 | 29.79876 | 1.943 | | | | |
| | 31 | −102.59837 | 0.850 | 1.89970 | 38.03 | 0.57325 | |
| | 32 | 65.68024 | 2.006 | | | | |
| | 33 | 19.65186 | 5.553 | 1.61340 | 44.27 | 0.56340 | |
| | 34 | −17.00002 | 1.000 | 1.94991 | 26.92 | 0.60921 | |
| | 35 | 28.24937 | 0.809 | | | | |
| | 36 | 59.04101 | 2.916 | 1.69950 | 30.04 | 0.59812 | |
| | 37 | −51.50853 | 2.000 | | | | |
| | 38 | 36.13918 | 5.477 | 1.62974 | 35.03 | 0.58660 | |
| | 39 | −23.73258 | 7.257 | | | | |
| | 40 | −18.35871 | 1.000 | 1.77778 | 50.22 | 0.54891 | |
| | 41 | −198.06396 | 43.298 | | | | |
| | 42 | ∞ | 2.850 | 1.51680 | 64.20 | 0.53430 | |
| | 43 | ∞ | 1.000 | | | | |

TABLE 38

| | Wide angle end | Telephoto end | Wide angle end | Telephoto end |
|---|---|---|---|---|
| Imaging distance | Infinity | Infinity | 2.4 m | 4.0 m |
| Zoom magnification | 1.00 | 4.71 | | |
| f | 123.675 | 582.876 | | |
| FNo. | 5.76 | 6.46 | 5.81 | 7.07 |
| 2ω[°] | 13.0 | 2.8 | 13.0 | 2.6 |
| DD[5] | 11.070 | 111.590 | 11.070 | 111.590 |
| DD[10] | 104.995 | 2.828 | 104.995 | 2.828 |
| DD[17] | 15.440 | 23.816 | 15.440 | 23.816 |
| DD[20] | 9.513 | 2.784 | 9.513 | 2.784 |
| DD[21] | 3.571 | 3.571 | 4.479 | 15.346 |
| DD[24] | 29.993 | 29.993 | 29.085 | 18.218 |

Example 20

Figure 41:
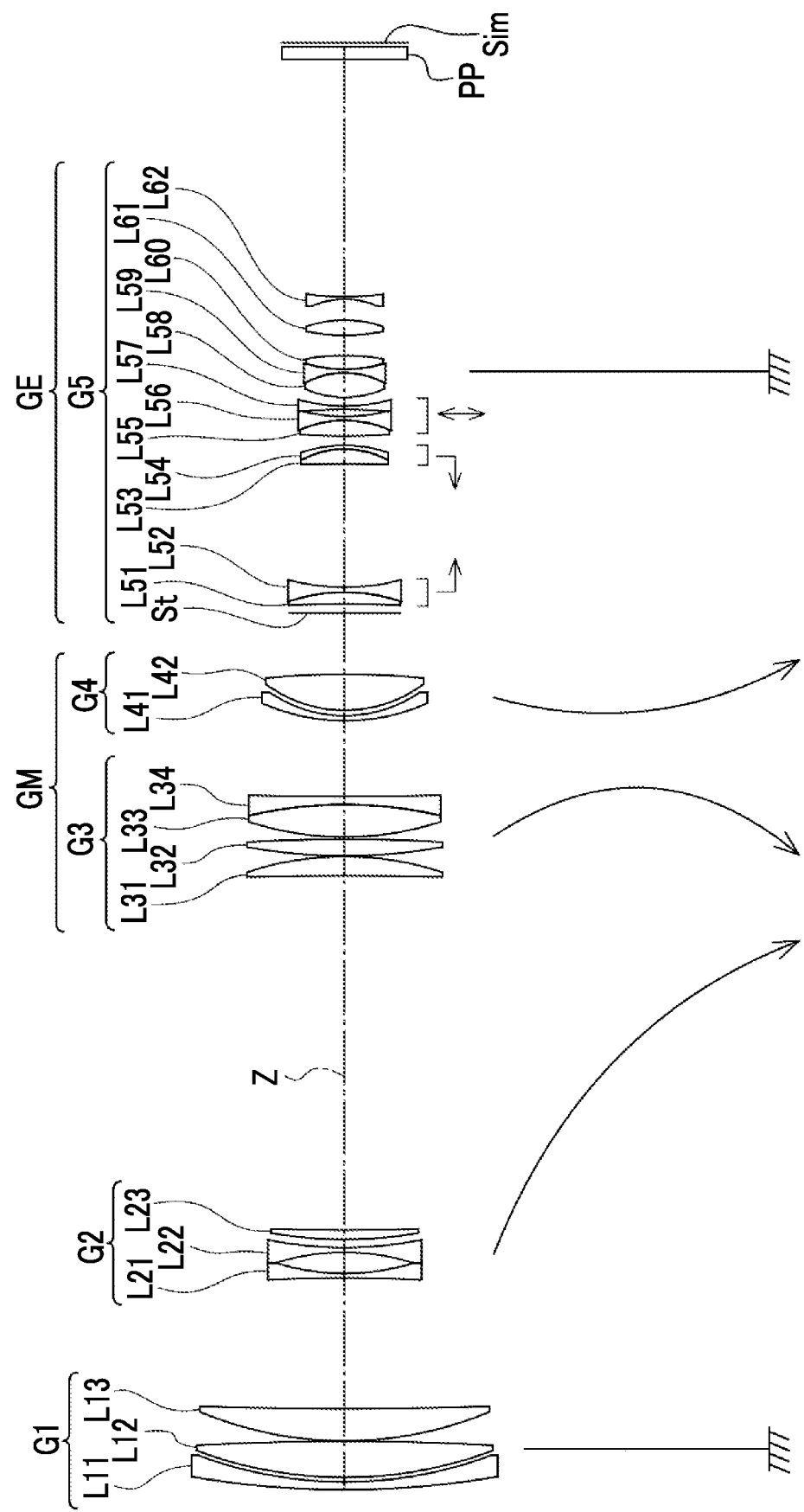
FIG. 41 is a cross-sectional view of a configuration of a zoom lens of Example 20 and a diagram showing movement loci thereof.

FIG. 41 shows a configuration and movement loci of the zoom lens of Example 20. The zoom lens of Example 20 consists of a first lens group G1, a second lens group G2, a third lens group G3, a fourth lens group G4, and a fifth lens group G5, in order from the object side to the image side. The first lens group G1 consists of three lenses L11 to L13, in order from the object side to the image side. The second lens group G2 consists of three lenses L21 to L23, in order from the object side to the image side. The third lens group G3 consists of four lenses L31 to L34, in order from the object side to the image side. The fourth lens group G4 consists of two lenses L41 and L42, in order from the object side to the image side. The fifth lens group G5 consists of an aperture stop St and twelve lenses L51 to L62, in order from the object side to the image side.

During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The middle group GM consists of the third lens group G3 and the fourth lens group G4. The final lens group GE consists of the fifth lens group G5. The zoom lens of Example 20 has two focusing groups. The first focusing group has a negative refractive power and consists of lenses L51 and L52. The second focusing group has a positive refractive power and consists of lenses L53 and L54. The vibration-proof group has a negative refractive power and consists of lenses L55 to L57.

Figure 42:
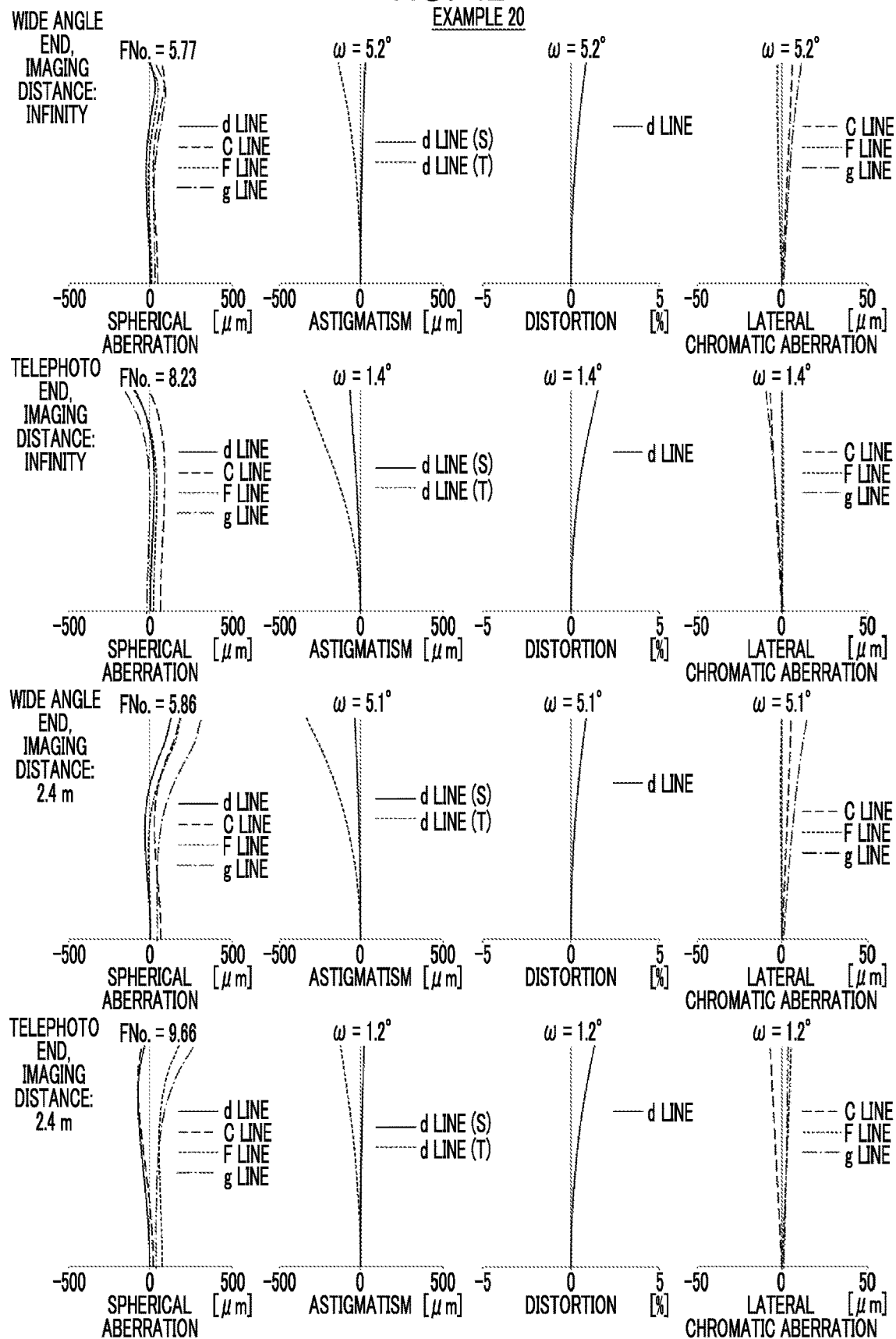
FIG. 42 is a diagram showing aberrations of the zoom lens of Example 20.

Regarding the zoom lens of Example 20, Tables 39A and 39B show basic lens data, and Table 40 shows specifications and variable surface spacings. FIG. 42 shows aberration diagrams. In FIG. 42, the top row shows aberrations in the wide angle end state in which the imaging distance is infinite, the second row shows aberrations in the telephoto end state in which the imaging distance is infinite, the third row shows aberrations in the wide angle end state in which the imaging distance is 2.4 m (meters), and the bottom row shows aberrations in the telephoto end state in which the imaging distance is 2.4 m (meters).

TABLE 39A

| Group number | Surface number | Curvature radius | Surface spacing | Nd | νd | θg, F |
|---|---|---|---|---|---|---|
| 1 (Positive) | 1 | 245.02489 | 1.801 | 1.62005 | 36.35 | 0.58602 |
| | 2 | 111.83425 | 1.000 | | | |
| | 3 | 113.13671 | 8.300 | 1.43700 | 95.10 | 0.53364 |
| | 4 | −735.94906 | 0.100 | | | |
| | 5 | 100.56069 | 7.340 | 1.43700 | 95.10 | 0.53364 |
| | 6 | 1197.80101 | DD[6] | | | |
| 2 (Negative) | 7 | −451.53960 | 1.066 | 1.72916 | 54.09 | 0.54490 |
| | 8 | 61.76488 | 4.850 | | | |
| | 9 | −59.86060 | 1.067 | 1.43700 | 95.10 | 0.53364 |
| | 10 | 101.17255 | 1.882 | | | |
| | 11 | 110.08682 | 2.129 | 1.89286 | 20.36 | 0.63944 |
| | 12 | 547.66662 | DD[12] | | | |
| 3 (Positive) | 13 | −1209.55313 | 4.420 | 1.49700 | 81.54 | 0.53748 |
| | 14 | −83.17188 | 0.145 | | | |
| | 15 | 146.00056 | 3.799 | 1.49700 | 81.54 | 0.53748 |
| | 16 | −443.68260 | 0.505 | | | |
| | 17 | 81.97926 | 7.440 | 1.43875 | 94.66 | 0.53402 |
| | 18 | −113.84532 | 1.901 | 1.89190 | 37.13 | 0.57813 |
| | 19 | 1289.85682 | DD[19] | | | |
| 4 (Positive) | 20 | 54.31494 | 1.127 | 1.83481 | 42.74 | 0.56490 |
| | 21 | 34.71008 | 1.259 | | | |
| | 22 | 34.77574 | 8.290 | 1.49700 | 81.54 | 0.53748 |
| | 23 | −217.92422 | DD[23] | | | |

TABLE 39B

| Group number | Surface number | Curvature radius | Surface spacing | Nd | vd | θg, F | |
|---|---|---|---|---|---|---|---|
| 5 (Negative) | 24(St) | ∞ | DD[24] | | | | |
| | 25 | −246.68690 | 2.627 | 1.75425 | 32.66 | 0.59295 | Focusing group |
| | 26 | −45.84221 | 1.130 | 1.64569 | 57.71 | 0.54516 | (Negative) |
| | 27 | 57.80003 | DD[27] | | | | |
| | 28 | −903.94340 | 3.393 | 1.52521 | 50.38 | 0.55845 | Focusing group |
| | 29 | −23.61976 | 0.860 | 1.98392 | 27.15 | 0.60828 | (Positive) |
| | 30 | −34.91974 | DD[30] | | | | |
| | 31 | 163.55449 | 3.601 | 1.80519 | 25.48 | 0.61354 | Vibration-proof |
| | 32 | −28.99025 | 0.930 | 1.72915 | 54.64 | 0.54488 | group |
| | 33 | 46.74344 | 1.610 | | | | (Negative) |
| | 34 | −133.04632 | 0.750 | 1.81600 | 46.54 | 0.55532 | |
| | 35 | 43.52783 | 2.000 | | | | |
| | 36 | 25.63038 | 5.663 | 1.72047 | 34.71 | 0.58350 | |
| | 37 | −21.35197 | 0.801 | 2.00069 | 25.46 | 0.61364 | |
| | 38 | 37.06899 | 3.126 | 1.67300 | 38.26 | 0.57580 | |
| | 39 | −61.03746 | 4.646 | | | | |
| | 40 | 51.15125 | 3.482 | 1.65412 | 39.68 | 0.57378 | |
| | 41 | −30.52552 | 4.798 | | | | |
| | 42 | −21.08587 | 0.601 | 1.74100 | 52.64 | 0.54676 | |
| | 43 | 84.89353 | 54.346 | | | | |
| | 44 | ∞ | 2.850 | 1.51680 | 64.20 | 0.53430 | |
| | 45 | ∞ | 1.000 | | | | |

TABLE 40

| | Wide angle end | Telephoto end | Wide angle end | Telephoto end |
|---|---|---|---|---|
| Imaging distance | Infinity | Infinity | 2.4 m | 2.4 m |
| Zoom magnification | 1.00 | 3.77 | | |
| f | 154.644 | 583.069 | | |
| FNo. | 5.77 | 8.23 | 5.86 | 9.66 |
| 2ω[°] | 10.4 | 2.8 | 10.2 | 2.4 |
| DD[6] | 29.945 | 101.730 | 29.945 | 101.730 |
| DD[12] | 81.228 | 5.173 | 81.228 | 5.173 |
| DD[19] | 17.114 | 29.974 | 17.114 | 29.974 |
| DD[23] | 13.956 | 5.366 | 13.956 | 5.366 |
| DD[24] | 2.200 | 2.200 | 3.318 | 17.395 |
| DD[27] | 28.301 | 28.301 | 26.371 | 2.062 |
| DD[30] | 2.087 | 2.087 | 2.899 | 13.130 |

Tables 41 to 45 each show corresponding values of Conditional Expressions (1) to (39) of the zoom lenses of Examples 1 to 20.

TABLE 41

| Expression number | Conditional expression | Example 1 | Example 2 | Example 3 | Example 4 |
|---|---|---|---|---|---|
| (1) | IH/ft | 0.024 | 0.024 | 0.024 | 0.024 |
| (2) | DG1/IH | 1.257 | 1.045 | 1.311 | 1.063 |
| (3) | Bm | 7.647 | 7.955 | 6.673 | 8.545 |
| (4) | $\|(1-\beta ist) \times \beta isrt\|$ | 2.890 | 2.855 | 2.900 | 2.604 |
| (5) | v1p | 95.10 | 85.19 | 82.57 | 97.75 |
| (6) | v1pave | 95.10 | 85.19 | 82.57 | 97.75 |
| (7) | Δθ1p | 0.04607 | 0.03542 | 0.03077 | 0.05107 |
| (8) | Δθ1pave | 0.04607 | 0.03542 | 0.03077 | 0.05107 |
| (9) | vMp | 95.10 | 85.19 | 100.82 | 97.75 |
| (10) | vMpave | 86.06 | 82.51 | 87.97 | 83.33 |
| (11) | ΔθMp | 0.04607 | 0.03542 | 0.05573 | 0.05107 |
| (12) | ΔθMpave | 0.03403 | 0.03099 | 0.03725 | 0.03137 |
| (13) | N1n | 1.620 | 1.620 | 1.620 | 1.667 |
| (14) | v2p | 22.73 | 20.88 | 20.36 | 22.76 |
| (15) | Δθ2p | 0.02363 | 0.03124 | 0.03069 | 0.02598 |
| (16) | v2n | 95.10 | 85.19 | 82.57 | 95.10 |
| (17) | Δθ2n | 0.04607 | 0.03542 | 0.03077 | 0.04607 |
| (18) | βEt | 3.064 | 3.091 | 3.050 | 3.112 |
| (19) | $fMp/(fw \times ft)^{1/2}$ | 0.284 | 0.197 | 0.290 | 0.174 |
| (20) | $\|\beta 2t\|$ | 2.309 | 2.285 | 2.303 | 2.454 |
| (21) | $\|fis/fisr\|$ | 0.530 | 0.565 | 0.641 | 0.533 |
| (22) | D1n/(ft/FNot) | 0.025 | 0.025 | 0.028 | 0.026 |
| (23) | $(fMw \times fMt)^{1/2}/(fw \times ft)^{1/2}$ | 0.212 | 0.197 | 0.216 | 0.189 |
| (24) | $\|f2\|/fPA$ | 0.628 | 1.155 | 0.639 | 1.327 |
| (25) | TLt/ft | 0.556 | 0.591 | 0.549 | 0.593 |
| (26) | $\|fE\|/ft$ | 0.065 | 0.060 | 0.057 | 0.075 |
| (27) | β2t/β2w | 4.123 | 3.637 | 4.019 | 3.882 |
| (28) | βPArt | 1.664 | 3.091 | 1.621 | 2.456 |
| (29) | $f1/(fw \times ft)^{1/2}$ | 0.610 | 0.720 | 0.634 | 0.724 |
| (30) | $\|f2\|/fw$ | 0.347 | 0.382 | 0.361 | 0.389 |

TABLE 41-continued

| Expression number | Conditional expression | Example 1 | Example 2 | Example 3 | Example 4 |
|---|---|---|---|---|---|
| (31) | ffp/|ffn| | 1.736 | 1.676 | — | 2.080 |
| (32) | f1/|f2| | 3.417 | 3.172 | 3.416 | 3.126 |
| (33) | $|f2|/(fw \times ft)^{1/2}$ | 0.179 | 0.227 | 0.186 | 0.231 |
| (34) | $fPA/(fw \times ft)^{1/2}$ | 0.284 | 0.197 | 0.290 | 0.174 |
| (35) | $|fE|/(fw \times ft)^{1/2}$ | 0.127 | 0.102 | 0.112 | 0.127 |
| (36) | $|ff|/(fw \times ft)^{1/2}$ | 0.260 | 0.247 | 0.402 | 0.223 |
| (37) | $|fis|/(fw \times ft)^{1/2}$ | 0.091 | 0.090 | 0.109 | 0.098 |
| (38) | DMnp/(RMnpf + RMnpr) | 0.022 | 0.000 | 0.025 | 0.000 |
| (39) | DEnp/(REnpf + REnpr) | −0.107 | −0.128 | −0.118 | −0.082 |

TABLE 42

| Expression number | Conditional expression | Example 5 | Example 6 | Example 7 | Example 8 |
|---|---|---|---|---|---|
| (1) | IH/ft | 0.024 | 0.024 | 0.024 | 0.024 |
| (2) | DG1/IH | 1.322 | 1.346 | 1.010 | 0.863 |
| (3) | Bm | 7.600 | 7.620 | 6.722 | 6.478 |
| (4) | $|(1-\beta ist) \times \beta isrt|$ | 2.887 | 2.882 | 2.582 | 2.825 |
| (5) | ν1p | 85.19 | 91.36 | 94.77 | 89.95 |
| (6) | ν1pave | 83.88 | 91.36 | 94.77 | 89.95 |
| (7) | Δθ1p | 0.03542 | 0.04061 | 0.04404 | 0.04093 |
| (8) | Δθ1pave | 0.03310 | 0.04061 | 0.04404 | 0.04093 |
| (9) | νMp | 82.57 | 91.36 | 94.77 | 89.95 |
| (10) | νMpave | 82.57 | 91.36 | 85.95 | 84.34 |
| (11) | ΔθMp | 0.03077 | 0.04061 | 0.04404 | 0.04093 |
| (12) | ΔθMpave | 0.03077 | 0.04061 | 0.03335 | 0.03231 |
| (13) | N1n | 1.620 | 1.620 | 1.715 | 1.673 |
| (14) | ν2p | 19.32 | 23.91 | 20.36 | 23.08 |
| (15) | Δθ2p | 0.03481 | 0.02194 | 0.03069 | 0.02160 |
| (16) | ν2n | 94.66 | 91.36 | 95.00 | 90.00 |
| (17) | Δθ2n | 0.04576 | 0.04061 | 0.04631 | 0.04121 |
| (18) | βEt | 3.096 | 3.088 | 2.308 | 2.664 |
| (19) | $fMp/(fw \times ft)^{1/2}$ | 0.345 | 0.289 | 0.185 | 0.185 |
| (20) | |β2t| | 2.373 | 2.471 | 1.787 | 1.575 |
| (21) | |fis/fisr| | 0.659 | 0.691 | 0.608 | 0.530 |
| (22) | D1n/(ft/FNot) | 0.028 | 0.028 | 0.025 | 0.020 |
| (23) | $(fMw \times fMt)^{1/2}/(fw \times ft)^{1/2}$ | 0.211 | 0.215 | 0.228 | 0.215 |
| (24) | |f2|/fPA | 0.525 | 0.649 | 1.293 | 1.331 |
| (25) | TLt/ft | 0.559 | 0.565 | 0.600 | 0.616 |
| (26) | |fE|/ft | 0.061 | 0.059 | 0.112 | 0.095 |
| (27) | β2t/β2w | 4.130 | 4.286 | 2.797 | 2.546 |
| (28) | βPArt | 1.177 | 1.754 | 3.471 | 3.433 |
| (29) | $f1/(fw \times ft)^{1/2}$ | 0.617 | 0.624 | 0.739 | 0.792 |
| (30) | |f2|/fw | 0.351 | 0.356 | 0.401 | 0.414 |
| (31) | ffp/|ffn| | 1.792 | 1.795 | 1.270 | 1.935 |
| (32) | f1/|f2| | 3.411 | 3.405 | 3.097 | 3.211 |
| (33) | $|f2|/(fw \times ft)^{1/2}$ | 0.181 | 0.183 | 0.239 | 0.247 |
| (34) | $fPA/(fw \times ft)^{1/2}$ | 0.345 | 0.282 | 0.185 | 0.185 |
| (35) | $|fE|/(fw \times ft)^{1/2}$ | 0.118 | 0.115 | 0.188 | 0.160 |
| (36) | $|ff|/(fw \times ft)^{1/2}$ | 0.279 | 0.277 | 0.538 | 0.244 |
| (37) | $|fis|/(fw \times ft)^{1/2}$ | 0.105 | 0.110 | 0.101 | 0.094 |
| (38) | DMnp/(RMnpf + RMnpr) | 0.013 | 0.012 | −0.003 | −0.025 |
| (39) | DEnp/(REnpf + REnpr) | −0.122 | −0.134 | −0.076 | −0.093 |

TABLE 43

| Expression number | Conditional expression | Example 9 | Example 10 | Example 11 | Example 12 |
|---|---|---|---|---|---|
| (1) | IH/ft | 0.024 | 0.024 | 0.024 | 0.024 |
| (2) | DG1/IH | 0.842 | 0.804 | 0.963 | 0.943 |
| (3) | Bm | 4.675 | 6.000 | 7.549 | 5.378 |
| (4) | $|(1-\beta ist) \times \beta isrt|$ | 2.758 | 2.950 | 3.401 | 2.255 |
| (5) | ν1p | 94.66 | 90.19 | 100.82 | 95.10 |
| (6) | ν1pave | 94.66 | 90.19 | 100.82 | 83.40 |
| (7) | Δθ1p | 0.04576 | 0.03962 | 0.05573 | 0.04607 |
| (8) | Δθ1pave | 0.04576 | 0.03962 | 0.05573 | 0.03051 |
| (9) | νMp | 94.66 | 90.19 | 95.10 | 94.66 |
| (10) | νMpave | 85.96 | 82.24 | 86.06 | 83.90 |
| (11) | ΔθMp | 0.04576 | 0.03962 | 0.04607 | 0.04576 |
| (12) | ΔθMpave | 0.03493 | 0.03134 | 0.03403 | 0.03153 |

TABLE 43-continued

| Expression number | Conditional expression | Example 9 | Example 10 | Example 11 | Example 12 |
|---|---|---|---|---|---|
| (13) | N1n | 1.789 | 1.787 | 1.756 | 1.766 |
| (14) | ν2p | 18.90 | 17.02 | 18.90 | 17.47 |
| (15) | Δθ2p | 0.03853 | 0.04908 | 0.03853 | 0.04651 |
| (16) | ν2n | 94.66 | 90.19 | 95.10 | 101.00 |
| (17) | Δθ2n | 0.04576 | 0.03962 | 0.04607 | 0.05603 |
| (18) | βEt | 2.303 | 2.253 | 2.246 | 2.442 |
| (19) | fMp/(fw × ft)$^{1/2}$ | 0.189 | 0.191 | 0.196 | 0.187 |
| (20) | |β2t| | 1.947 | 2.004 | 2.055 | 1.871 |
| (21) | |fis/fisr| | 0.525 | 0.467 | 0.444 | 0.590 |
| (22) | D1n/(ft/FNot) | 0.021 | 0.025 | 0.025 | 0.025 |
| (23) | (fMw × fMt)$^{1/2}$/(fw × ft)$^{1/2}$ | 0.234 | 0.239 | 0.239 | 0.226 |
| (24) | |f2|/fPA | 1.265 | 1.261 | 1.231 | 1.288 |
| (25) | TLt/ft | 0.606 | 0.607 | 0.612 | 0.616 |
| (26) | |fE|/ft | 0.110 | 0.110 | 0.113 | 0.106 |
| (27) | β2t/β2w | 3.001 | 3.078 | 3.192 | 2.931 |
| (28) | βPArt | 3.372 | 3.334 | 3.193 | 3.415 |
| (29) | f1/(fw × ft)$^{1/2}$ | 0.736 | 0.738 | 0.744 | 0.747 |
| (30) | |f2|/fw | 0.403 | 0.405 | 0.405 | 0.406 |
| (31) | ffp/|ffn| | — | — | — | 1.711 |
| (32) | f1/|f2| | 3.072 | 3.064 | 3.093 | 3.097 |
| (33) | |f2|/(fw × ft)$^{1/2}$ | 0.240 | 0.241 | 0.241 | 0.241 |
| (34) | fPA/(fw × ft)$^{1/2}$ | 0.189 | 0.191 | 0.196 | 0.187 |
| (35) | |fE|/(fw × ft)$^{1/2}$ | 0.185 | 0.185 | 0.191 | 0.178 |
| (36) | |ff|/(fw × ft)$^{1/2}$ | 0.266 | 0.231 | 0.205 | 0.263 |
| (37) | |fis|/(fw × ft)$^{1/2}$ | 0.094 | 0.090 | 0.077 | 0.118 |
| (38) | DMnp/(RMnpf + RMnpr) | −0.017 | −0.019 | −0.016 | −0.014 |
| (39) | DEnp/(REnpf + REnpr) | −0.101 | −0.102 | −0.099 | −0.094 |

TABLE 44

| Expression number | Conditional expression | Example 13 | Example 14 | Example 15 | Example 16 |
|---|---|---|---|---|---|
| (1) | IH/ft | 0.024 | 0.024 | 0.024 | 0.024 |
| (2) | DG1/IH | 1.742 | 1.276 | 1.734 | 1.861 |
| (3) | Bm | 7.591 | 7.553 | 7.274 | 7.634 |
| (4) | |(1−βist) × βisrt| | 2.833 | 2.856 | 2.887 | 2.885 |
| (5) | ν1p | 94.66 | 94.66 | 94.66 | 94.66 |
| (6) | ν1pave | 85.96 | 88.10 | 88.14 | 88.14 |
| (7) | Δθ1p | 0.04576 | 0.04576 | 0.04576 | 0.04576 |
| (8) | Δθ1pave | 0.03392 | 0.03688 | 0.03764 | 0.03764 |
| (9) | νMp | 95.10 | 94.66 | 81.61 | 81.61 |
| (10) | νMpave | 95.10 | 82.82 | 77.28 | 77.28 |
| (11) | ΔθMp | 0.04607 | 0.04576 | 0.02952 | 0.02952 |
| (12) | ΔθMpave | 0.04607 | 0.03158 | 0.02420 | 0.02420 |
| (13) | N1n | 1.593 | 1.640 | 1.910 | 1.910 |
| (14) | ν2p | 16.48 | 23.08 | 22.50 | 22.53 |
| (15) | Δθ2p | 0.05071 | 0.02160 | 0.02406 | 0.02401 |
| (16) | ν2n | 97.75 | 85.19 | 94.66 | 94.66 |
| (17) | Δθ2n | 0.04977 | 0.03542 | 0.04576 | 0.04576 |
| (18) | βEt | 3.091 | 3.168 | 3.083 | 3.080 |
| (19) | fMp/(fw × ft)$^{1/2}$ | 0.292 | 0.289 | 0.346 | 0.230 |
| (20) | |β2t| | 2.147 | 2.403 | 2.507 | 2.902 |
| (21) | |fis/fisr| | 0.663 | 0.583 | 0.668 | 0.598 |
| (22) | D1n/(ft/FNot) | 0.043 | 0.028 | 0.033 | 0.033 |
| (23) | (fMw × fMt)$^{1/2}$/(fw × ft)$^{1/2}$ | 0.208 | 0.206 | 0.242 | 0.189 |
| (24) | |f2|/fPA | 0.630 | 0.624 | 0.614 | 0.867 |
| (25) | TLt/ft | 0.573 | 0.530 | 0.580 | 0.566 |
| (26) | |fE|/ft | 0.061 | 0.053 | 0.058 | 0.051 |
| (27) | β2t/β2w | 3.809 | 4.178 | 6.027 | 4.352 |
| (28) | βPArt | 1.571 | 1.633 | 1.637 | 2.304 |
| (29) | f1/(fw × ft)$^{1/2}$ | 0.645 | 0.610 | 0.786 | 0.634 |
| (30) | |f2|/fw | 0.357 | 0.350 | 0.506 | 0.335 |
| (31) | ffp/|ffn| | 1.763 | 1.722 | 2.157 | 1.718 |
| (32) | f1/|f2| | 3.504 | 3.384 | 3.698 | 3.183 |
| (33) | |f2|/(fw × ft)$^{1/2}$ | 0.184 | 0.180 | 0.213 | 0.199 |
| (34) | fPA/(fw × ft)$^{1/2}$ | 0.292 | 0.289 | 0.346 | 0.230 |
| (35) | |fE|/(fw × ft)$^{1/2}$ | 0.119 | 0.103 | 0.138 | 0.085 |
| (36) | |ff|/(fw × ft)$^{1/2}$ | 0.280 | 0.292 | 0.384 | 0.214 |
| (37) | |fis|/(fw × ft)$^{1/2}$ | 0.108 | 0.100 | 0.110 | 0.066 |
| (38) | DMnp/(RMnpf + RMnpr) | 0.011 | 0.021 | 0.000 | 0.000 |
| (39) | DEnp/(REnpf + REnpr) | −0.125 | −0.108 | −0.214 | −0.173 |

TABLE 45

| Expression number | Conditional expression | Example 17 | Example 18 | Example 19 | Example 20 |
|---|---|---|---|---|---|
| (1) | IH/ft | 0.022 | 0.029 | 0.024 | 0.024 |
| (2) | DG1/IH | 1.660 | 1.935 | 1.699 | 1.306 |
| (3) | Bm | 9.063 | 8.101 | 7.859 | 7.631 |
| (4) | $|(1-\beta ist) \times \beta isrt|$ | 2.888 | 2.886 | 2.887 | 2.883 |
| (5) | v1p | 94.66 | 94.66 | 94.66 | 95.10 |
| (6) | v1pave | 88.14 | 88.14 | 88.14 | 95.10 |
| (7) | $\Delta\theta 1p$ | 0.04576 | 0.04576 | 0.04576 | 0.04607 |
| (8) | $\Delta\theta 1pave$ | 0.03764 | 0.03764 | 0.03764 | 0.04607 |
| (9) | vMp | 81.61 | 81.61 | 81.61 | 94.66 |
| (10) | vMpave | 77.28 | 72.95 | 77.28 | 85.91 |
| (11) | $\Delta\theta Mp$ | 0.02952 | 0.02952 | 0.02952 | 0.04576 |
| (12) | $\Delta\theta Mpave$ | 0.02420 | 0.01889 | 0.02420 | 0.03392 |
| (13) | N1n | 1.881 | 1.910 | 1.910 | 1.620 |
| (14) | v2p | 22.64 | 22.50 | 22.50 | 20.36 |
| (15) | $\Delta\theta 2p$ | 0.02359 | 0.02406 | 0.01626 | 0.03069 |
| (16) | v2n | 94.66 | 94.66 | 94.66 | 95.10 |
| (17) | $\Delta\theta 2n$ | 0.04576 | 0.04576 | 0.04576 | 0.04607 |
| (18) | $\beta Et$ | 3.383 | 3.321 | 3.248 | 3.081 |
| (19) | $fMp/(fw \times ft)^{1/2}$ | 0.284 | 0.286 | 0.326 | 0.300 |
| (20) | $|\beta 2t|$ | 3.695 | 2.420 | 2.453 | 2.543 |
| (21) | $|fis/fisr|$ | 0.674 | 0.585 | 0.604 | 0.639 |
| (22) | D1n/(ft/FNot) | 0.033 | 0.035 | 0.033 | 0.025 |
| (23) | $(fMw \times fMt)^{1/2}/(fw \times ft)^{1/2}$ | 0.206 | 0.209 | 0.228 | 0.211 |
| (24) | $|f2|/fPA$ | 0.796 | 0.766 | 0.695 | 0.598 |
| (25) | TLt/ft | 0.555 | 0.585 | 0.576 | 0.567 |
| (26) | $|fE|/ft$ | 0.048 | 0.051 | 0.053 | 0.062 |
| (27) | $\beta 2t/\beta 2w$ | 6.265 | 4.704 | 5.293 | 4.394 |
| (28) | $\beta PArt$ | 2.191 | 1.986 | 1.851 | 1.591 |
| (29) | $f1/(fw \times ft)^{1/2}$ | 0.699 | 0.715 | 0.768 | 0.614 |
| (30) | $|f2|/fw$ | 0.440 | 0.425 | 0.492 | 0.348 |
| (31) | $ffp/|ffn|$ | 1.815 | 1.891 | 2.119 | 1.883 |
| (32) | $f1/|f2|$ | 3.086 | 3.269 | 3.385 | 3.425 |
| (33) | $|f2|/(fw \times ft)^{1/2}$ | 0.226 | 0.219 | 0.227 | 0.179 |
| (34) | $fPA/(fw \times ft)^{1/2}$ | 0.284 | 0.286 | 0.326 | 0.300 |
| (35) | $|fE|/(fw \times ft)^{1/2}$ | 0.094 | 0.098 | 0.116 | 0.120 |
| (36) | $|ff|/(fw \times ft)^{1/2}$ | 0.244 | 0.279 | 0.335 | 0.280 |
| (37) | $|fis|/(fw \times ft)^{1/2}$ | 0.076 | 0.081 | 0.091 | 0.102 |
| (38) | DMnp/(RMnpf + RMnpr) | 0.000 | 0.000 | 0.000 | 0.018 |
| (39) | DEnp/(REnpf + REnpr) | −0.172 | −0.135 | −0.172 | −0.093 |

Although the zoom lenses of Examples 1 to 20 each are configured to have a small size, the focal length at the telephoto end is equal to or greater than 480, and the focal length at the telephoto end in some examples is equal to or greater than 550. Therefore, an increase in focal length can be achieved. In the zoom lenses of Examples 1 to 20, the total angle of view is equal to or less than 3.2° at the telephoto end. In some examples, the total angle of view at the telephoto end is equal to or less than 2.8°. The zoom lenses are optical systems which are suitable for a telephoto type. Further, the zoom lenses of Examples 1 to 20 each ensure a zoom ratio of 2.8 or more, and the zoom lenses of some examples each ensure a zoom ratio of 3.5 or more. In each of the zoom lenses of Examples 1 to 20, various aberrations are satisfactorily corrected, and high optical performance is maintained.

In a lens system used for an imaging apparatus such as a digital camera, a lens system having a narrower angle of view is required in order to capture an image of a distant subject in an enlarged manner. In general, in a case where an attempt is made to narrow the angle of view, the total length of the optical system becomes long, and the size thereof tends to be larger. However, Examples 1 to 20 each realize a super-telephoto zoom lens having a narrow angle of view and a long focal length at the telephoto end while maintaining a small configuration.

Figure 43:
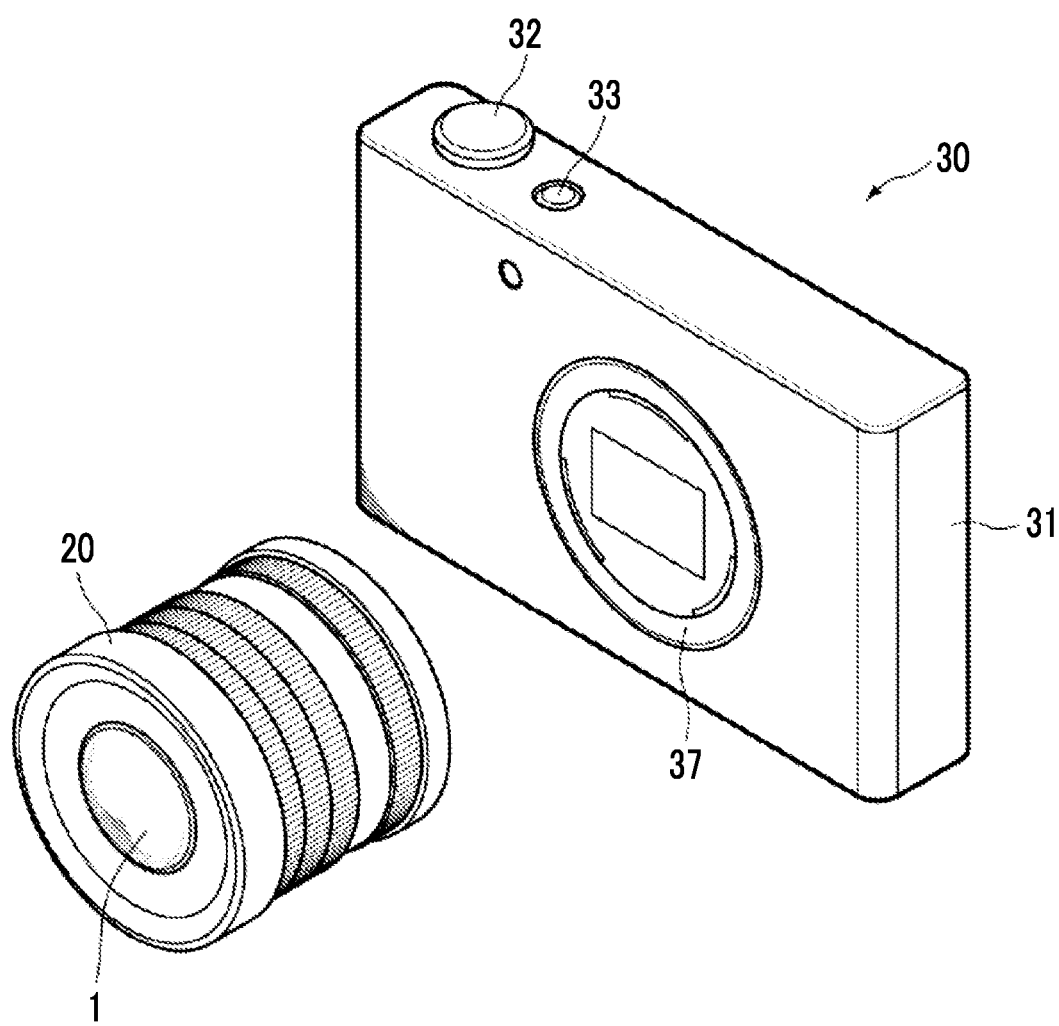
FIG. 43 is a perspective view of a front side of an imaging apparatus according to an embodiment.
Figure 44:
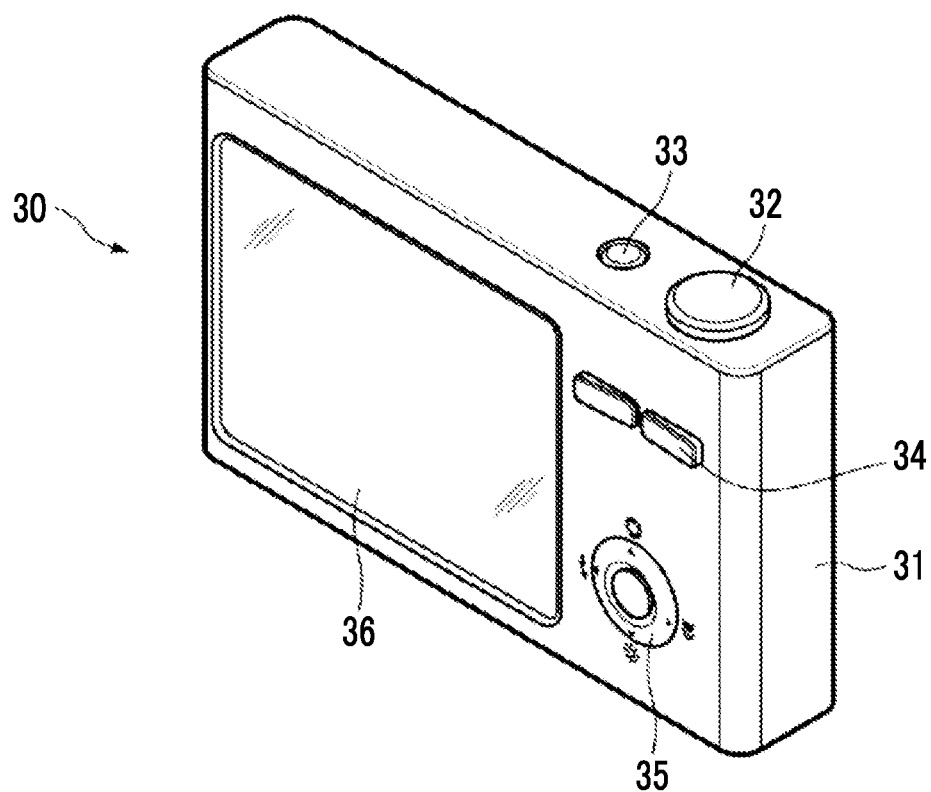
FIG. 44 is a perspective view of a rear side of the imaging apparatus according to the embodiment.

Next, an imaging apparatus according to an embodiment of the present disclosure will be described. FIGS. 43 and 44 are external views of a camera 30 which is the imaging apparatus according to the embodiment of the present disclosure. FIG. 43 is a perspective view of the camera 30 viewed from a front side, and FIG. 44 is a perspective view of the camera 30 viewed from a rear side. The camera 30 is a so-called mirrorless type digital camera, and an interchangeable lens 20 can be removably attached thereto. The interchangeable lens 20 is configured to include a zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at a center on a front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. A zoom lens consisting of, in order from an object side to an image side: a first lens group that has a positive refractive power; a second lens group that has a negative refractive power; a middle group that includes one or more lens groups; and a final lens group that has a negative refractive power,
   wherein the middle group has a positive refractive power as a whole throughout an entire zoom range,
   the middle group includes, in consecutive order from a position closest to the object side to the image side, a PA lens group that has a positive refractive power and a fourth lens group that has a positive refractive power,
   during zooming, a spacing between the first lens group and the second lens group changes, a spacing between the second lens group and the middle group changes, and a spacing between the middle group and the final lens group changes,
   all spacings of adjacent lens groups in the middle group change during zooming,
   the first lens group consists of one negative lens and two positive lenses,
   the PA lens group includes three positive lenses,
   exactly one focusing group that moves along an optical axis during focusing is disposed in the zoom lens,
   the focusing group has a negative refractive power and consists of one negative lens and one positive lens,
   a vibration-proof group that moves in a direction intersecting with an optical axis during image blur correction is disposed in the zoom lens, and
   the vibration-proof group has a negative refractive power and consists of one positive lens and two negative lenses,
   a maximum image height is IH,
   a focal length of the zoom lens in a state in which an infinite distance object is in focus at a telephoto end is ft,
   a refractive index of the negative lens of the first lens group at a d line is N1n,
   a focal length of the second lens group is f2,
   a focal length of the PA lens group is fPA,
   a focal length of the first lens group is f1, and
   Conditional Expressions (1), (13-3), (24-2), and (32-3) are satisfied, which are represented by $$0.011 < IH/ft < 0.042 \tag{1}$$

$$0.55 < N1n < 1.77 \tag{13-3}$$

$$0.45 < |f2|/fPA < 0.83 \tag{24-2}$$

$$3.384 \leq f1/|f2| < 4.8 \tag{32-3}$$

2. The zoom lens according to claim 1, wherein the first lens group remains stationary with respect to an image plane during zooming.

3. The zoom lens according to claim 1,
   wherein the zoom lens includes a stop closer to the image side than a lens disposed closest to the image side in the PA lens group.

4. The zoom lens according to claim 1, wherein a distance on an optical axis from a lens surface closest to the object side in the first lens group to a lens surface closest to the image side in the first lens group is DG1, and Conditional Expression (2) is satisfied, which is represented by $$0.6 < DG1/IH < 2.5 \tag{2}$$

5. The zoom lens according to claim 4, wherein Conditional Expression (2-1) is satisfied, which is represented by $$0.7 < DG1/IH < 2.2 \tag{2-1}$$

6. The zoom lens according to claim 1,
   wherein the focusing group is at a position closer to the image side than a lens disposed closest to the image side in the PA lens group.

7. The zoom lens according to claim 6, wherein
   a lateral magnification of the focusing group in a state in which the infinite distance object is in focus at the telephoto end is βft,
   a combined lateral magnification of all lenses closer to the image side than the focusing group in a state in which the infinite distance object is in focus at the telephoto end is βfrt,
   βfrt=1 in a case where the lens is not disposed closer to the image side than the focusing group,
   Bm is defined to be represented by Bm=|(1−βft²)×βfrt²|, and
   Conditional Expression (3) is satisfied, which is represented by $$3.5 < Bm < 10 \tag{3}$$

8. The zoom lens according to claim 7, wherein Conditional Expression (3-1) is satisfied, which is represented by $$3.8 < Bm < 9.4 \tag{3-1}$$

9. The zoom lens according to claim 1,
   wherein the vibration-proof group is at a position closer to the image side than a lens disposed closest to the image side in the PA lens group.

10. The zoom lens according to claim 9, wherein
    a lateral magnification of the vibration-proof group in a state in which the infinite distance object is in focus at the telephoto end is βist,
    a combined lateral magnification of all lenses closer to the image side than the vibration-proof group in a state in which the infinite distance object is in focus at the telephoto end is βisrt,
    βisrt=1 in a case where the lens is not disposed closer to the image side than the vibration-proof group, and
    Conditional Expression (4) is satisfied, which is represented by $$1.7 < |(1−βist)×βisrt| < 4.8 \tag{4}$$

11. The zoom lens according to claim 1, wherein an Abbe number of one of the two positive lenses of the first lens group based on a d line is ν1p, and the zoom lens includes at least one positive lens satisfying Conditional Expression (5), which is represented by $$81.7 < \nu1p < 105 \qquad (5).$$

12. The zoom lens according to claim 1, wherein an average value of Abbe numbers of all the positive lenses of the first lens group based on a d line is ν1pave, and Conditional Expression (6) is satisfied, which is represented by $$81.7 < \nu1pave < 105 \qquad (6).$$

13. The zoom lens according to claim 1, wherein
an Abbe number of one of the two positive lenses of the first lens group based on a d line is ν1p and a partial dispersion ratio thereof between a g line and an F line is θ1p, $$\Delta\theta1p = \theta1p + 0.00162 \times \nu1p - 0.64159, \text{ and}$$

the zoom lens includes at least one positive lens satisfying Conditional Expression (7), which is represented by
$0.03 < \Delta\theta1p < 0.06$ (7).

14. The zoom lens according to claim 1, wherein
an Abbe number of one of the two positive lenses of the first lens group based on a d line is ν1p and a partial dispersion ratio thereof between a g line and an F line is θ1p, $$\Delta\theta1p = \theta1p + 0.00162 \times \nu1p - 0.64159,$$

an average value of Δθ1p of all positive lenses of the first lens group is Δθ1pave, and
Conditional Expression (8) is satisfied, which is represented by $$0.03 < \Delta\theta1pave < 0.06 \qquad (8).$$

15. The zoom lens according to claim 1,
wherein
an Abbe number of a positive lens disposed in a lens group that has a strongest refractive power among lens groups that have positive refractive powers and that are included in the middle group based on a d line is νMp, and the zoom lens includes at least one positive lens satisfying Conditional Expression (9), which is represented by $$81.7 < \nu Mp < 105 \qquad (9).$$

16. The zoom lens according to claim 1,
wherein
an average value of Abbe numbers of all positive lenses disposed in a lens group that has a strongest refractive power among lens groups that have positive refractive powers and that are included in the middle group based on a d line is νMpave, and Conditional Expression (10) is satisfied, which is represented by $$81.7 < \nu Mpave < 105 \qquad (10).$$

17. The zoom lens according to claim 1,
wherein
an Abbe number of a positive lens disposed in a lens group that has a strongest refractive power among lens groups that have positive refractive powers and that are included in the middle group based on a d line is νMp and a partial dispersion ratio thereof between a g line and an F line is θMp, $$\Delta\theta Mp = \theta Mp + 0.00162 \times \nu Mp - 0.64159, \text{ and}$$

the zoom lens includes at least one positive lens satisfying Conditional Expression (11), which is represented by $$0.014 < \Delta\theta Mp < 0.06 \qquad (11).$$

18. The zoom lens according to claim 1,
wherein
an Abbe number of a positive lens disposed in a lens group that has a strongest refractive power among lens groups that have positive refractive powers and that are included in the middle group based on a d line is νMp and a partial dispersion ratio thereof between a g line and an F line is θMp, $$\Delta\theta Mp = \theta Mp + 0.00162 \times \nu Mp - 0.64159,$$

an average value of ΔθMp of all positive lenses of a lens group that has a strongest refractive power among the lens groups that have positive refractive powers and that are included in the middle group is ΔθMpave, and
Conditional Expression (12) is satisfied, which is represented by $$0.014 < \Delta\theta Mpave < 0.06 \qquad (12).$$

19. The zoom lens according to claim 1,
wherein the second lens group includes at least one positive lens, and
an Abbe number of the positive lens of the second lens group based on a d line is ν2p, and the zoom lens includes at least one positive lens satisfying Conditional Expression (14), which is represented by $$15 < \nu2p < 25 \qquad (14).$$

20. The zoom lens according to claim 1,
wherein the second lens group includes at least one positive lens,
an Abbe number of a positive lens of the second lens group based on a d line is ν2p and a partial dispersion ratio thereof between a g line and an F line is θ2p, $$\Delta\theta2p = \theta2p + 0.00162 \times \nu2p - 0.64159, \text{ and}$$

the zoom lens includes at least one positive lens satisfying Conditional Expression (15), which is represented by $$0.015 < \Delta\theta2p < 0.06 \qquad (15).$$

21. The zoom lens according to claim 1, wherein an Abbe number of a negative lens of the second lens group based on a d line is ν2n, and the zoom lens includes at least one negative lens satisfying Conditional Expression (16), which is represented by $$70 < \nu2n < 105 \qquad (16).$$

22. The zoom lens according to claim 1, wherein
an Abbe number of a negative lens of the second lens group based on a d line is ν2n and a partial dispersion ratio thereof between a g line and an F line is θ2n, $$\Delta\theta2n = \theta2n + 0.00162 \times \nu2n - 0.64159, \text{ and}$$

the zoom lens includes at least one negative lens satisfying Conditional Expression (17), which is represented by $$0.03 < \Delta\theta2n < 0.06 \qquad (17).$$

23. The zoom lens according to claim 1, wherein that a lateral magnification of the final lens group in a state in which the infinite distance object is in focus at the telephoto end is βEt, and Conditional Expression (18) is satisfied, which is represented by $$1.4<\beta Et<4.7 \tag{18}$$

24. The zoom lens according to claim 1,
wherein
a focal length of a lens group that has a strongest refractive power among lens groups that have positive refractive powers and that are included in the middle group is fMp,
a focal length of the zoom lens in a state in which the infinite distance object is in focus at a wide angle end is fw, and
Conditional Expression (19) is satisfied, which is represented by $$0.1<fMp/(fw\times ft)^{1/2}<0.7 \tag{19}$$

25. The zoom lens according to claim 1, wherein a lateral magnification of the second lens group in a state in which the infinite distance object is in focus at the telephoto end is β2t, and Conditional Expression (20) is satisfied, which is represented by $$0.9<|\beta 2t|<4.6 \tag{20}$$

26. The zoom lens according to claim 1,
wherein
the zoom lens includes a stationary group that is disposed adjacent to the vibration-proof group on the image side of the vibration-proof group, that has a refractive power of which a sign is opposite to a sign of a refractive power of the vibration-proof group, and that remains stationary with respect to an image plane during zooming and focusing,
a focal length of the vibration-proof group is fis,
a focal length of the stationary group is fisr, and
Conditional Expression (21) is satisfied, which is represented by $$0.32<|fis/fisr|<1.1 \tag{21}$$

27. The zoom lens according to claim 1,
wherein
a center thickness of the negative lens included in the first lens group is D1n,
an F number in a state in which the infinite distance object is in focus at the telephoto end is FNot, and
Conditional Expression (22) is satisfied, which is represented by $$0.01<D1n/(ft/FNot)<0.04 \tag{22}$$

28. The zoom lens according to claim 1, wherein the negative lens included in the first lens group is a single lens that is disposed closest to the object side in the first lens group.

29. The zoom lens according to claim 1, wherein
a focal length of the middle group in a state in which the infinite distance object is in focus at a wide angle end is fMw,
a focal length of the middle group in a state in which the infinite distance object is in focus at the telephoto end is fMt,
a focal length of the zoom lens in a state in which the infinite distance object is in focus at the wide angle end is fw, and
Conditional Expression (23) is satisfied, which is represented by $$0.16<(fMw\times fMt)^{1/2}/(fw\times ft)^{1/2}<0.3 \tag{23}$$

30. The zoom lens according to claim 1, wherein the final lens group remains stationary with respect to an image plane during zooming.

31. The zoom lens according to claim 1, wherein the second lens group and all lens groups in the middle group move during zooming.

32. The zoom lens according to claim 1,
wherein
a lens group that has a strongest refractive power among lens groups that have positive refractive powers and that are included in the middle group is the PA lens group.

33. The zoom lens according to claim 1, wherein a sum of a back focal length of the zoom lens at an air-equivalent distance and a distance on an optical axis from a lens surface closest to the object side in the first lens group to a lens surface closest to the image side in the final lens group in a state in which the infinite distance object is in focus at the telephoto end is TLt, and Conditional Expression (25) is satisfied, which is represented by $$0.42<TLt/ft<0.94 \tag{25}$$

34. The zoom lens according to claim 1, wherein the first lens group consists of, in order from the object side to the image side, the negative lens, one of the two positive lenses, and the other of the two positive lenses.

35. The zoom lens according to claim 1, wherein a focal length of the final lens group is fE, and Conditional Expression (26) is satisfied, which is represented by $$0.02<|fE|/ft<0.2 \tag{26}$$

36. The zoom lens according to claim 1, wherein all of lens groups included in the middle group are lens groups that have positive refractive powers.

37. The zoom lens according to claim 1, wherein the focusing group and the vibration-proof group are disposed in the final lens group.

38. The zoom lens according to claim 37, wherein the focusing group is disposed closer to the object side than the vibration-proof group.

39. The zoom lens according to claim 1,
wherein
a lens group that has a strongest refractive power among lens groups that have positive refractive powers and that are included in the middle group includes at least three positive lenses and at least one negative lens.

40. The zoom lens according to claim 1, wherein
a lateral magnification of the second lens group in a state in which the infinite distance object is in focus at the telephoto end is β2t,
a lateral magnification of the second lens group in a state in which the infinite distance object is in focus at a wide angle end is β2w, and
Conditional Expression (27) is satisfied, which is represented by $$2.5<\beta 2t/\beta 2w<7.9 \tag{27}$$

41. The zoom lens according to claim 1,
wherein
a combined lateral magnification of all lenses closer to the image side than the PA lens group in a state in which the infinite distance object is in focus at the telephoto end is βPArt, and Conditional Expression (28) is satisfied, which is represented by $$0.8<\beta PArt<4.5 \tag{28}$$

42. The zoom lens according to claim 1, wherein
a focal length of the zoom lens in a state in which the infinite distance object is in focus at a wide angle end is fw, and
Conditional Expression (29) is satisfied, which is represented by $$0.43 < f1/(fw \times ft)^{1/2} < 1.03 \tag{29}$$

43. The zoom lens according to claim 1, wherein that
a focal length of the zoom lens in a state in which the infinite distance object is in focus at a wide angle end is fw, and
Conditional Expression (30) is satisfied, which is represented by $$0.23 < |f2|/fw < 0.66 \tag{30}$$

44. The zoom lens according to claim 1,
wherein
a focal length of the positive lens of the focusing group is ffp,
a focal length of the negative lens of the focusing group is ffn, and
Conditional Expression (31) is satisfied, which is represented by $$0.9 < ffp/|ffn| < 2.8 \tag{31}$$

45. The zoom lens according to claim 1, wherein
a focal length of the zoom lens in a state in which the infinite distance object is in focus at a wide angle end is fw, and
Conditional Expression (33) is satisfied, which is represented by $$0.13 < |f2|/(fw \times ft)^{1/2} < 0.32 \tag{33}$$

46. The zoom lens according to claim 1,
wherein
a focal length of the zoom lens in a state in which the infinite distance object is in focus at a wide angle end is fw, and
Conditional Expression (34) is satisfied, which is represented by $$0.12 < fP4/(fw \times ft)^{1/2} < 0.45 \tag{34}$$

47. The zoom lens according to claim 1, wherein
a focal length of the final lens group is fE,
a focal length of the zoom lens in a state in which the infinite distance object is in focus at a wide angle end is fw, and
Conditional Expression (35) is satisfied, which is represented by $$0.06 < |fE|/(fw \times ft)^{1/2} < 0.25 \tag{35}$$

48. The zoom lens according to claim 1,
wherein
a focal length of the focusing group is ff,
a focal length of the zoom lens in a state in which the infinite distance object is in focus at a wide angle end is fw, and
the focusing group satisfies Conditional Expression (36), which is represented by $$0.14 < |ff|/(fw \times ft)^{1/2} < 0.7 \tag{36}$$

49. The zoom lens according to claim 1,
wherein
a focal length of the vibration-proof group is fis,
a focal length of the zoom lens in a state in which the infinite distance object is in focus at a wide angle end is fw, and
Conditional Expression (37) is satisfied, which is represented by $$0.05 < |fis|/(fw \times ft)^{1/2} < 0.15 \tag{37}$$

50. The zoom lens according to claim 1,
wherein the middle group includes a lens pair consisting of a negative lens and a positive lens that are adjacent to each other with an air spacing interposed therebetween,
a spacing on an optical axis of the air spacing in the lens pair of the middle group is DMnp,
a curvature radius of an object side surface of an air lens formed by the air spacing in the lens pair of the middle group is RMnpf,
a curvature radius of an image side surface of the air lens formed by the air spacing in the lens pair of the middle group is RMnpr, and
the zoom lens includes at least one lens pair satisfying Conditional Expression (38), which is represented by $$0.002 < DMnp/(RMnpf + RMnpr) < 0.1 \tag{38}$$

51. The zoom lens according to claim 1,
wherein the final lens group includes a lens pair consisting of a negative lens and a positive lens that are adjacent to each other with an air spacing interposed therebetween,
a spacing on an optical axis of the air spacing in the lens pair of the final lens group is DEnp,
a curvature radius of an object side surface of an air lens formed by the air spacing in the lens pair of the final lens group is REnpf,
a curvature radius of an image side surface of the air lens formed by the air spacing in the lens pair of the final lens group is REnpr, and
the zoom lens includes at least one lens pair satisfying Conditional Expression (39), which is represented by $$-0.5 < DEnp/(REnpf + REnpr) < -0.01 \tag{39}$$

52. The zoom lens according to claim 1, wherein Conditional Expression (1-1) is satisfied, which is represented by $$0.017 < IH/ft < 0.036 \tag{1-1}$$

53. An imaging apparatus comprising the zoom lens according to claim 1.

* * * * *